US011447065B2

(12) United States Patent
Kurashige et al.

(10) Patent No.: US 11,447,065 B2
(45) Date of Patent: Sep. 20, 2022

(54) TIMING CONTROL UNIT FOR CONTROLLING AN ILLUMINATION DEVICE WITH COHERENT LIGHT SOURCE

(71) Applicant: Dai Nippon Printing Co., Ltd., Tokyo (JP)

(72) Inventors: Makio Kurashige, Tokyo (JP); Tomoe Sato, Tokyo (JP); Kazutoshi Ishida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 117 days.

(21) Appl. No.: 16/774,420

(22) Filed: Jan. 28, 2020

(65) Prior Publication Data

US 2020/0156531 A1    May 21, 2020

Related U.S. Application Data

(63) Continuation of application No. 15/523,007, filed as application No. PCT/JP2015/081373 on Nov. 6, 2015, now Pat. No. 10,576,874.

(30) Foreign Application Priority Data

Nov. 7, 2014  (JP) .............................. JP2014-227407
Nov. 7, 2014  (JP) .............................. JP2014-227419
(Continued)

(51) Int. Cl.
*B60Q 1/00*   (2006.01)
*B60Q 1/16*   (2006.01)
(Continued)

(52) U.S. Cl.
CPC ............ *B60Q 1/16* (2013.01); *B60Q 1/0035* (2013.01); *B60Q 1/14* (2013.01); *B60Q 1/24* (2013.01);
(Continued)

(58) Field of Classification Search
CPC ........ F21S 41/675; F21S 41/365; F21S 41/16; F21S 41/645; F21S 41/285; B60Q 1/16;
(Continued)

(56) References Cited

U.S. PATENT DOCUMENTS 5,589,956 A    12/1996   Morishima et al.
6,632,004 B2   10/2003   Sugawara et al.
(Continued)

FOREIGN PATENT DOCUMENTS

CN    101393359 A    3/2009
CN    103080630 A    5/2013
(Continued)

OTHER PUBLICATIONS

International Search Report and Written Opinion (Application No. PCT/JP2015/081373) dated Feb. 9, 2016.
(Continued)

*Primary Examiner* — Gerald J Sufleta, II
(74) *Attorney, Agent, or Firm* — Burr & Brown, PLLC

(57) ABSTRACT

An illumination device has a coherent light source that emits coherent light beam, and an optical device that diffuses the coherent light beam, wherein the optical device comprises a first diffusion region that diffuses the coherent light beam to illuminate a first area, and a second diffusion region that diffuses the coherent light beam to display predetermined information in a second area.

20 Claims, 42 Drawing Sheets

(30) Foreign Application Priority Data

| Dec. 5, 2014 | (JP) | JP2014-246692 |
|---|---|---|
| Dec. 5, 2014 | (JP) | JP2014-246700 |
| Dec. 5, 2014 | (JP) | JP2014-247022 |

(51) Int. Cl.

| F21S 41/20 | (2018.01) |
| F21S 41/64 | (2018.01) |
| F21S 41/675 | (2018.01) |
| G03H 1/30 | (2006.01) |
| G03H 1/22 | (2006.01) |
| G03H 1/32 | (2006.01) |
| F21S 41/16 | (2018.01) |
| F21S 41/365 | (2018.01) |
| B60Q 1/14 | (2006.01) |
| B60Q 1/24 | (2006.01) |
| G03B 21/20 | (2006.01) |
| B60Q 1/50 | (2006.01) |
| G03H 1/02 | (2006.01) |

(52) U.S. Cl.
CPC ............ *F21S 41/16* (2018.01); *F21S 41/285* (2018.01); *F21S 41/365* (2018.01); *F21S 41/645* (2018.01); *F21S 41/675* (2018.01); *G03H 1/2249* (2013.01); *G03H 1/2286* (2013.01); *G03H 1/30* (2013.01); *G03H 1/32* (2013.01); *B60Q 1/50* (2013.01); *B60Q 2400/50* (2013.01); *G03B 21/2033* (2013.01); *G03H 2001/0232* (2013.01); *G03H 2001/2218* (2013.01); *G03H 2001/2231* (2013.01); *G03H 2001/2234* (2013.01); *G03H 2001/2271* (2013.01); *G03H 2001/2273* (2013.01); *G03H 2001/2284* (2013.01); *G03H 2001/2292* (2013.01); *G03H 2210/20* (2013.01); *G03H 2222/18* (2013.01); *G03H 2222/34* (2013.01); *G03H 2225/31* (2013.01); *G03H 2225/55* (2013.01); *G03H 2227/03* (2013.01); *G03H 2227/05* (2013.01); *G03H 2270/22* (2013.01)

(58) Field of Classification Search
CPC ......... B60Q 1/14; B60Q 1/24; G03H 1/2249; G03H 1/2286; G03H 1/30; G03H 1/32
See application file for complete search history.

(56) References Cited

U.S. PATENT DOCUMENTS

| 7,513,623 | B2 | 4/2009 | Thomas |
| 7,742,125 | B2 | 6/2010 | Thomas et al. |
| 9,423,546 | B2 | 8/2016 | Kurashige |
| 9,703,182 | B2 | 7/2017 | Kurashige |
| 9,869,861 | B2* | 1/2018 | Takashima ......... G02B 27/0172 |
| 2002/0126331 | A1 | 9/2002 | Orr et al. |
| 2003/0086136 | A1* | 5/2003 | Orr .................. G02B 5/0252 359/23 |
| 2006/0033009 | A1* | 2/2006 | Kobayashi ........... H04N 9/3129 250/208.1 |
| 2007/0024995 | A1 | 2/2007 | Hayashi |
| 2009/0021801 | A1* | 1/2009 | Ishihara ................ G02B 27/48 358/475 |
| 2010/0020291 | A1* | 1/2010 | Kasazumi ......... G02B 26/0808 353/38 |
| 2011/0043876 | A1 | 2/2011 | Kurashige et al. |
| 2011/0188102 | A1* | 8/2011 | Shirakura ........ G06K 19/07749 359/2 |
| 2011/0249460 | A1 | 10/2011 | Kushimoto |
| 2012/0250338 | A1 | 10/2012 | Fujiyoshi et al. |
| 2013/0003403 | A1 | 1/2013 | Takahira et al. |
| 2013/0170007 | A1 | 7/2013 | Kurashige et al. |
| 2013/0265561 | A1 | 10/2013 | Takahira et al. |
| 2013/0301090 | A1* | 11/2013 | Flynn ...................... G03H 1/20 359/2 |
| 2014/0092321 | A1* | 4/2014 | Kurashige ............ G03B 21/208 349/7 |
| 2015/0036108 | A1* | 2/2015 | Taniguchi .......... G02B 26/0808 353/102 |
| 2015/0124466 | A1 | 5/2015 | Kushimoto |
| 2015/0130896 | A1* | 5/2015 | Ma ....................... G02B 5/0252 348/40 |
| 2015/0137680 | A1 | 5/2015 | Komatsu |
| 2015/0177443 | A1* | 6/2015 | Faecke .................. G02B 6/005 349/65 |

FOREIGN PATENT DOCUMENTS

| CN | 103676398 A | 3/2014 | |
| CN | 103890640 A | 6/2014 | |
| JP | H02-281226 A | 11/1990 | |
| JP | H06-051239 A1 | 2/1994 | |
| JP | 06-191346 A1 | 7/1994 | |
| JP | H09-152588 A1 | 6/1997 | |
| JP | H10-504909 A1 | 5/1998 | |
| JP | H10-153653 A | 6/1998 | |
| JP | 3586213 B2 | 11/2004 | |
| JP | 2005-161977 A1 | 6/2005 | |
| JP | 2007-024928 A | 2/2007 | |
| JP | 2011-043603 A1 | 3/2011 | |
| JP | 2011-084106 A | 4/2011 | |
| JP | 2011-222238 A1 | 11/2011 | |
| JP | 2012-146621 A1 | 8/2012 | |
| JP | 2012-226274 A1 | 11/2012 | |
| JP | 2012-230310 A1 | 11/2012 | |
| JP | 5293893 B2 | 9/2013 | |
| JP | 2013-203251 A | 10/2013 | |
| WO | 2012/070433 A1 | 5/2012 | |
| WO | WO-2012144593 A1 * | 10/2012 | ........... H04N 9/3102 |
| WO | 2014/024385 A1 | 2/2014 | |

OTHER PUBLICATIONS

International Preliminary Report on Patentability (Application No. PCT/JP2015/081373) dated May 18, 2017.
Extended European Search Report (Application No. 158570804) dated May 16, 2018.
Chinese Office Action (Application No. 2015800604470) dated Dec. 11, 2018 (with English translation).
Japanese Office Action (Application No. 2017-112007) dated Jul. 23, 2019 (with English translation).
Chinese Office Action (Application No. 201580060447.0) dated Sep. 30, 2019 (with English translation).
European Office Action (Application No. 15 857 080.4) dated Mar. 23, 2021.
Japanese Office Action (Application No. 2020-130463) dated Apr. 20, 2021 (with English translation).
Chinese Office Action (Application No. 201580060447.0) dated May 28, 2020.

\* cited by examiner

1 : ILLUMINATION DEVICE

1 : ILLUMINATION DEVICE

TIMING CONTROL UNIT FOR CONTROLLING AN ILLUMINATION DEVICE WITH COHERENT LIGHT SOURCE

CROSS REFERENCE TO RELATED APPLICATIONS

This application is a continuation of U.S. application Ser. No. 15/523,007, filed Apr. 28, 2017, which is the National Stage entry of International Application No. PCT/JP2015/081373, filed Nov. 6, 2015, which designated the United States, the entireties of which are incorporated herein by reference.

FIELD OF THE INVENTION

The present invention relates to an illumination device that illuminates a predetermined area using coherent light beam.

BACKGROUND OF THE INVENTION

Techniques are known in which illumination equipment such as street lamps, room lighting, cameras and the like can illuminate only a desired place using a cylindrical lens, an actuator, a shade, etc. (see Patent Literature 1 and 2).

CITATION LIST

Patent Literature

Patent Literature 1: Japanese Patent No. 3586213
Patent Literature 2: Japanese Patent No. 5293893

SUMMARY OF THE INVENTION

Technical Problem

This type of conventional technology keeps in mind the fact that a position relatively near illumination equipment is illuminated on a spot, and a position far from the illumination equipment cannot be illuminated. In addition, conventionally, since it is merely focused on illuminating, decorative lighting and an illumination mode at arbitrary places cannot be switched at arbitrary timing.

The problems to be solved by the present invention are to provide an illumination device which can arbitrarily change the illumination mode without complicating the configuration of an optical system.

Solution to Problem

In order to solve the above problem, a first aspect of the present invention provides an illumination device including a coherent light source that emits coherent light beam; and an optical device that diffuses the coherent light beam, wherein the optical device comprises a first diffusion region that diffuses the coherent light beam to illuminate a first area, and a second diffusion region that diffuses the coherent light beam to display predetermined information in a second area.

The illumination device may include a scanning unit that scans the coherent light beam emitted by the coherent light source on the optical device, wherein the first diffusion region may diffuse coherent light beam from the scanning unit to illuminate the first area, and the second diffusion region may diffuse the coherent light beam from the scanning unit to display the predetermined information in the second area.

The second diffusion region may display the information by changing at least one of hue, brightness, and chroma in the second area.

The second diffusion region may display the information including at least one of a picture, a pattern, a character, a number, and a symbol in a single color or in a plurality of colors.

The first area and the second area may be arranged so as not to overlap one another.

The first area and the second area may be arranged so that at least parts of the first area and the second area overlap one another.

The scanning unit may scan the coherent light beam on the first diffusion region and the second diffusion region.

The first diffusion region may have a plurality of first element diffusion regions and the plurality of first element diffusion regions may diffuse incident coherent light beams and illuminate respective partial regions.

The second diffusion region may have a plurality of second element diffusion regions and the plurality of second element diffusion regions may diffuse incident coherent light beams and display the diffused coherent light beams on respective partial regions.

The scanning unit may include a light scanning device that periodically changes a traveling direction of the coherent light beam emitted from the coherent light source.

The illumination device may include a timing control unit that controls an incident timing of the coherent light beam on the optical device or controls an illumination timing in the first area and a display timing in the second area.

The illumination device may also include a timing control unit that controls whether or not to scan the coherent light beam from the scanning unit on at least one of the first diffusion region and the second diffusion region.

The illumination device may include an object detection unit that detects an object in a predetermined area, wherein the timing control unit may control a scanning timing of the coherent light beam in at least one of the first diffusion region and the second diffusion region, in accordance with a position of the object detected by the object detection unit.

The timing control unit may control the scanning timing of the coherent light beam in the first diffusion region so that the object detected by the object detection unit is illuminated in the first area.

The timing control unit may control the scanning timing of the coherent light beam in the first diffusion region so that the first area is positioned in a region where the object detected by the object detection unit does not exist.

The illumination device may include an event detection unit that detects an occurrence of a specific event, wherein the timing control unit may control the scanning timing of the coherent light beam in at least one of the first diffusion region and the second diffusion region when it is detected by the event detection unit that the specific event has occurred.

The coherent light source has a plurality of light emitting units that emit a plurality of coherent light beams having different emission wavelength ranges, and at least one of the first diffusion region and the second diffusion region may have a plurality of diffusion region parts to be scanned by the plurality of coherent light beams.

The optical device may be a hologram recording medium, and the first diffusion region and the second diffusion region may have element hologram areas in which different interference fringe pattern are formed.

The optical device may be a lens array group having a plurality of lens arrays, and the first diffusion region and the second diffusion region may include the lens array.

The optical device has a hologram recording medium and a lens array group having a plurality of lens arrays, and one of the first diffusion region and the second diffusion region may have the hologram recording medium and the other may include the lens array group.

The timing control unit may control a timing at which the coherent light beam from the scanning unit is continuously scanned on the first diffusion region, and the coherent light beam from the scanning unit is scanned on the second diffusion region.

The illumination device may include an information selection unit that selects the information to be displayed in the second area, wherein the timing control unit may control a timing at which the coherent light beam from the scanning unit is scanned on the second diffusion region based on the information selected by the information selection unit.

The illumination device may include a route information acquiring unit that acquires route information for traveling, wherein the information selection unit may select the information to be displayed in the second area based on route information acquired by the route information acquiring unit.

The information selection unit may select the information capable of discriminating at least one of a direction to travel and a direction not to travel based on the route information acquired by the route information acquiring unit.

The information selection unit may select the information of a display mode capable of discriminating one candidate route to travel among a plurality of candidate routes and the other candidate route.

The information selection unit may select information for displaying one candidate route to travel among the plurality of candidate routes and the other candidate routes using different colors.

The illumination device may include a map information acquiring unit that acquires map information around a current position, and the information selection unit may select the information around a current position based on the map information acquired by the map information acquiring unit.

An optical path length of the coherent light beam from the optical device to the first area may be longer than an optical path length of the coherent light beam from the optical device to the second area.

The illumination device may include a beam diameter expansion member that expands a beam diameter of the coherent light beam, and an optical shutter that switches the transmittance of coherent light beam incident on the optical device or coherent light beam diffused by the optical device, wherein the optical device has a plurality of element diffusion regions that respectively diffuse coherent light beam having a beam diameter widened by the beam diameter expansion member, the optical shutter has a plurality of element shutter units corresponding to the plurality of element diffusion regions, and the plurality of element shutter units may switch a transmittance of coherent light beams to be incident on respective element diffusion regions or coherent light beams diffused by respective element diffusion regions.

The optical shutter may disposed closer to the optical device on a front side of an optical axis than the optical device, and the plurality of element shutter units may switch a transmittance of coherent light beams incident on respective element diffusion regions.

The optical shutter may be disposed closer to the optical device on a rear side of an optical axis than the optical device, and the plurality of element shutter units may switch a transmittance of coherent light beams diffused from respective element diffusion regions.

The optical shutter may switch an illumination mode for partial regions in a predetermined illumination area illuminated by the plurality of element diffusion regions by individually switching the plurality of element shutters.

The illumination mode may be an illumination intensity for the partial region or whether or not to illuminate the partial region.

The coherent light source may have a plurality of light source units that emit a plurality of coherent light beams having different emission wavelength ranges, the optical device may have a plurality of diffusion regions provided corresponding to the plurality of coherent light beams and including the first diffusion region and the second diffusion region to which the corresponding coherent light beam is incident, the plurality of diffusion regions may have the plurality of element diffusion regions, and the optical shutter may have the plurality of element shutter units corresponding to the plurality of element diffusion regions for the diffusion region.

The optical shutter may switch an illumination color of a whole area of the illumination area by switching the plurality of element shutter units provided for the diffusion region as one set The optical shutter may switch an illumination mode for the partial region in the illumination area illuminated by the plurality of element diffusion regions by individually switching the plurality of element shutter units provided in the plurality of diffusion regions.

The illumination mode may include an illumination color for the partial region.

The optical shutter can switch a transmittance of the coherent light beam with a beam diameter enlarged stepwise or continuously, and the plurality of element shutter units may individually switch an incident light amount of coherent light beam to a corresponding element diffusion region or a transmitted light amount of coherent light beam diffused in a corresponding element diffusion region.

The optical shutter may be a mechanical shutter, an electronic shutter or a multi-cell shutter.

The imaging device shutter may be a liquid crystal shutter that has a plurality of liquid crystal cells corresponding to the plurality of element shutter units, and may switch the transmittance of the coherent light beam incident on a corresponding element diffusion region or the coherent light beam diffused by a corresponding element diffusion region.

The coherent light beam diffused in the first diffusion region of the optical device may illuminate the first area, and the first diffusion region may have the plurality of element diffusion regions.

Coherent light beam diffused in the second diffusion region of the optical device may display predetermined information in the second area and the second diffusion region may have one or more element diffusion regions.

The illumination device may include a driving unit that moves the optical device, wherein the optical device may hold a plurality of diffusion regions including the first diffusion region and the second diffusion region, the driving unit may move the optical device such that the plurality of diffusion regions sequentially reach an illumination position of coherent light beam from the coherent light source, the plurality of diffusion regions may illuminate respective partial regions in a predetermined illumination area by diffusion of the incident coherent light beam, and at least parts of the partial regions illuminated by each of the plurality of diffusion regions may be different from each other.

The illumination device may include a timing control unit that controls an incident timing of the coherent light beam from the coherent light source on the optical device or an illumination timing in the illumination area.

The driving unit is configured to continuously rotate the optical device in a rotation direction. The plurality of diffusion devices may be arranged along the rotation direction.

The optical device may have a disc shape.

The optical device may have a cylindrical shape.

The optical device may have a set of rotating rollers rotatable about respective axes, and a belt-like portion wound around the pair of rotating rollers in a loop shape, wherein the plurality of diffusion devices may be arranged along a longitudinal direction of the belt-like portion, and the driving unit may be configured to continuously rotate at least one rotating roller about an axis thereof.

The plurality of diffusion devices may have an elongated shape extending in a direction perpendicular to a moving direction of the optical device, and the coherent light source may have a laser array arranged in a direction perpendicular to the moving direction of the optical device.

The illumination device may include an object detection unit that detects an object existing in a predetermined illumination area illuminated by the optical device, wherein the timing control unit may control an incident timing of the coherent light beam from the coherent light source on the optical device or an illumination timing of the illumination area so that a region of the object detected by the object detection unit and the other region in the illumination area are illuminated in different illumination modes.

The object detection unit may include: an imaging device that images an inside of a predetermined illumination area illuminated by the optical device; and an image processing unit that performs image processing on an imaging result of the imaging device and recognizes an object in the predetermined illumination range illuminated by the optical device.

The object detection unit may include: a position information acquiring unit that acquires position information of a car in which the illumination device is disposed; a storage unit that stores the position information of the object; and an information processing unit that recognizes the object in the predetermined illumination area illuminated by the optical device based on the position information of the car acquired by the position information acquiring unit and the position information of the object stored in the storage unit.

The illumination device may include a handle rotation detection unit that detects rotation of a handle wheel of a car in which the illumination device is disposed, wherein the timing control unit may control an incident timing of the coherent light beam from the coherent light source on the optical device or an illumination timing of the illumination area based on rotation of the handle detected by the handle rotation detection unit.

The illumination device may include: an operation monitoring unit that monitors the operation of the scanning unit; and an auxiliary illumination unit that illuminates a predetermined illumination area illuminated by the optical device when an abnormal operation of the scanning unit is detected by the operation monitoring unit.

The auxiliary illumination unit may include: an auxiliary mirror disposed in an optical path between the coherent light source and the scanning unit when abnormal operation of the scanning unit is detected by the operation monitoring unit; and an auxiliary optical device that diffuses the coherent light beam and illuminates the illumination area, and the auxiliary mirror may cause the coherent light beam from the coherent light source to be incident on the auxiliary optical device.

The auxiliary optical device may illuminate the entire region of the illumination area by diffusion of the incident coherent light beam.

The auxiliary optical device may be a hologram recording medium.

The auxiliary illumination unit may include an auxiliary mirror disposed in an optical path between the coherent light source and the scanning unit when abnormal operation of the scanning unit is detected by the operation monitoring unit, and the auxiliary mirror may cause the coherent light beam from the coherent light source to be incident on the optical device.

The auxiliary illumination unit may have a light source different from the coherent light source.

Another aspect of the present invention provides an illumination device including: a coherent light source that emits coherent light beam; a beam diameter expansion member that expands a beam diameter of the coherent light beam; an optical device that diffuses coherent light beam having a widened beam diameter to illuminate a predetermined area; and an optical shutter that switches the transmittance of coherent light beam incident on the optical device or coherent light beam diffused by the optical device, wherein the optical device has a plurality of element diffusion regions that respectively diffuse coherent light beam, the optical shutter has a plurality of element shutter units corresponding to the plurality of element diffusion regions, and the plurality of element shutter units switches a transmittance of coherent light beam incident on a corresponding element diffusion region or coherent light beam diffused by a corresponding element diffusion region.

Still another aspect of the present invention provides an illumination device including: a coherent light source that emits coherent light beam, a diffusion unit that holds a plurality of diffusion elements that diffuses the coherent light beam, and a driving unit that moves the diffusing unit so that the plurality of diffusing devices sequentially reach an illumination position of the coherent light beam, wherein the plurality of diffusion elements illuminate respective partial regions in a predetermined area by diffusion of the incident coherent light beam, and at least parts of the partial regions illuminated by the plurality of diffusion devices are different from one another.

Still another aspect of the present invention provides an illumination device including: a coherent light source that emits coherent light beam, a diffusion device that diffuses the coherent light beam and illuminates a predetermined area; an optical scanning unit that scans the coherent light beam from the coherent light source on the diffusing device; an operation monitoring unit that monitors an operation of the optical scanning unit; and an auxiliary illumination unit that illuminates the predetermined area when an abnormal operation of the light scanning means is detected by the operation monitoring unit, wherein the diffusion device has a plurality of element diffusion regions, the plurality of element diffusion regions illuminate respective partial regions in the predetermined area by diffusion of incident coherent light beam, and at least parts of the partial regions illuminated by the plurality of element diffusion regions are different from one another.

Advantageous Effects

According to the present invention, it is possible to provide an illumination device that can arbitrarily change an illumination mode of an arbitrary area in an illumination area without complicating the configuration of the optical system.

DETAILED DESCRIPTION OF THE INVENTION

Figure 1:
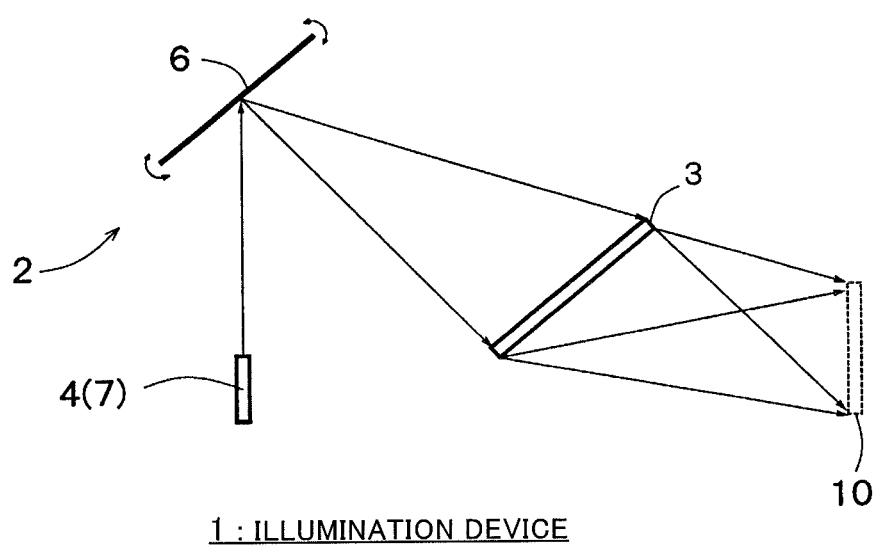
FIG. 1 is a view showing a schematic configuration of an illumination device according to a first embodiment of the present invention.

An embodiment of the present invention will be described below with reference to the drawings. In the drawings attached to the present specification, for ease of understanding and ease of understanding, the scales, the dimensional ratios in the length and breadth, and the like are appropriately changed from those of the actual ones and exaggerated.

In addition, terms, geometric conditions and degrees thereof to be used in the present specification, for example, terms such as "parallel", "orthogonal", "same" and the like, values of length, angle and the like are strict shall be interpreted including a range that can expect similar functions without being bound by meaning.

First Embodiment

FIG. 1 is a view showing a schematic configuration of an illumination device 1 according to the first embodiment of the present invention. The illumination device 1 in FIG. 1 includes an irradiation device 2 and an optical device 3. The irradiation device 2 includes a laser light source 4 and a scanning unit 6.

The laser light source 4 emits coherent light beam, that is, laser beam. The laser light source 4 may be provided with a plurality of light source units with different emission wavelength ranges, but may be configured to have one or more light source units that emit laser beam in a single wavelength range. In this embodiment, an example in which one or more light source units that emit laser beam in a single wavelength range is provided will be described.

The scanning unit 6 scans a plurality of laser beams emitted by the laser light source 4 on the optical device 3. The scanning unit 6 may move the laser light source 4 to cause the respective laser beams to scan on the optical device 3, the optical device 3 may be moved so that each laser beam is scanned on the optical device 3, and a light scanning device that changes a traveling direction of the laser beam from the laser light source 4 may be provided so that each laser beam is scanned on the optical device 3. The technical features of the scanning unit 6 are common to the following embodiments, but in each of the following embodiments, the scanning unit 6 mainly includes a light scanning device, and the sign of the light scanning device is referred to as "6".

The light scanning device 6 varies the traveling direction of the laser beam from the laser light source 4 with the lapse of time so that the traveling direction of the laser beam does not become constant. As a result, the laser beam emitted from the light scanning device 6 is scanned on the incident surface of the optical device 3.

Figure 2:
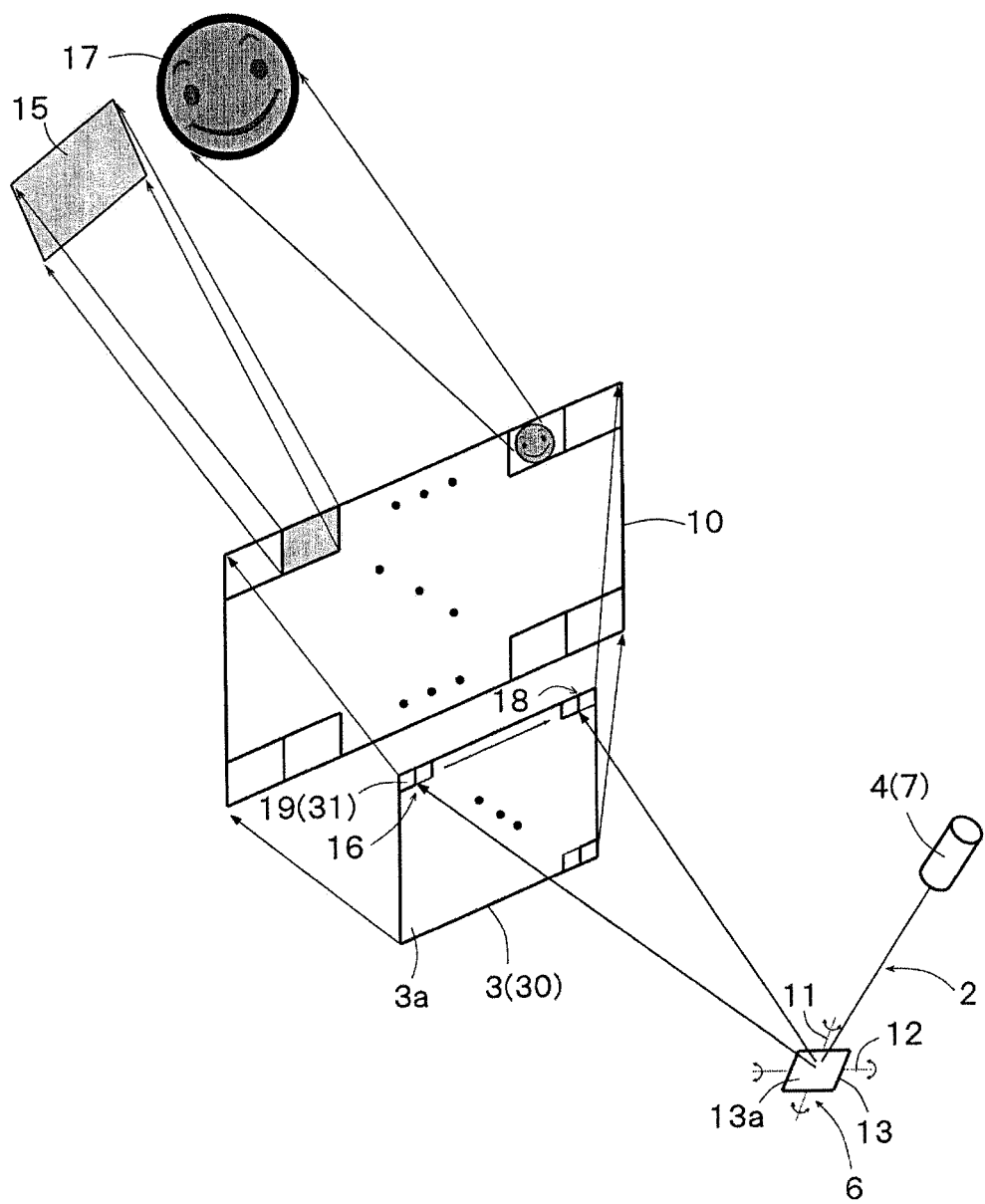
FIG. 2 is a view showing a light scanning device.

As shown in FIG. 2, for example, the light scanning device 6 has a reflective device 13 that is rotatable around two rotating axes 11, 12 extending in mutually intersecting directions. The laser beam from the laser light source 4 incident on a reflecting surface 13a of the reflective device 13 is reflected at an angle corresponding to an inclination angle of the reflecting surface 13a and travels toward an incident surface 3a of the optical device 3. By rotating the reflective device 13 around the two rotation axes 11 and 12, the laser beam is scanned on the incident surface 3a of the optical device 3 two-dimensionally. Since the reflective device 13 repeats the operation of rotating around the two rotation axes 11 and 12 at a constant period, for example, the laser beam is repeatedly two-dimensionally scanned on the incident surface 3a of the optical device 3 in synchronization with this period. In the case where the optical device 3 extends mainly in a one-dimensional direction, the optical device 3 may perform one-dimensional scanning along the longitudinal direction of the optical device 3.

The optical device 3 has the incident surface 3a on which the laser beam is incident, and diffuses the laser beam incident on the incident surface 3a to illuminate a predetermined area. More specifically, the laser beam diffused by the optical device 3 passes through an illumination zone 10 and then illuminates a predetermined area.

Here, the illumination zone 10 in FIG. 2 is an illumination zone of a near field illuminated by overlapping each diffusion region 14 in the optical device 3. The illumination area of a far field is often expressed as a diffusion angle distribution in an angular space rather than the dimension of the actual illumination zone. In the present specification, the term "illumination zone" includes a diffusion angle area in the angular space in addition to the actual illumination zone (illumination area). Therefore, the predetermined area illuminated by the illumination device in FIG. 1 can be a much wider area than the illumination zone 10 of the near field shown in FIG. 1. As will be described later, the first area 15 and the second area 17 are included in the predetermined area. The first area 15 and the second area 17 may be arranged so as not to overlap with each other, or may be arranged so that at least a part thereof overlaps. At least one of the first area 15 and the second area 17 may be provided at a plurality of locations.

As shown in FIG. 2, the optical device 3 has a first diffusion region 16 for illuminating the first area 15 and a second diffusion region 18 for displaying predetermined information in the second area 17. The first area 15 and the second area 17 are areas illuminated by the laser beam passing through the illumination zone 10 in FIG. 1, and are provided, for example, on the ground.

At least one of the first diffusion region 16 and the second diffusion region 18 in the optical device 3 may be further divided into a plurality of element diffusion regions 19 finely. FIG. 2 shows an example in which each of the first diffusion region 16 and the second diffusion region 18 is divided into the plurality of element diffusion regions 19, but this is merely an example. The simplest configuration is the case where the optical device 3 has the first diffusion region 16 including one element diffusion region 19 and the second diffusion region 18 including another element diffusion region 19.

The laser beam from the light scanning device 6 is scanned on the optical device 3. More specifically, the light scanning device 6 sequentially scans each element diffusion region 19 in the first diffusion region 16 and the second diffusion region 18. Each element diffusion region 19 in the first diffusion region 16 illuminates a partial region in the first area 15. When the first diffusion region 16 has only one element diffusion region 19, this element diffusion region 19 illuminates the entire region of the first area 15. In some cases, each of the two or more element diffusion regions 19 included in the first diffusion region 16 may be illuminated while overlapping the entire region of the first area 15. On the other hand, each element diffusion region 19 in the second diffusion region 18 displays information in the second area 17. When the second diffusion region 18 has only one element diffusion region 19, this element diffusion region 19 displays all the information of the second area 17. In the case where the plurality of element diffusion regions 19 are included in the second diffusion region 18, each element diffusion region 19 may share and display one piece of information in the second area 17, and each element diffusion region 19 may display separate information in the second area 17.

The illumination of the first area 15 may illuminate the entire region in the first area 15 with a uniform illuminance or illumination may be performed with nonuniform illuminance which varies depending on places. For example, the central portion of the first area 15 may be brightest and may be darker as it goes away from the center.

The information displayed in the second areas 17 is one in which at least one of hue, brightness and saturation is changed in the second area 17. More specifically, the information displayed in the second area 17 is, for example, at least one of a picture, a pattern, a letter, a number and a symbol, and the specific content of the information is not particularly limited. The information display in the second area 17 is performed, for example, for the purpose of imparting design and decorativeness, the purpose of calling attention, the purpose of guidance display, the purpose of advertisement publicity, and the like. In addition, although the information displayed in the second area 17 may be monochrome (monochrome) or multiple colors (color), in the present embodiment, an example of displaying information in a single color will be described.

The optical device 3 is configured using, for example, the hologram recording medium 30. As shown in FIG. 2, the hologram recording medium 30 has a plurality of element hologram areas 31 corresponding to the plurality of element diffusion regions 19. In each element hologram area 31, an interference fringe pattern is formed. When the laser beam from the light scanning device 6 is incident on the interference fringe pattern, the laser beam is diffracted by the interference fringe pattern, passes through the illumination zone 10, and illuminates the first area 15 and the second area 17.

In the element hologram area 31 in the first diffusion region 16, the interference fringe pattern corresponding to the element hologram area 31 is formed in advance so that the laser beam diffracted by the element hologram area 31 illuminates the first area 15. In the element hologram area 31 in the second diffusion region 18, the interference fringe pattern corresponding to the element hologram area 31 is formed in advance so that the laser beam diffracted by the element hologram area 31 displays information in the second area 17.

By appropriately forming the appropriate interference fringe pattern in each element hologram area 31 in the hologram recording medium 30 in this manner, the illumination of the first area 15 and the information display of the second area 17 can be performed by the laser beam diffracted at each element hologram area 31.

More specifically, the position, size and shape of the first area 15 can be arbitrarily set by adjusting the interference fringe pattern formed in the element hologram area 31 for the first diffusion region 16. Similarly, by adjusting the interference fringe pattern formed in the element hologram area 31 for the second diffusion region 18, the position of the second area, and the type and size of the information displayed in the second area 17 can be arbitrarily set.

The laser beam incident on each point in each element hologram area 31 illuminates the corresponding first area 15 or second area 17. Further, the light scanning device 6 changes incident position and incident angle of the laser beam incident on the respective element hologram areas 31 with the lapse of time. The laser beam incident into one element hologram area 31 illuminates the common first area 15 or the second area 17 even if the laser beam is incident on any position in the element hologram area 31. That is, this means that the incident angle of the laser beam incident on each point of a partial region 10a changes with the lapse of time. This change in the incident angle is a speed that cannot be resolved by the human eye, and as a result, the scattering pattern of the coherent light beam having no correlation is multiplexed and observed in the human eye. Therefore, the speckle generated corresponding to each scattering pattern is overlapped and averaged, and is observed by the observer. As a result, in the illumination zone 10, speckle becomes less conspicuous. In addition, since the laser beam from the light scanning device 6 sequentially scans each of the element hologram areas 31 on the hologram recording medium 16, the laser beams diffracted at each point in each element hologram area 31 have different wave fronts; therefore, since these laser beams are individually superimposed on the illumination zone 10, a uniform illuminance distribution in which the speckle is inconspicuous can be obtained in the illumination zone 10.

In FIG. 2, the shape of the element hologram area 31 is rectangular, but the shape of the element hologram area 31 is arbitrary. The shapes and sizes of the first area 15 and the second area 17 illuminated by the laser beam diffused in the element hologram area 31 depend on the type of the interference fringe pattern formed in the element hologram area 31 and do not depend on the shape and size of the element hologram area 31. Therefore, the shape and size of the element hologram area 31 may be arbitrary. However, it is necessary for the element hologram area 31 to have a size and shape capable of scanning laser beam.

Figures 3A, 3B:
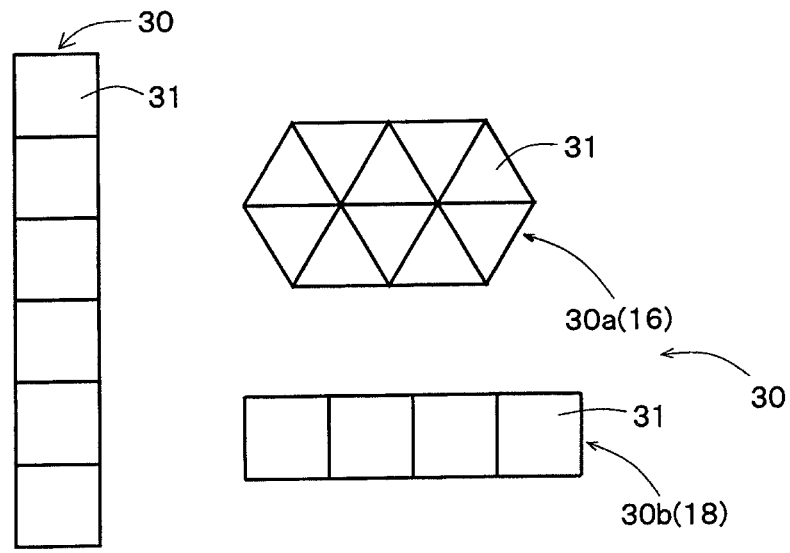
FIGS. 3A and 3B are views showing specific examples of a hologram recording medium.

Also, the arrangement direction of the element hologram areas 31 is also arbitrary. For example, FIG. 3A shows an example of the hologram recording medium 30 in which a plurality of element hologram areas 31 are arranged adjacent to each other in the vertical direction. In addition, FIG. 3B show an example in which the hologram recording medium 30 is configured by an element hologram area group 30a in which the triangular element hologram areas 31 are arranged without gaps and an element hologram area group 30b in which the plurality of element hologram areas 31 are arranged adjacently in the horizontal direction. In FIG. 3B, for example, one of the two element hologram area groups 30a and 30b corresponds to the first diffusion region 16 and the other corresponds to the second diffusion region 18.

The illumination of the first area 15 and the information display of the second area 17 can be performed on either hologram recording medium 30 in FIG. 3A or FIG. 3B. That is, the arrangement and shape of each element hologram area 31 in the hologram recording medium 30 are arbitrary, and by adjusting the interference fringe pattern formed in each element hologram area 31, the illumination of the first area 15 and the information display of the second area 17 can be performed.

Figure 4:
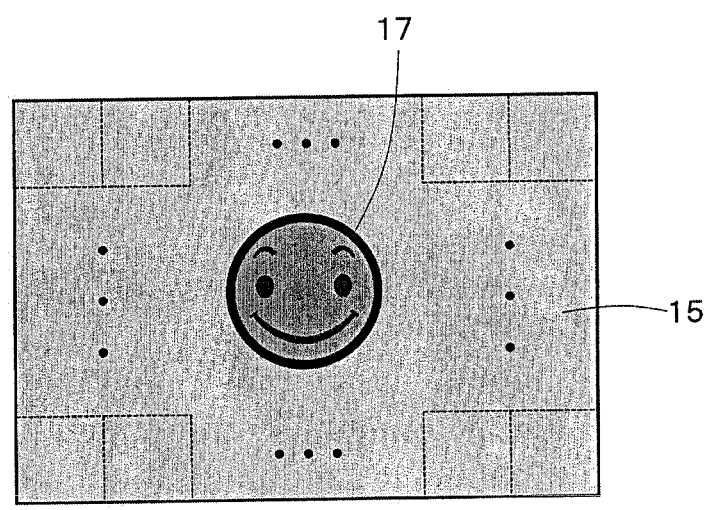
FIG. 4 is a view showing an example in which a first area and a second area overlap.

FIG. 2 shows an example in which the first area 15 and the second area 17 are provided at different locations, but the second area 17 may be provided in the first area 15 as shown in FIG. 4. In the case of FIG. 4, the information of the second area 17 is displayed inside the illumination area in the first area 15. As described above, where to set the first area 15 and the second area 17 can be arbitrarily adjusted depending on the type of the interference fringe pattern formed in each element hologram area 31.

FIG. 4 shows an example in which each element hologram area 31 in the first diffusion region 16 illuminates a partial region (a rectangle surrounded by a broken line in FIG. 4) in the first area 15, and the aggregate of these partial regions illuminates the first area 15. This is only an example, and as described above, each element hologram area 31 may illuminate the entire region of the first area 15 in an overlapping manner, and a part of the element hologram area 31 may illuminate different partial regions and the remaining element hologram area 31 may illuminate the same partial region in an overlapped manner. When a plurality of element hologram areas 31 illuminate a common area in an overlapping manner, the illumination illuminance of that area increases; therefore, an area to be illuminated while being overlapped and area to be illuminated while not being overlapped are mixed, so that a pattern and picture can be displayed.

Each of the element hologram areas 31 for the first diffusion region 16 can be produced by using, for example, scattered light from a real scattering plate as object light. More specifically, when the hologram photosensitive material which is the base of the hologram recording medium 30 is illuminated with reference light and object light made of coherent light beam having coherency with each other, an interference fringe pattern due to interference of these light beams is formed on the hologram photosensitive material, and the hologram recording medium 30 is manufactured. A laser beam which is coherent light beam is used as the reference light, and scattered light of an isotropic scattering plate which is available at low cost, for example, is used as the object light.

By illuminating the hologram recording medium 30 with a laser beam from the focal position of the reference light used for manufacturing the hologram recording medium 30, a reproduced image of the scattering plate is generated at the arrangement position of the scattering plate which is the source of the object light used in manufacturing the hologram recording medium 30. When the scattering plate which is the source of the object light used for manufacturing the hologram recording medium 30 has uniform surface scattering, a reproduced image of the scattering plate obtained by the hologram recording medium 30 is also a uniform plane illumination, and a region where the reproduced image of this scattering plate is generated is the illumination zone 10.

In each element hologram area 31 for the second diffusion region 18, which displays information in the second area 17 in the hologram recording medium 30, it is possible to form an interference fringe pattern by the same procedure as described above by using the scattering plate on which an information image is formed in advance.

In the hologram recording medium 30 according to the present embodiment, it is necessary to perform illumination in the first area 15 and information display in the second area 17, so that the interference fringe pattern becomes complicated. Without using actual object light and reference light, such a complicated interference fringe pattern can be designed using a computer based on the scheduled wavelength and incident direction of the reconstruction illumination light and the shape and position of the image to be reproduced. The hologram recording medium 30 thus obtained is also called a computer generated hologram (CGH). In addition, a Fourier transform hologram having the same diffusion angle characteristic at each point on each element hologram area 31 may be formed by computer synthesis. Furthermore, an optical member such as a lens may be provided on the rear side of the optical axis of the illumination zone 10 to set the size and position of the actual illumination area.

One advantage of providing the hologram recording medium 30 as the optical device 3 is that the optical energy density of the laser beam can be reduced by diffusion, and in addition, another advantage is that since the hologram recording medium 30 can be used as a directivity surface light source, the luminance on the light source surface for achieving the same illuminance distribution can be reduced compared with the conventional lamp light source (point light source). This can contribute to improving the safety of the laser beam, and even if the laser beam having passed through the illumination zone 10 is viewed directly with a human eye, there is less possibility of adversely affecting the human eye as compared with the case of looking directly at a single point light source.

FIG. 1 shows an example in which the laser beam from the light scanning device 6 diffuses through the optical device 3, but the optical device 3 may diffuse and reflect the laser beam. For example, when the hologram recording medium 30 is used as the optical device 3, the hologram recording medium 30 may be a reflection type or a transmission type. Generally, the reflection type hologram recording medium 30 (hereinafter, reflection type holo) has high wavelength selectivity as compared with the transmission type hologram recording medium 30 (hereinafter, transmission type holo). That is, even when the interference fringe pattern corresponding to different wavelengths is laminated the reflection type holo can diffract coherent light beam of a desired wavelength only in a desired layer. Also, the reflection type holo is superior in that it is easy to remove the influence of zero order light. On the other hand, the transmission type holo has a wide diffractable spectrum and a wide tolerance of the laser light source 4; however, when the interference fringe pattern corresponding to different wavelengths is laminated, coherent light beam of a desired wavelength is diffracted even in a layer other than the desired layer. Therefore, in general, it is difficult to form a transmission type holo with a laminated structure.

As a specific form of the hologram recording medium 30, a volume hologram recording medium 30 using a photopolymer may be used, a volumetric hologram recording medium 30 of a type that performs recording using a photosensitive medium containing a silver salt material may be used, and a relief type (emboss type) hologram recording medium 30 may be used.

The specific form of the optical device 3 is not limited to the hologram recording medium 30, and may be various diffusion members that can be finely divided into the plurality of element diffusion regions 19. For example, the optical device 3 may be configured using a lens array group in which each element diffusion region 19 is a single lens array. In this case, a lens array is provided for each element diffusion region 19, and the shape of each lens array is designed so that each lens array illuminates the partial region 10a in the illumination zone 10. At least a part of the position of each partial region 10a is different. As a result, as in the case of configuring the optical device 3 using the hologram recording medium 30, it is possible to perform the illumination of the first area 15 and the information display of the second area 17.

For example, when the information on the arrow is displayed using the lens array as each element diffusion region 19 for the second diffusion region 18, the outer shape of the lens array may be an arrow shape. In this manner, by machining the outer shape of the lens array to an arbitrary shape, an orientation distribution for arbitrary information can be formed by each lens array.

Furthermore, the optical device 3 may be formed by combining the hologram recording medium 30 and the lens array. That is, one of the first diffusion region 16 and the second diffusion region 18 may be configured by the hologram recording medium 30, and the other may be formed of a lens array group.

As described above, in the first embodiment, since the illumination of the first area 15 and the information display of the second area 17 are performed using the coherent light beam, it is possible to display desired information at an arbitrary location while illuminating a portion requiring illumination. Therefore, in addition to the original lighting function, it is possible to provide the illumination device 1 taking into consideration the functions such as the designability, decorativeness, practicality and the like by information display.

Further, the light scanning device 6 scans laser beam in each element diffusion region 19, and the laser beam incident on each point in each element diffusion region 19 illuminates a part or the entire region of the corresponding first area 15 or second area 17; therefore, the incident angle of the laser beam in the first area 15 or the second area 17 changes with the lapse of time, so that a speckle in the first area 15 or the second area 17 is less noticeable.

Second Embodiment

In the second embodiment described below, the timing of the laser beam from the laser light source 4 is controlled.

Figure 5:
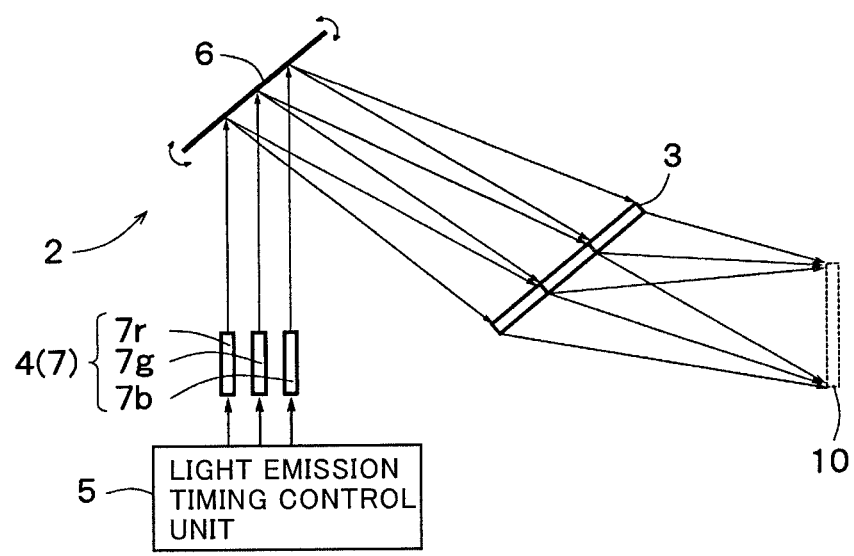
FIG. 5 is a view showing a schematic configuration of an illumination device according to a second embodiment of the present invention.

FIG. 5 is a view showing a schematic configuration of the illumination device 1 according to a second embodiment of the present invention. The illumination device 1 of FIG. 5 is different from FIG. 1 in that the timing control unit 5 is provided inside the irradiation device 2. Further, the laser light source 4 in FIG. 5 has the plurality of light source units 7 that emit the plurality of coherent light beams, i.e., laser beams having different emission wavelength ranges. The plurality of light source units 7 may be provided individually or may be a light source module in which the plurality of light source units 7 are arranged side by side on a common substrate. It is sufficient that the laser light source 4 of the present embodiment has at least two light source units 7 having different emission wavelength ranges, and the number of types of emission wavelength ranges may be two or more. In order to increase the emission intensity, the plurality of light source units 7 may be provided for each emission wavelength range.

For example, in the case where the laser light source 4 has a light source unit 7r in a red emission wavelength range, a light source unit 7g in a green emission wavelength range, and a light source unit 7b in a blue emission wavelength range, white illumination light can be generated by overlapping the three laser beams emitted from the light source units 7.

In the second embodiment, it is not indispensable to provide the plurality of light source units 7 having different emission wavelength ranges, and as in the first embodiment, one or more light source units 7 emitting laser beam in a single wavelength range may be provided. Hereinafter, an example in which the plurality of light source units 7 having different emission wavelength ranges are provided will be described.

The timing control unit 5 individually controls the incident timing of the plurality of coherent light beams to the optical device 3 or the illumination timing of the illumination zone (illumination area) 10. The timing control unit 5 may control the light emission timing from the laser light source 4, the incident timing of the laser beam incident on the optical device 3 may be controlled, or the illumination timing at which the laser beam diffused by the optical device 3 illuminates the illumination area may be controlled. The timing control unit 5 synchronizes the scanning timing of the laser beam (coherent light beam) by the light scanning device 6 so that the illumination mode of the illumination zone (illumination area) 10 periodically or temporarily changes, and controls the light emission timing of each laser beam, the incident timing to the optical device 3, or the illumination timing of the illumination area. Although the above-described technical features of the timing control unit 5 are common in each of the following embodiments, in each of the following embodiments, an example in which the timing control unit 5 controls the light emission timing from the laser light source 4 is mainly described.

The timing control unit 5 controls whether or not to scan the coherent light beam from the light scanning device 6 with at least one of the first diffusion region 16 and the second diffusion region 18. For example, the timing control unit 5 may continuously scan the first diffusion region 16 and switch whether or not to scan at least a part of the second diffusion region 18. As a result, the first area 15 is constantly illuminated, and the second area 17 can display information only when necessary. Alternatively, conversely, the timing control unit 5 may switch whether or not to scan at least a part of the first diffusion region 16, and may continuously scan the second diffusion region 18.

The timing control unit 5 individually controls the timing of the plurality of laser beams having different emission wavelength ranges. That is, when the plurality of light source units 7 are provided corresponding to a plurality of laser beams having different emission wavelength ranges, the timing control unit 5 controls the timing at which the laser beams are individually emitted from the plurality of light source units 7. As described above, when the laser light source 4 is capable of emitting three laser beams of red, blue, and green, by controlling the timing of each laser beam, it is possible to generate illumination light of a color in which arbitrary one or more colors of red, blue and green are mixed.

The timing control unit 5 may control whether or not to emit laser beam from each light source unit 7, that is, on/off of light emission, and may switch whether or not to guide the laser beam emitted from each light source unit 7 to the incident surface of the light scanning device 6. In the latter case, an optical shutter unit (not shown) is provided between each light source unit 7 and the light scanning device 6, and the passing/blocking of laser beam is switched by the optical shutter unit.

Figure 6:
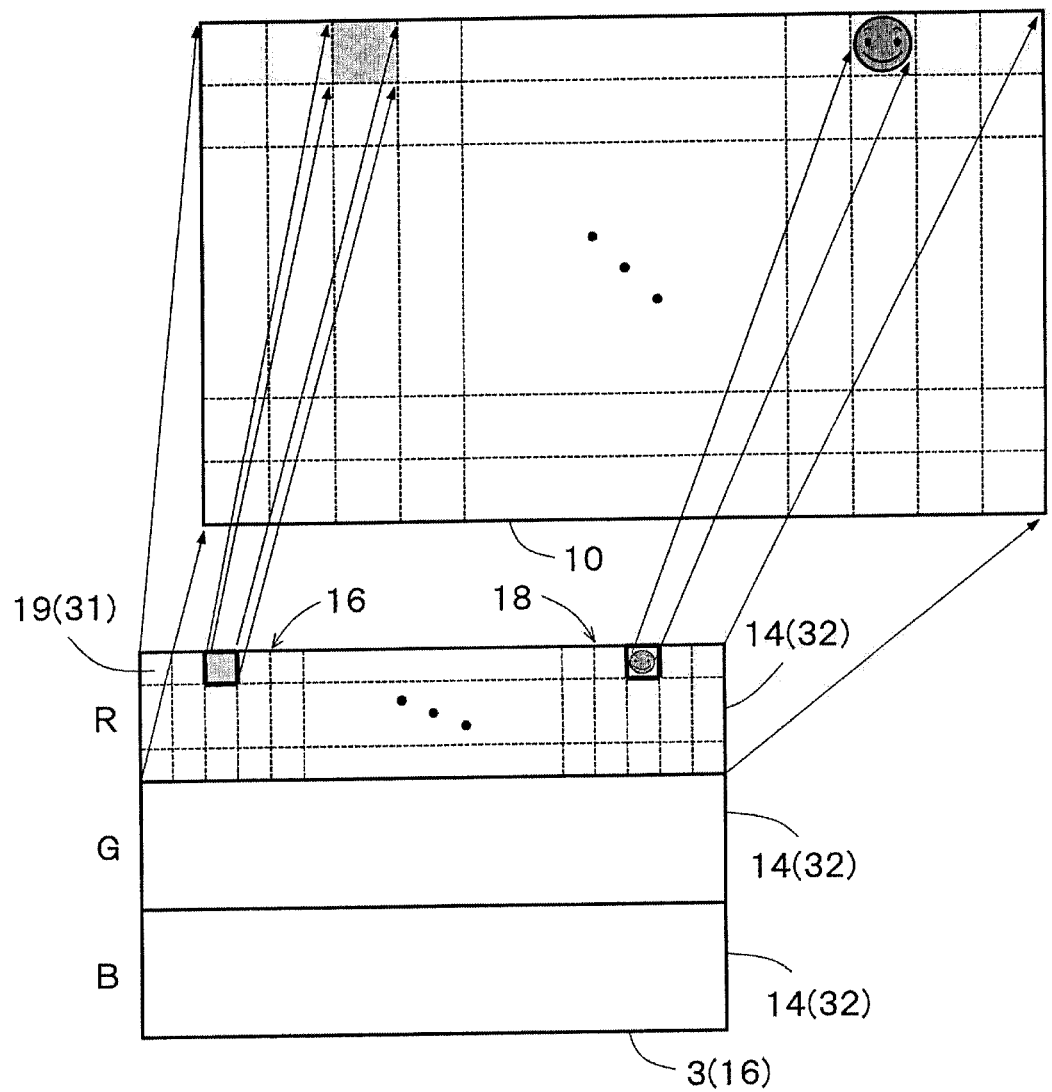
FIG. 6 is a view showing how a laser beam diffused by an optical device 3 is incident on an illumination zone.

FIG. 6 is a view showing how the laser beam diffused by the optical device 3 is incident on the illumination zone 10. The optical device 3 has a plurality of diffusion region parts 14 corresponding to the plurality of laser beams. Corresponding laser beam is incident on each diffusion region part 14. Each of the diffusion region parts 14 includes the first diffusion region 16 and the second diffusion region 18 as in the first embodiment. The arrangement order of the first diffusion region 16 and the second diffusion region 18 in each diffusion region part 14 is arbitrary and the ratio between the first diffusion region 16 and the second diffusion region 18 in each diffusion region part 14 is also arbitrary.

Each diffusion region part 14 diffuses the incident laser beam and illuminates the entire region of the illumination zone 10. Each diffusion region part 14 has the plurality of element diffusion regions 19. Each element diffusion region 19 diffuses the incident laser beam and illuminates a partial region in the illumination zone 10. At least a part of the partial region differs for each element diffusion region 19.

The optical device 3 is configured using, for example, the hologram recording medium 30. The hologram recording medium 30 has, for example, as shown in FIG. 6, a plurality of hologram areas 32. Each of the hologram areas 32 is provided corresponding to each of the plurality of laser beams having different emission wavelength ranges. The laser beams incident on the incident surface of each hologram area 32 are diffused to illuminate the illumination zone 10. For example, when the hologram recording medium 30 has three hologram areas 32, the laser beam diffused in each hologram area 32 illuminates the entire region of the illumination zone 10.

FIG. 6 shows an example in which three hologram areas 32 corresponding to three diffusion region parts 14 are provided in association with three laser beams that emit light in red, blue, or green. However, the hologram recording medium 30 according to the present embodiment may have two or more hologram areas 32 in association with two or more laser beams having different emission wavelength ranges. As shown in FIG. 6, when the hologram recording medium 30 has three hologram areas 32 corresponding to three laser beams that emit light in red, blue, or green, each hologram area 32 illuminates the entire region of the illumination zone 10, so that when the three laser beams emit light, the illumination zone 10 is illuminated with white light.

The size, that is, the area of each hologram area 32 in the hologram recording medium 30 is not necessarily the same. Even if the sizes of the respective hologram areas 32 are different, by individually adjusting the interference fringe pattern formed on the incident surface 17a of each hologram area 32, each hologram area 32 can illuminate the common illumination zone 10.

Each of the plurality of hologram areas 32 has the plurality of element hologram areas 31. Each element hologram area 31 is the first diffusion region 16 or the second diffusion region 18. Each element hologram area 31 illuminates the partial region 10a in the illumination zone 10 by diffusing the incident laser beam. At least a part of the partial region illuminated by each element hologram area 31 is different for each element hologram area 31. That is, the partial regions 10a illuminated by the different element hologram areas 31 are at least partially different from each other.

The partial region illuminated by the element hologram area 31 corresponding to the first diffusion region 16 illuminates the first area 15 after passing through the illumination zone 10. The partial region illuminated by the element hologram area 31 corresponding to the second diffusion region 18 displays information in the second area 17 after passing through the illumination zone 10.

Since the illumination device 1 according to the present embodiment has the timing control unit 5, at least one of the illumination of the first area 15 and the information display of the second area 17 can be performed at an arbitrary timing. In addition, by controlling the scanning timing of the laser beam in an arbitrary hologram area out of the hologram areas provided for each color, it is possible to change the illumination color of part of the illumination area illuminated by the laser beam passing through the illumination zone 10 or to perform illumination control so as not to illuminate only a part of the illumination area as needed.

In the above example, the timing of at least one of the illumination of the first area 15 and the information of the second area 17 is switched or the illumination color is changed by the timing; however, another method for changing the illumination mode of a part of the illumination zone 10 is conceivable. For example, when the laser light source 4 has a plurality of light source units 7 that emit light in the same emission wavelength range, the light emission of a part of the light source units 7 may be stopped so that the illumination intensity of a part of the inside of the illumination zone 10 is lower than the illumination intensity of the surrounding area. Conversely, a part of the illumination intensity in the illumination zone 10 may be higher than the surrounding illumination intensity. In addition, a part of the inside of the illumination zone 10 may be illuminated with flashing. Alternatively, a part of the color in the illumination zone 10 may be changed continuously or intermittently.

Figure 7:
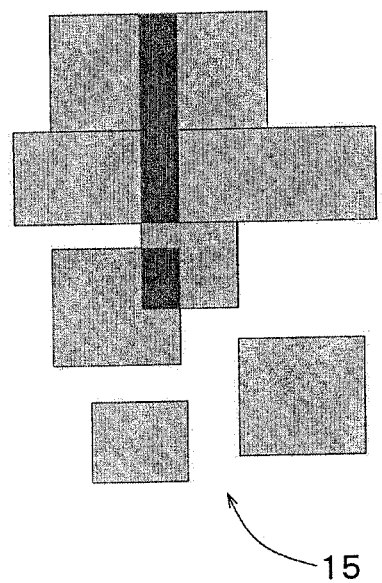
FIG. 7 is a view showing an example in which parts of rectangular illumination areas in a first area overlap with each other.

At least a part of the illumination area illuminated by the element hologram areas 31 corresponding to the first diffusion region 16 in the first area 15 may be overlapped. FIG. 7 shows an example in which parts of rectangular illumination areas in the first area 15 overlap with each other. When a part of each illumination area illuminated by each element hologram area 31 overlaps, the illuminance of the overlapped part is higher; therefore, even if the illumination color is the same, it becomes more conspicuous. By designing the shapes and sizes of overlapping parts, it is also possible to impart aesthetic design.

Figure 8:
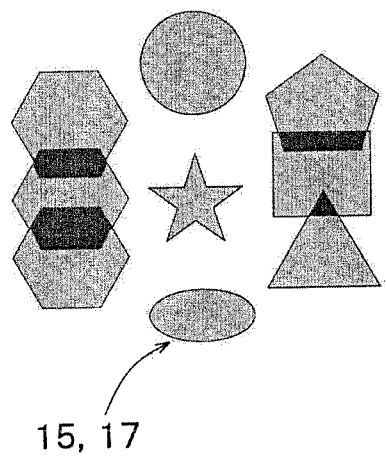
FIG. 8 is a view showing an example in which a plurality of kinds of shapes of illumination areas illuminated by each element hologram area are provided.

Furthermore, the shape of the illumination area illuminated by each element hologram area 31 is arbitrary. FIG. 8 is a view showing an example in which a plurality of kinds of shapes of illumination areas illuminated by each element hologram area 31 are provided. By combining a plurality of illumination areas such as a polygon, a circle, a star, and the like, it is possible to have designability and decorativeness. Further, as shown in FIG. 8, by overlapping some illumination areas with FIG. 7, a part of the illumination area can be made conspicuous. It should be noted that FIG. 8 is applicable to any of the illumination shapes of the first area 15 and the second area 17.

Figures 9A, 9B:
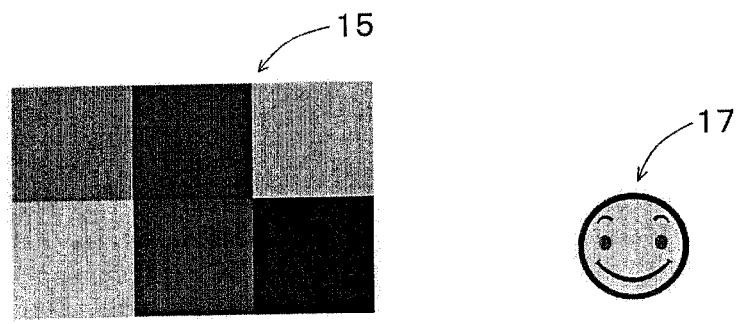
FIGS. 9A and 9B illuminate one illumination area with plural colors.

Further, as shown in FIG. 9, by displaying one illumination area with a plurality of colors, more design and decorativeness can be provided. FIG. 9A shows an example in which the illumination of the first area 15 is performed with a plurality of colors, and FIG. 9B shows an example in which the information display of the second area 17 is performed with a plurality of colors.

In this way, in the second embodiment, the timing control unit 5 can arbitrarily control the timing of the laser beam scanning the optical device 3. Therefore, at least one of the illumination of the first area 15 and the information display of the second area 17 can be performed at an arbitrary timing. It is also possible to switch at least one of the illumination mode of the first area 15 and the illumination mode of the information display of the second area 17 at an arbitrary timing.

Third Embodiment

The third embodiment described below changes the illumination mode of the object existing in the illumination zone 10.

Figure 10:
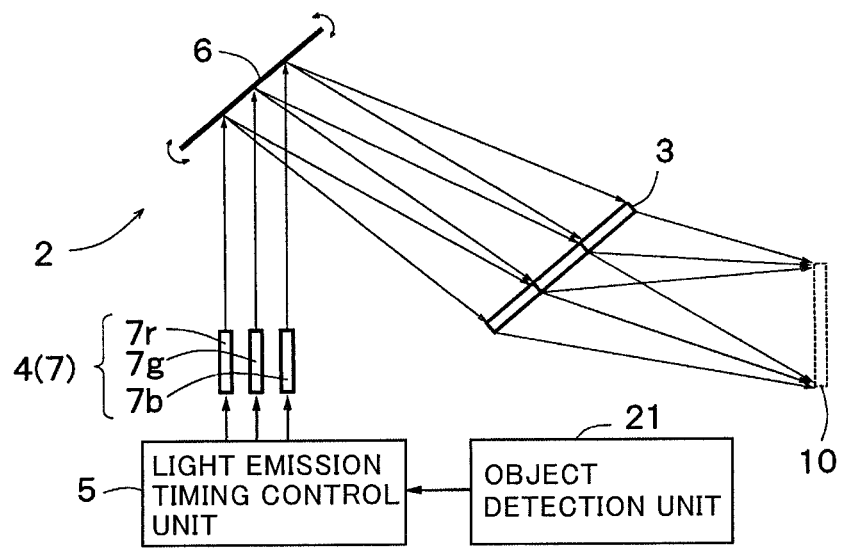
FIG. 10 is a view showing a schematic configuration of an illumination device according to a third embodiment of the present invention.
Figure 11:
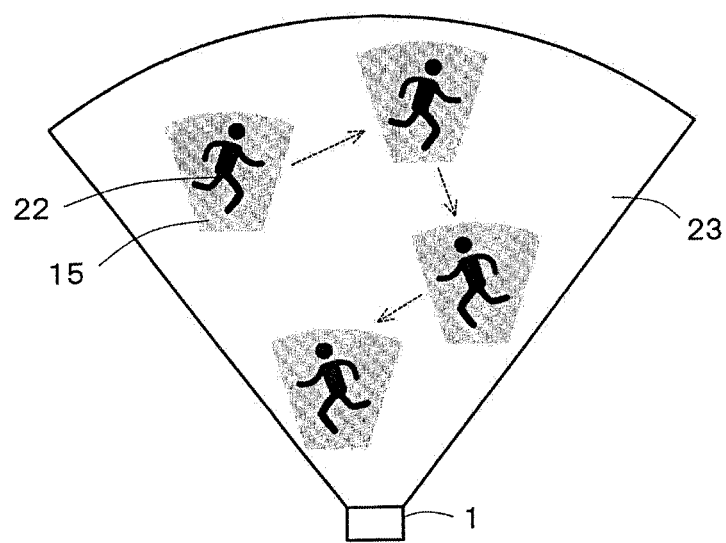
FIG. 11 is a view showing an illumination area illuminated by the illumination device in FIG. 10.
Figure 12:
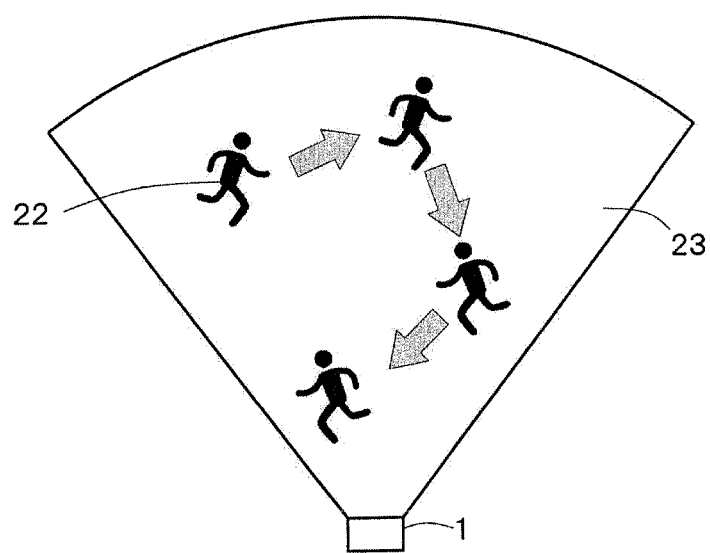
FIG. 12 is a view showing an example of performing illumination so as to avoid an object.

FIG. 10 is a view showing a schematic configuration of the illumination device 1 according to a third embodiment of the present invention, FIG. 11 and FIG. 12 are views showing the illumination area illuminated by the illumination device 1 in FIG. 10. The illumination device 1 in FIG. 10 includes an object detection unit 21 in addition to the configuration of the illumination device 1 in FIG. 1. The object detection unit 21 detects an object 22 existing in a predetermined area 23 illuminable by the optical device 3. That is, the object detection unit 21 detects the object 22 existing in the illumination area 23 that can be illuminated by the laser beam passing through the illumination zone 10 in FIG. 10. The object 22 is a human being, a vehicle, an organism, and the like, and the object may be a moving body or a stationary body.

The object detection unit 21 may be a sensor that optically detects the object 22. For example, an infrared ray is applied from the sensor to the illumination zone 10, and the presence or absence of the object 22 and the position and size of the object 22 may be detected depending on whether or not the reflected light is detected in a predetermined time by the sensor. Alternatively, the image of the illumination zone 10 may be captured by a camera, and the captured image may be analyzed by image recognition such as pattern matching to detect the presence or absence of the object 22 and the position and size of the object 22.

When the object detection unit 21 detects the object 22, the timing control unit 5 controls the timing of the plurality of light source units 7 according to the position and the size of the object 22. More specifically, the timing control unit 5 controls the scanning timing of the laser beam in the first diffusion region 16 so as to illuminate only the periphery of the object 22.

FIG. 11 shows an example in which the position of the first area 15 is moved in accordance with the movement of the object 22 so that the periphery of the object 22 is illuminated. The arrow line in FIG. 11 indicates the movement path of the object 22.

Thus, according to the third embodiment, it is possible to illuminate the periphery of the object 22 while constantly tracking the object 22. FIG. 11 shows an example in which the object 22 is always illuminated with the same color, but the object 22 may be illuminated with different colors according to the position of the object 22. Changing the illumination color can be also realized by the timing control unit 5 controlling the timing of the plurality of light source units 7 individually.

FIG. 12 shows an example of illuminating so as to avoid the object 22, contrary to FIG. 11. For example, FIG. 12 can be used to grasp the movement path of the object 22 by illuminating the path through which the object 22 has passed. Also in the case of FIG. 12, in accordance with the position of the object 22 detected by the object detection unit 21, by controlling the scanning timing of the laser beam scanning the first diffusion region 16 by the timing control unit 5, it is possible to perform illumination so as to avoid the object 22 by moving the first area 15 in accordance with the movement of the object 22. Also in FIG. 12, illumination with different colors may be performed depending on the position of the object 22.

The method of changing the illumination mode according to the position of the object 22 detected by the object detection unit 21 is not limited to the example shown in FIG. 11 and FIG. 12. For example, a direction in which the object 22 moves may be predicted, and an area where the object 22 may move may be illuminated. In addition, information on the second area 17 may be displayed at and around the position of the object 22.

As described above, in the third embodiment, since the illumination of the first area 15 or the information display of the second area 17 is performed in accordance with the movement of the object 22, it becomes easy to grasp the moving position of the object 22, and it is also possible to continuously provide desired information to the moving object 22.

Fourth Embodiment

In the fourth embodiment described below, at least one of the illumination of the first area 15 and the information display of the second area 17 is performed when an event occurs.

Figure 13:
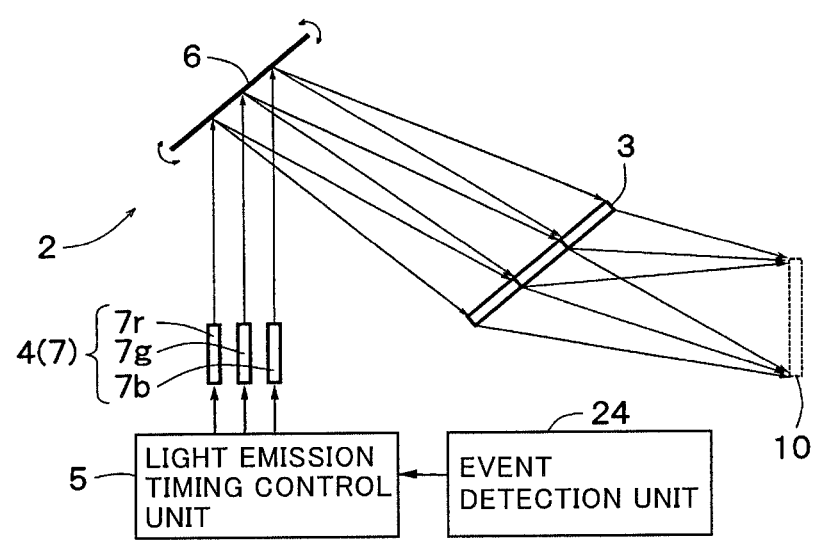
FIG. 13 is a view showing a schematic configuration of an illumination device according to a fourth embodiment of the present invention.

FIG. 13 is a view showing a schematic configuration of the illumination device 1 according to a fourth embodiment of the present invention. The illumination device 1 in FIG. 13 is provided with an event detection unit 24 in the illumination device 1 in FIG. 5. The event detection unit 24 detects occurrence of a specific event. Here, the specific event is, for example, in the case of the illumination device 1 for a vehicle, a case where the vehicle engine is turned on or off, a case where the door is opened and closed, and the like. When such a specific event occurs, the timing control unit 5 controls the timing of the plurality of light emitting units 7.

Thus, in the case where the illumination device 1 is a vehicle headlight, for example, while the vehicle is moving, the first area 15 is illuminated and the illumination device 1 is used for normal lighting purposes, and when the vehicle is stopped, the information of the second area 17 can be displayed with the headlight. Although the information to be displayed is arbitrary, for example, if a brand name, manufacturer name, vehicle type name etc. of the vehicle is displayed as information, it also becomes a publicity of the vehicle, thereby giving superiority to the owner of the vehicle.

In addition to the headlight, if the illumination device 1 is provided around the door of the vehicle, when an event that the door is opened occurs, illumination and information display that catches passenger's eyes can be performed near a place where a passenger gets off the vehicle, thereby creating a high-class feeling of the vehicle.

As described above, in the fourth embodiment, when an event occurs, in order to perform at least one of the illumination of the first area 15 and the information display of the second area 17 or to switch the illumination and information display, illumination can be performed for the purposes of advertisement promotion, attention calling, design improvement, and the like. It should be noted that both the object detection unit 21 and the above-described event detection unit 24 in the third embodiment may be provided.

The vehicle equipped with the illumination device 1 according to the first to fourth embodiments is not necessarily limited to a car, and may be various moving bodies such as aircraft and other flying objects, trains, or ships. In addition, the illumination device 1 is not limited to being mounted on a vehicle, and may be installed at an arbitrary place.

Fifth Embodiment

Figure 14:
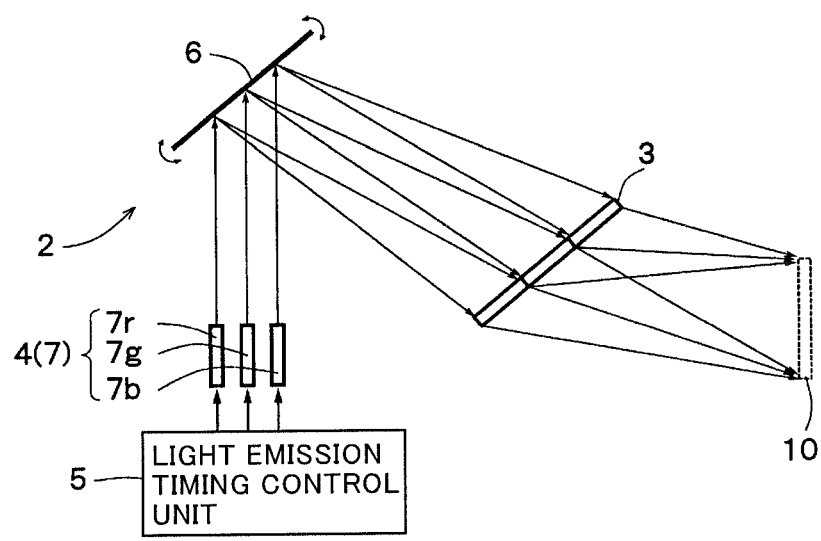
FIG. 14 is a view showing a schematic configuration of an illumination device according to one embodiment of the present invention.

FIG. 14 is a view showing a schematic configuration of the illumination device 1 according to the fifth embodiment of the present invention. The illumination device 1 in FIG. 14 includes the irradiation device 2 and the optical device 3. The irradiation device 2 includes the laser light source 4, the timing control unit 5, and the light scanning device 6.

The laser light source 4 has the light source unit 7 that emits coherent light beam of a predetermined emission wavelength range, that is, a laser beam. When illuminating with two or more colors, it is necessary to provide the laser light source 4 with the plurality of light source units 7 that emit a plurality of laser beams having different emission wavelength ranges. The plurality of light source units 7 may be provided individually or may be a light source module in which the plurality of light source units 7 are arranged side by side on a common substrate. However, the laser light source 4 of the present embodiment may have at least one light source unit 7. Further, in order to increase the light emission intensity, the plurality of light source units 7 that emit laser beam of a common emission wavelength range may be provided.

In the present embodiment, an example will be described in which the laser light source 4 has the light source unit 7r in the red emission wavelength range, the light source unit 7g in the green emission wavelength region, and the light source unit 7b in the blue emission wavelength range. By overlapping the three laser beams emitted from the light source units 7, white illumination light can be generated.

The timing control unit 5 individually controls the timing of the plurality of laser beams having different emission wavelength ranges. That is, when the plurality of light source units 7 are provided corresponding to a plurality of laser beams having different emission wavelength ranges, the timing control unit 5 individually controls the timing at which the laser beams are emitted from the plurality of light source units 7. As described above, when the laser light source 4 is capable of emitting three laser beams of red, blue, and green, by controlling the timing of each laser beam, it is possible to generate illumination light of a color in which arbitrary one or more colors of red, blue and green are mixed.

The timing control unit 5 may control whether or not to emit laser beam from each light source unit 7, that is, on/off of light emission, and may switch whether or not to guide the laser beam emitted from each light source unit 7 to the incident surface of the light scanning device 6. In the latter case, an optical shutter unit (not shown) is provided between each light source unit 7 and the light scanning device 6, and the passing/blocking of laser beam is switched by the optical shutter unit.

The light scanning device 6 varies the traveling direction of the laser beam from the laser light source 4 with the lapse of time so that the traveling direction of the laser beam does not become constant. As a result, the laser beam emitted from the light scanning device 6 is scanned on the incident surface of the optical device 3.

Figure 15:
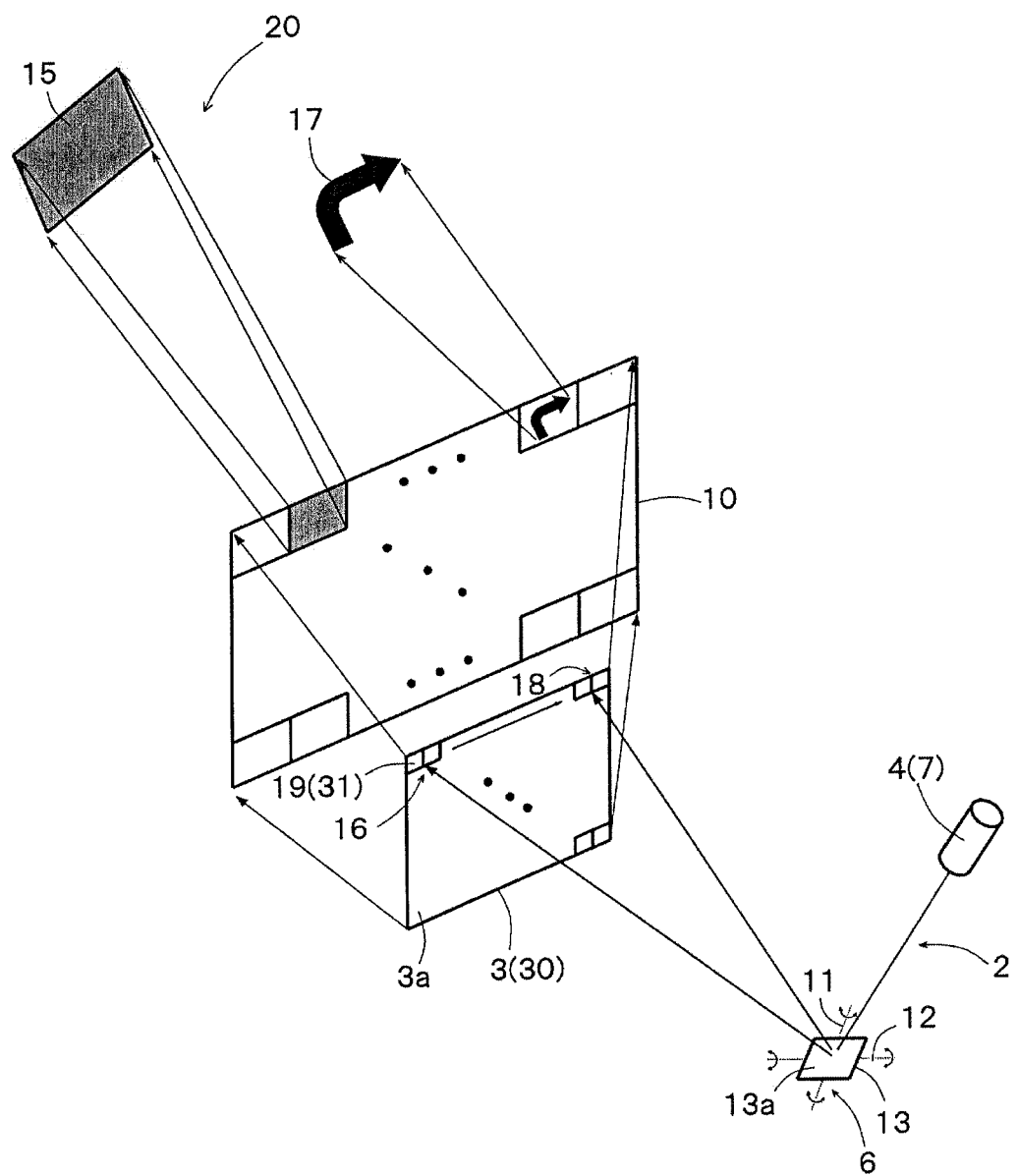
FIG. 15 is a view showing a light scanning device.

As shown in FIG. 15, for example, the light scanning device 6 has the reflective device 13 that is rotatable around two rotating axes 11, 12 extending in mutually intersecting directions. The laser beam from the laser light source 4 incident on the reflecting surface 13a of the reflective device 13 is reflected at an angle corresponding to an inclination angle of the reflecting surface 13a and travels toward an incident surface 3a of the optical device 3. By rotating the reflective device 13 around the two rotation axes 11 and 12, the laser beam is scanned on the incident surface of the optical device 3 two-dimensionally. Since the reflective device 13 repeats the operation of rotating around the two rotation axes 11 and 12 at a constant period, for example, the laser beam is repeatedly two-dimensionally scanned on the incident surface 3a of the optical device 3 in synchronization with this period.

In the present embodiment, it is assumed that only one light scanning device 6 is provided, all of the plurality of laser beams emitted from the laser light source 4 are incident on the common light scanning device 6, the traveling direction of the light scanning device 6 is changed with the lapse of time, and the optical device 3 is scanned.

The optical device 3 has the incident surface 3a on which the plurality of laser beams are incident, and diffuses the plurality of laser beams incident on the incident surface 3a to illuminate a predetermined area. More specifically, the plurality of laser beams diffused by the optical device 3 passes through the illumination zone 10 and then illuminates a predetermined area that is an actual illumination area 20.

Here, the illumination zone 10 is an illumination zone of a near field illuminated by overlapping each diffusion region 14 in the optical device 3. The illumination area of a far field is often expressed as a diffusion angle distribution in an angular space rather than the dimension of the actual illumination zone. In the present specification, the term "illumination zone" includes a diffusion angle area in the angular space in addition to the actual illumination zone (illumination area). Therefore, the predetermined area illuminated by the illumination device in FIG. 1 can be a much wider area than the illumination zone 10 of the near field shown in FIG. 1.

As shown in FIG. 15, the optical device 3 has the first diffusion region 16 for illuminating the first area 15 and the second diffusion region 18 for displaying predetermined information in the second area 17. The first area 15 and the second area 17 are areas illuminated by the laser beam passing through the illumination zone 10 in FIG. 1, and are provided, for example, on the ground.

At least one of the first diffusion region 16 and the second diffusion region 18 in the optical device 3 may be further divided into the plurality of element diffusion regions 19 finely. FIG. 15 shows an example in which each of the first diffusion region 16 and the second diffusion region 18 is divided into the plurality of element diffusion regions 19, but this is merely an example. The simplest configuration is the case where the optical device 3 has the first diffusion region 16 including one element diffusion region 19 and the second diffusion region 18 including another element diffusion region 19.

The laser beam from the light scanning device 6 is scanned on the optical device 3. More specifically, the light scanning device 6 sequentially scans each element diffusion region 19 in the first diffusion region 16 and the second diffusion region 18. Each element diffusion region 19 in the first diffusion region 16 illuminates a partial region in the first area 15. When the first diffusion region 16 has only one element diffusion region 19, this element diffusion region 19 illuminates the entire region of the first area 15. In some cases, each of the two or more element diffusion regions 19 included in the first diffusion region 16 may be illuminated while overlapping the entire region of the first area 15. On the other hand, each element diffusion region 19 in the second diffusion region 18 displays information in the second area 17. When the second diffusion region 18 has only one element diffusion region 19, this element diffusion region 19 displays all the information of the second area 17. In the case where the plurality of element diffusion regions 19 are included in the second diffusion region 18, each element diffusion region 19 may share and display one piece of information in the second area 17, and each element diffusion region 19 may display separate information in the second area 17.

The illumination of the first area 15 may illuminate the entire region in the first area 15 with a uniform illuminance or illumination may be performed with nonuniform illuminance which varies depending on places. For example, the central portion of the first area 15 may be brightest and may be darker as it goes away from the center.

The information displayed in the second areas 17 is one in which at least one of hue, brightness and saturation is changed in the second area 17. More specifically, the information displayed in the second area 17 is, for example, at least one of a picture, a pattern, a letter, a number and a symbol, and the specific content of the information is not particularly limited. The information display in the second area 17 is performed, for example, for the purpose of imparting design and decorativeness, the purpose of calling attention, the purpose of guidance display, the purpose of advertisement publicity, and the like. In addition, although the information displayed in the second area 17 may be monochrome (monochrome) or multiple colors (color), in the present embodiment, an example of displaying information in a single color will be described.

Figure 16:
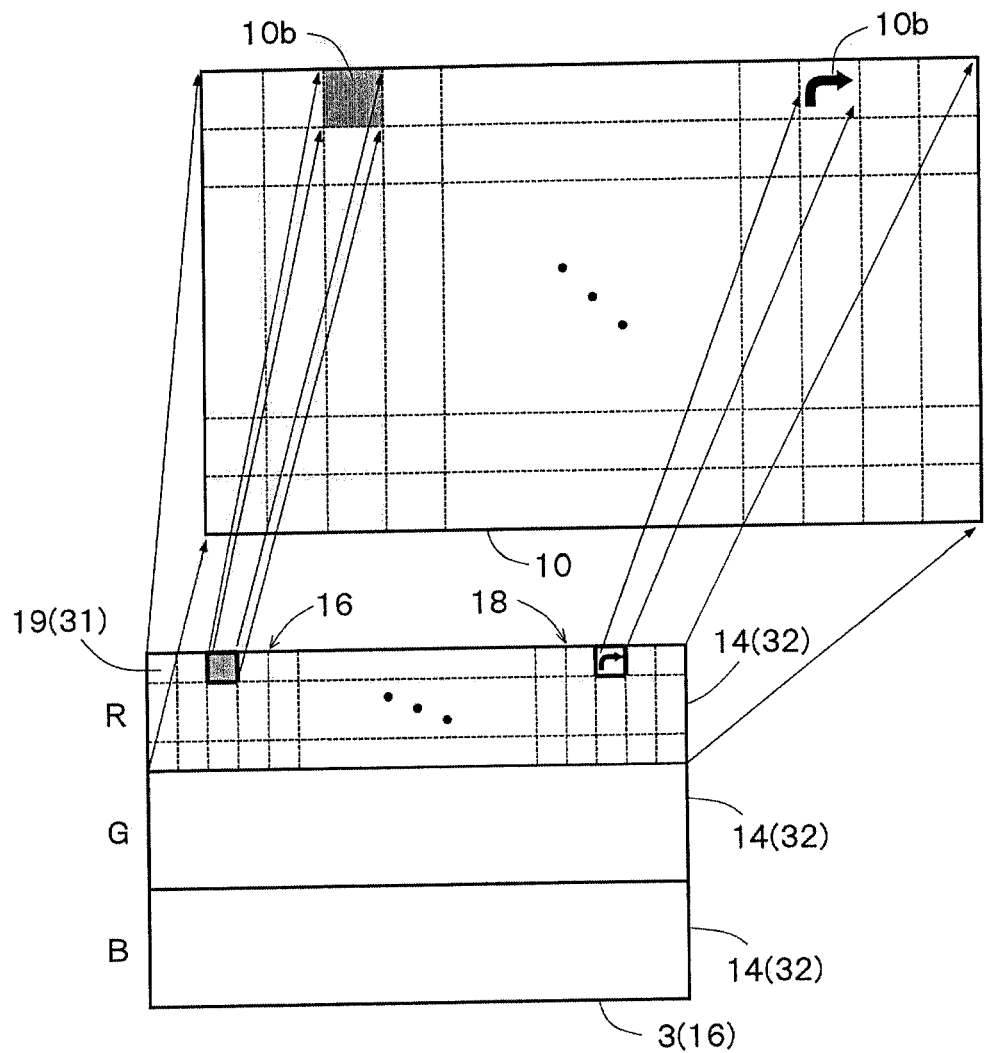
FIG. 16 is a view showing how a laser beam diffused by an optical device is incident on an illumination zone.

FIG. 16 is a view showing how the laser beam diffused by the optical device 3 is incident on the illumination zone 10. The optical device 3 has a plurality of diffusion region parts 14 corresponding to the plurality of laser beams. Corresponding laser beam is incident on each diffusion region part 14. Each of the diffusion region parts 14 includes the first diffusion region 16 and the second diffusion region 18 as in the fifth embodiment. The arrangement order of the first diffusion region 16 and the second diffusion region 18 in each diffusion region part 14 is arbitrary and the ratio between the first diffusion region 16 and the second diffusion region 18 in each diffusion region part 14 is also arbitrary.

Each diffusion region part 14 diffuses the incident laser beam and illuminates the entire region of the illumination zone 10. Each diffusion region part 14 has the plurality of element diffusion regions 19. Each element diffusion region 19 diffuses the incident laser beam and illuminates a partial region 10*b* in the illumination zone 10. At least a part of the partial region 10*b* differs for each element diffusion region 19.

The optical device 3 is configured using, for example, the hologram recording medium 30. The hologram recording medium 30 has, for example, as shown in FIG. 16, a plurality of hologram areas 32. Each of the hologram areas 32 is provided corresponding to each of the plurality of laser beams having different emission wavelength ranges. The laser beams incident on the incident surface of each hologram area 32 are diffused to illuminate the illumination zone 10. For example, when the hologram recording medium 30 has three hologram areas 32, the laser beam diffused in each hologram area 32 illuminates the entire region of the illumination zone 10.

FIG. 16 shows an example in which three hologram areas 32 are provided in association with three laser beams that emit light in red, blue, or green. However, since the hologram recording medium 30 may be used for monochromatic illumination, the hologram recording medium 30 may be provided with one or more hologram areas 32. As shown in FIG. 16, when the hologram recording medium 30 has three kinds of hologram areas 32 corresponding to three kinds of laser beams that emit light in red, blue, or green, each hologram area 32 illuminates the entire region of the illumination zone 10, so that when the three laser beams emit light, the illumination zone 10 is illuminated with white light.

The size, that is, the area of each hologram area 32 in the hologram recording medium 30 is not necessarily the same. Even if the sizes of the respective hologram areas 32 are different, by individually adjusting the interference fringe pattern formed on the incident surface 17*a* of each hologram area 32, each hologram area 32 can illuminate the common illumination zone 10.

Each of the plurality of hologram areas 32 has the plurality of element hologram areas 31. Each of the plurality of element hologram areas 31 illuminates the partial region 10*b* in the illumination zone 10 by diffusing the incident laser beam. At least a part of the partial region 10*b* illuminated by each element hologram area 31 is different for each element hologram area 31. That is, the partial regions 10*b* illuminated by the different element hologram areas 31 are at least partially different from each other.

An interference fringe pattern is formed on an incident surface 17*a* of each element hologram area 31. Therefore, the laser beam incident on the incident surface 17*a* of each element hologram area 31 is diffracted by the interference fringe pattern on the incident surface 17*a*, and illuminates the corresponding partial region 10*b* on the illumination zone 10. By adjusting the interference fringe pattern variously, it is possible to change the traveling direction of the laser beam diffracted or diffused in each element hologram area 31.

In this manner, the laser beams incident on each point in each element hologram area 31 illuminate the corresponding partial region 10*b*. Further, the light scanning device 6 changes incident position and incident angle of the laser beam incident on the respective element hologram areas 31 with the lapse of time. The laser beam incident into one element hologram area 31 illuminates the common partial region 10*b* even if the laser beam is incident on any position in the element hologram area 31. That is, this means that the incident angle of the laser beam incident on each point of a partial region 10*b* changes with the lapse of time. This change in the incident angle is a speed that cannot be resolved by the human eye, and as a result, the scattering pattern of the coherent light beam having no correlation is multiplexed and observed in the human eye. Therefore, the speckle generated corresponding to each scattering pattern is overlapped and averaged, and is observed by the observer. As a result, in the illumination zone 10, speckle becomes less conspicuous. In addition, since the laser beam from the light scanning device 6 sequentially scans each of the element hologram areas 31 on the hologram recording medium 30, the laser beams diffracted at each point in each element hologram area 31 have different wave fronts; therefore, since these laser beams are individually superimposed on the illumination zone 10, a uniform illuminance distribution in which the speckle is inconspicuous can be obtained in the illumination zone 10.

FIG. 16 shows an example in which each element hologram area 31 illuminates different partial regions 10b in the illumination zone 10. However, a part of the partial region 10b may overlap the adjacent partial region 10b. In addition, the size of the partial region 10b may be different for each elementary hologram area 31. Furthermore, it is unnecessary that the corresponding partial region 10b is arranged in the illumination zone 10 according to the arrangement order of the element hologram area 31. That is, the arrangement order of the element hologram area 31 in the hologram area 32 and the arrangement order of the corresponding partial region 10b in the illumination zone 10 are not necessarily coincident.

In the illumination device 1 according to the present embodiment, desired information can be displayed in the second area 17 as necessary while illuminating the first area 15 with the laser beam passing through the illumination zone 10.

Figure 17:
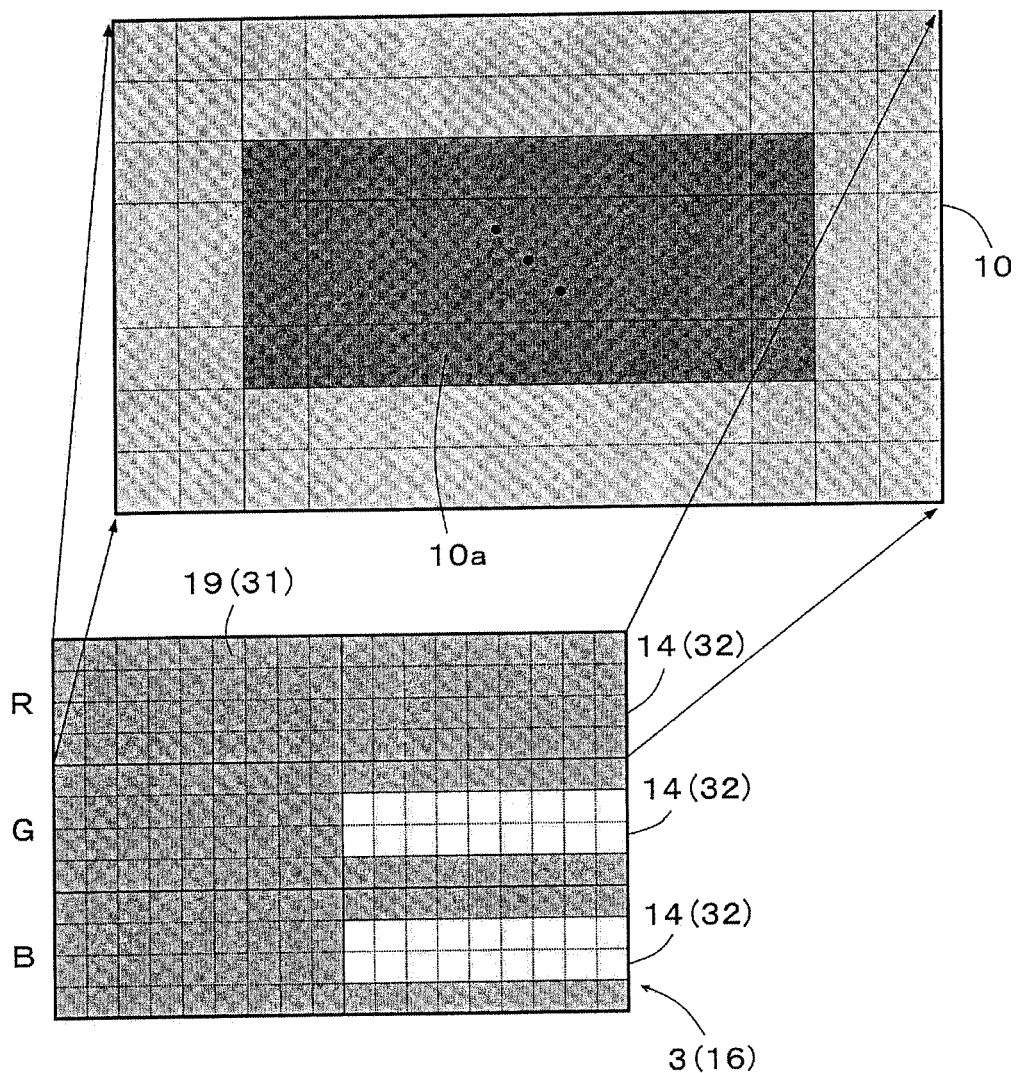
FIG. 17 is a view showing an example in which an illumination color of a central portion in an illumination zone is different from an illumination color of the other portion of the illumination zone.
Figure 18:
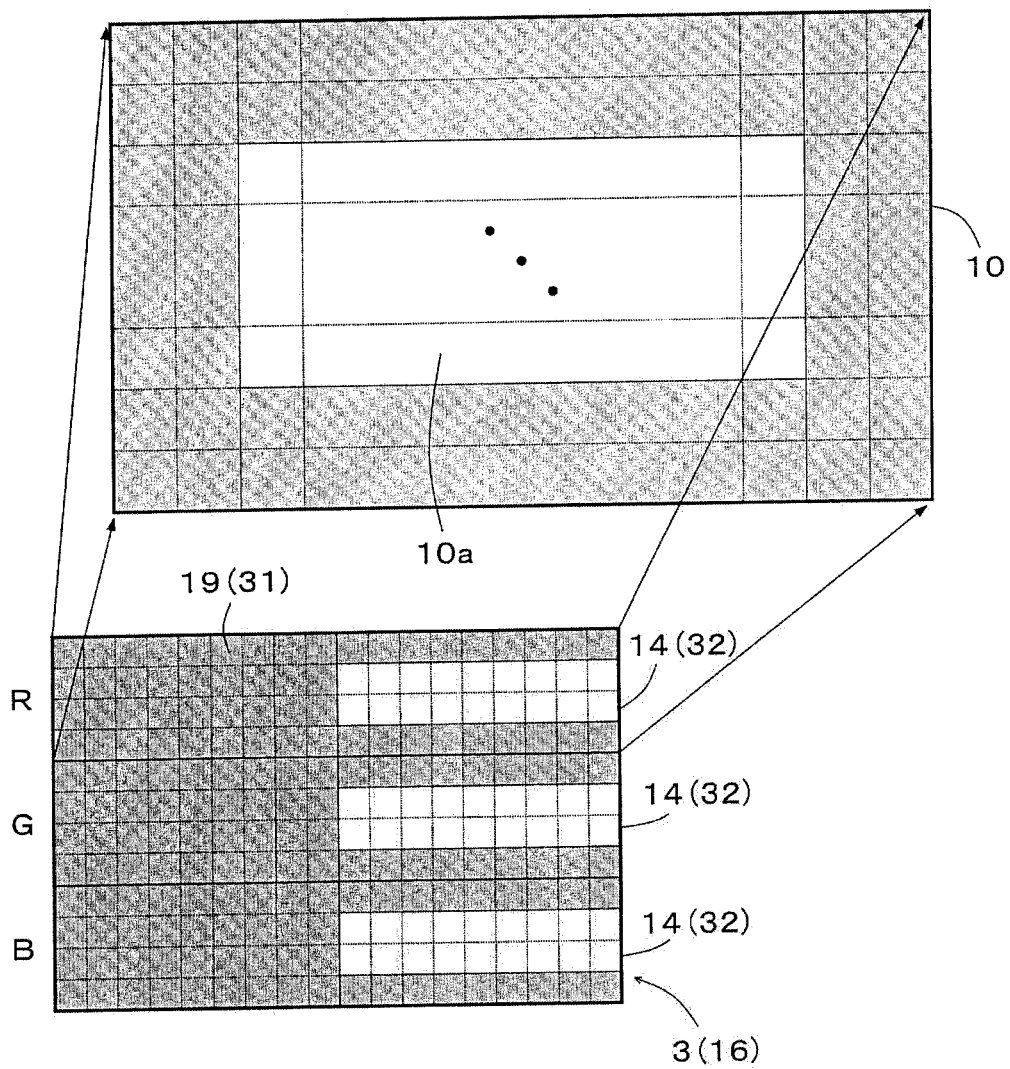
FIG. 18 is a view showing an example in which only the central portion in the illumination zone is made non-illuminated.

FIGS. 17 and 18 show an example in which the illumination mode of the central portion 10a in the illumination zone 10 is different from the illumination mode of the other portion in the illumination zone 10. In this case, even also in the illumination area illuminated by the laser beam passing through the illumination zone 10, the illumination mode of the central portion is illuminated differently from the illumination mode other than the central portion.

In the example of FIG. 17, the hologram recording medium 30 has three hologram areas 32 corresponding to three laser beams that emit light in red, green, or blue, in the hologram area 32 for red, the entire region thereof is scanned with the corresponding laser beam, and in the hologram area 32 for green and blue, excluding a part thereof, scanning is performed with the corresponding laser beam. In FIG. 17, in each of the hologram areas 32, a part where the corresponding laser beam is not scanned is shown in white. These hollow portions correspond to the central portion 10a in the illumination zone 10. Since the red laser beam scans the entire region of the corresponding hologram area 32, the red laser beam illuminates the entire region of the illumination zone 10. The green and blue laser beams illuminate a part other than the central portion 10a in the illumination zone 10 in order to scan the portion other than the hollow portion in the corresponding hologram area 32. As a result, the central portion 10a in the illumination zone 10 is illuminated in red, and the illumination zone 10 other than the central portion 10a is mixed with illumination light of red, green and blue and illuminated in white.

In FIG. 17, the central portion 10a is formed in a rectangular shape, but since the shape of the central portion 10a can be changed arbitrarily, it is also possible to display information in the central portion 10a. Therefore, for example, the information in the second area 17 can be displayed by the central portion 10a in FIG. 17 and the first area 15 can be illuminated in the illumination zone 10 other than the central portion 10a. Actually, the information of the second area 17 is not necessarily displayed using the central portion 10 in the illumination zone 10 as shown in FIG. 17.

On the other hand, in FIG. 18, in any of the three hologram areas 32, a laser beam scans a region other than the region corresponding to the central portion 10a in the illumination zone 10. For this reason, the central portion 10a in the illumination zone 10 is a non-illumination zone that is not illuminated by any color.

In order to individually control the timing of the three laser beams, by arbitrarily adjusting the timing of the three laser beams, the timing control unit 5 can illuminate an arbitrary place in the illumination zone 10 with an arbitrary color. If the illumination mode inside the illumination zone 10 is arbitrarily adjusted, depending on the illumination mode, it becomes possible to illuminate an arbitrary partial region in the actual illumination area illuminated with the laser beam passing through the illumination zone 10 in an arbitrary illumination mode.

Each of the element hologram areas 31 for the first diffusion region 16 can be produced by using, for example, scattered light from a real scattering plate as object light. More specifically, when the hologram photosensitive material which is the base of the hologram recording medium 30 is illuminated with reference light and object light made of coherent light beam having coherency with each other, an interference fringe due to interference of these light beams is formed on the hologram photosensitive material, and the hologram recording medium 30 is manufactured. A laser beam which is coherent light beam is used as the reference light, and scattered light of an isotropic scattering plate which is available at low cost, for example, is used as the object light.

By illuminating the hologram recording medium 30 with a laser beam from the focal position of the reference light used for manufacturing the hologram recording medium 30, a reproduced image of the scattering plate is generated at the arrangement position of the scattering plate which is the source of the object light used in manufacturing the hologram recording medium 30. When the scattering plate which is the source of the object light used for manufacturing the hologram recording medium 30 has uniform surface scattering, a reproduced image of the scattering plate obtained by the hologram recording medium 30 is also a uniform plane illumination, and a region where the reproduced image of this scattering plate is generated is the illumination zone 10.

Each element hologram area 31 for the second diffusion region 18 for displaying information in the second area 17 in the hologram recording medium 30 is formed by using a scattering plate on which an image of information has been formed in advance, and Stripe can be formed.

In the hologram recording medium 30 according to the present embodiment, it is necessary to perform illumination in the first area 15 and information display in the second area 17, so that the interference fringe becomes complicated. Without using actual object light and reference light, such a complicated interference fringe pattern can be designed using a computer based on the scheduled wavelength and incident direction of the reconstruction illumination light and the shape and position of the image to be reproduced. The hologram recording medium 30 thus obtained is also called a computer generated hologram (CGH). In addition, a Fourier transform hologram having the same diffusion angle characteristic at each point on each element hologram area 18 may be formed by computer synthesis. Furthermore, an optical member such as a lens may be provided on the rear side of the optical axis of the illumination zone 10 to set the size and position of the actual illumination area.

One advantage of providing the hologram recording medium 30 as the optical device 3 is that the energy density of the laser beam can be reduced by diffusion, and in addition, another advantage is that since the hologram recording medium 30 can be used as a directivity surface light source, the luminance on the light source surface for achieving the same illuminance distribution can be reduced compared with the conventional lamp light source (point light source). Whereby, the safety of the laser beam can be improved, and there is no possibility that a human eye will be adversely affected even if the laser beam that has passed through the illumination zone 10 is viewed directly with the human eye.

Figure 19:
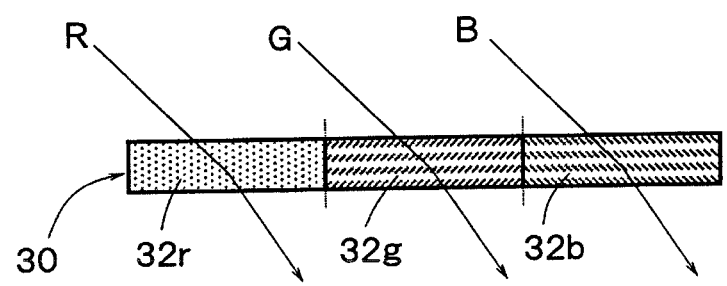
FIG. 19 is a view in which three hologram areas are adjacently arranged along an incident surface of a hologram recording medium.

In the examples shown in FIGS. 14 to 18, the hologram areas 32 for red, green and blue are arranged adjacent to each other along the incident surface of each hologram area 32 as shown in FIG. 19. In FIG. 19, the hologram area 32 for red is denoted by 32r, the hologram area 32 for green is denoted by 32g, and the hologram area 32 for blue is denoted by reference numeral 32b.

Figure 20:
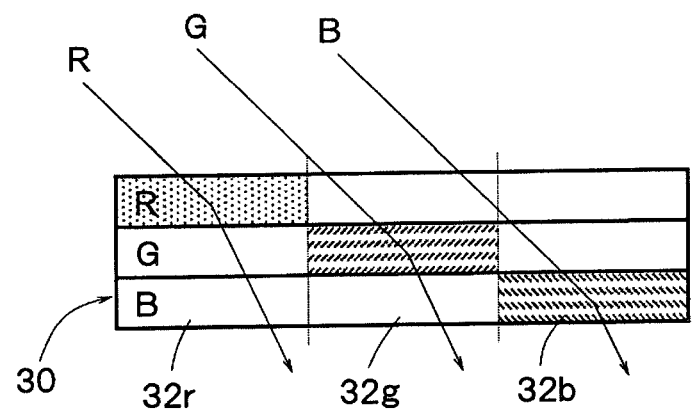
FIG. 20 is a view in which three hologram areas are arranged in a stacking direction.

In this way, in addition to arranging the three hologram areas 32 adjacent along the incident surface, as shown in FIG. 20, the hologram recording medium 30 in which the respective hologram areas 32 are arranged in the stacking direction may be used. In this case, the interference fringe pattern of each hologram area 32 is formed in the layer of each hologram area 32. In order to ensure that the laser beam reaches, without loss as much as possible, from the surface of the hologram recording medium 30 on which the laser beam from the light scanning device 6 is incident to the hologram area 32 on the far side, it is desirable to make the visible light transmittance of each hologram area 32 as high as possible. Further, when the interference fringe pattern is formed at a position overlapping in the stacking direction, the laser beam hardly reaches the layer deeper from the surface; therefore, as shown in FIG. 18, it is desirable to form the interference fringe patterns in each layer while being shifted in the stacking direction.

FIG. 14 shows an example in which the laser beam from the light scanning device 6 diffuses through the optical device 3, but the optical device 3 may diffuse and reflect the laser beam. For example, when the hologram recording medium 30 is used as the optical device 3, the hologram recording medium 30 may be a reflection type or a transmission type. Generally, the reflection type hologram recording medium 30 (hereinafter, reflection type holo) has high wavelength selectivity as compared with the transmission type hologram recording medium 30 (hereinafter, transmission type holo). That is, even when the interference fringe pattern corresponding to different wavelengths is laminated the reflection type holo can diffract coherent light beam of a desired wavelength only in a desired layer. Also, the reflection type holo is superior in that it is easy to remove the influence of zero order light. On the other hand, the transmission type holo has a wide diffractable spectrum and a wide tolerance of the laser light source 4; however, when the interference fringe pattern corresponding to different wavelengths is laminated, coherent light beam of a desired wavelength is diffracted even in a layer other than the desired layer. Therefore, in general, it is difficult to form a transmission type holo with a laminated structure.

As a specific form of the hologram recording medium 30, a volume hologram recording medium 30 using a photopolymer may be used, a volumetric hologram recording medium 30 of a type that performs recording using a photosensitive medium containing a silver salt material may be used, and a relief type (emboss type) hologram recording medium 30 may be used.

The specific form of the optical device 3 is not limited to the hologram recording medium 30, and may be various diffusion members that can be finely divided into the plurality of element diffusion regions 19. For example, the optical device 3 may be configured using a lens array group in which each element diffusion region 19 is a single lens array. In this case, a lens array is provided for each element diffusion region 19, and the shape of each lens array is designed so that each lens array illuminates the partial region 10b in the illumination zone 10. At least a part of the position of each partial region 10b is different. As a result, similarly to the case where the optical device 3 is configured using the hologram recording medium 30, it is possible to change the illumination color of only a part of the illumination zone 10 or to prevent only a part from being illuminated.

In FIGS. 17 and 18, an example in which a part of the illumination in the illumination zone 10 is stopped or a part of the illumination color is changed is shown. However, another method for changing the illumination mode of a part of the illumination zone 10 is conceivable. For example, when the laser light source 4 has a plurality of light source units 7 that emit light in the same emission wavelength range, the light emission of a part of the light source units 7 may be stopped so that the illumination intensity of a part of the inside of the illumination zone 10 is lower than the illumination intensity of the surrounding area. Conversely, a part of the illumination intensity in the illumination zone 10 may be higher than the surrounding illumination intensity. In addition, a part of the inside of the illumination zone 10 may be illuminated with flashing. Alternatively, a part of the color in the illumination zone 10 may be changed continuously or intermittently.

Figure 21:
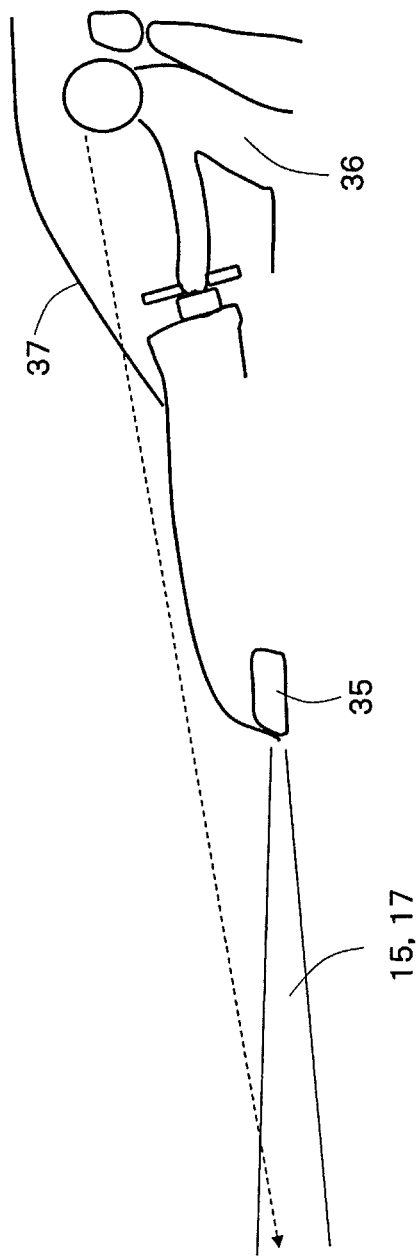
FIG. 21 is a view showing an example in which the illumination device according to the present embodiment is applied to a headlight of a car.

FIG. 21 shows an example in which the illumination device 1 according to the present embodiment is applied to a headlight 35 for a car. Since a driver 36 performs driving while watching the front of the car through a windshield 37, when the headlight 35 is lit, the driver 36 visually recognizes the area illuminated by the headlight 35. In the present embodiment, the first area 15 and the second area 17 are provided in the area illuminated by the headlight 35, the first area 15 performs illumination as the normal headlight 35, and in the second area 17, various kinds of information are displayed as necessary. The first area 15 is a wide area up to several tens of meters on the front side of the car, while the second area 17 is provided in a limited area, for example, several meters away from the viewpoint position of the driver 36. The size and position of the first area 15 and the second area 17 are arbitrarily variably adjusted by an interference fringe pattern formed in each of the element hologram areas 31 in the first diffusion region 16 and the second diffusion region 18.

The information display of the second area 17 can be used instead of the existing head-up display. In the existing head-up display, although a virtual image is formed several meters ahead of the windshield 37 by using a projector and a magnifying mirror provided in a dashboard, according to the present embodiment, information can be displayed in the second area 17 only by the headlight 35 without using a projector and a magnifying glass. Further, according to the present embodiment, since the size and position of the information displayed in the second area 17 can be arbitrarily adjusted by the optical device 3, information can be displayed in a desired size in a place where the driver 36 is most visible.

Figure 22:
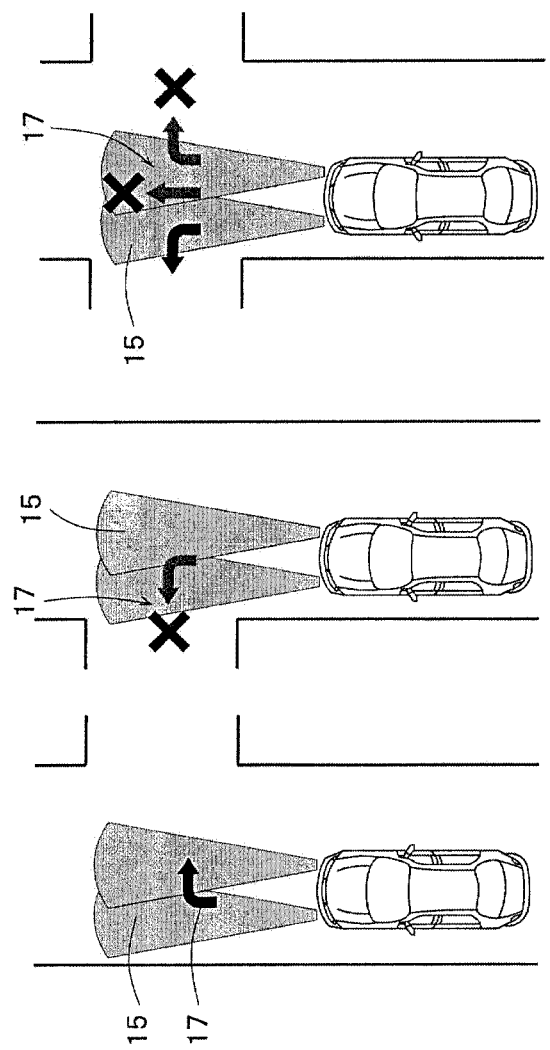
FIGS. 22A to C are views showing a specific example of information in a second area to be displayed using a headlight.

FIG. 22 is a view showing a specific example of information in the second area 17 displayed using the headlight 35. FIG. 22A shows an example of displaying information on an arrow indicating a traveling direction of the car. FIG. 22B shows an example of displaying information prohibiting left turn. FIG. 22C shows an example of displaying information on the traveling direction of the car on a three-way road. In FIG. 22C, not only an X mark indicating prohibition of traveling but also the direction of the car to travel and the other directions change the color of the arrow to call attention of the driver 36.

For each piece of information shown in FIG. 22, the interference fringe pattern corresponding to each information is previously formed in each element hologram area 31 in the second diffusion region 18 in the hologram recording medium 30, and by controlling the element hologram area 31 to be irradiated with the laser beam by the timing control unit 5, it is possible to display desired information in the second area 17 at a desired timing.

Note that the information displayed in the second area 17 is not limited to that shown in FIG. 22. As described above, arbitrary information can be displayed in an arbitrary size and at the arbitrary position by the interference fringe pattern formed in the element hologram area 31 corresponding to the second diffusion region 18.

Figure 23:
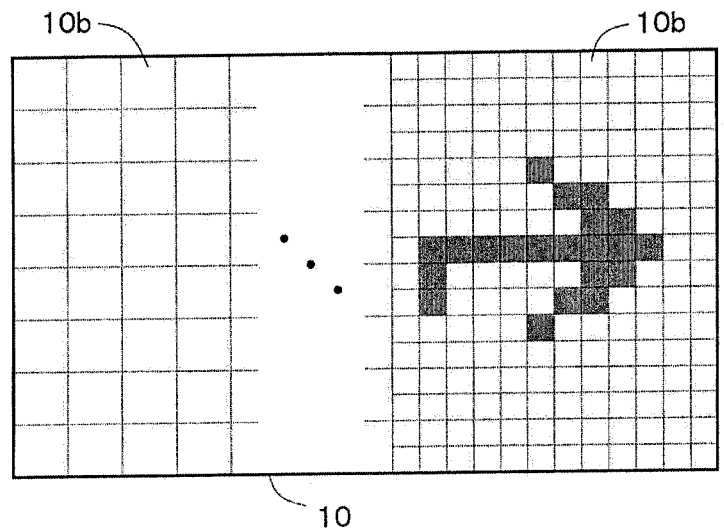
FIG. 23 is a view showing an example in which each element diffusion region in the second diffusion region performs rectangular illumination and the information on an arrow is displayed by combining the illumination areas of each element diffusion region.

In the above-described fifth embodiment, an example in which information such as arrows is displayed using the second diffusion region 18 in the optical device 3 has been described. However, each of the element diffusion regions 19 in the second diffusion region 18 may perform illumination with a shape corresponding to the display form of information such as an arrow and like the element diffusion regions 19 in the first diffusion region 16, for example, may perform rectangular illumination. FIG. 23 shows an example in which each element diffusion region 19 in the second diffusion region 18 performs rectangular illumination and displays the information on an arrow by combining the illumination areas of each element diffusion region 19. In this way, both the first diffusion region 16 of the optical device 3 and each of the element diffusion regions 19 in the second diffusion region 18 may perform illumination with a predetermined shape such as a rectangle.

FIG. 23 shows an example in which the size of the partial region 10b formed by each element diffusion region 19 in the first diffusion region 16 on the illumination zone 10, and the size of the partial region 10b formed by each element diffusion region 19 in the second diffusion region 18 on the illumination zone 10 are different from each other; however, the size and position of both partial regions 10b are arbitrary.

As described above, in the fifth embodiment, since desired information can be displayed in the second area 17 at a desired timing while performing illumination of the first area 15 using coherent light beam, the illumination device 1 can be effectively utilized. Further, unlike the existing head-up display, since a projector and a magnifying glass are unnecessary, and the size and display position of the information to be displayed can be arbitrarily adjusted by the optical device 3, it is possible to display more clear and powerful information while having a simple optical configuration than the existing head up display.

Furthermore, the light scanning device 6 scans laser beam in each element diffusion region 19, and the laser beam incident on each point in each element diffusion region 19 illuminates the entire region of the partial region 10b. Therefore, the incident angle of the laser beam in the partial region 10b in the illumination zone 10 changes with the lapse of time, so that a speckle in the illumination zone 10 is less noticeable.

Sixth Embodiment

Figure 24:
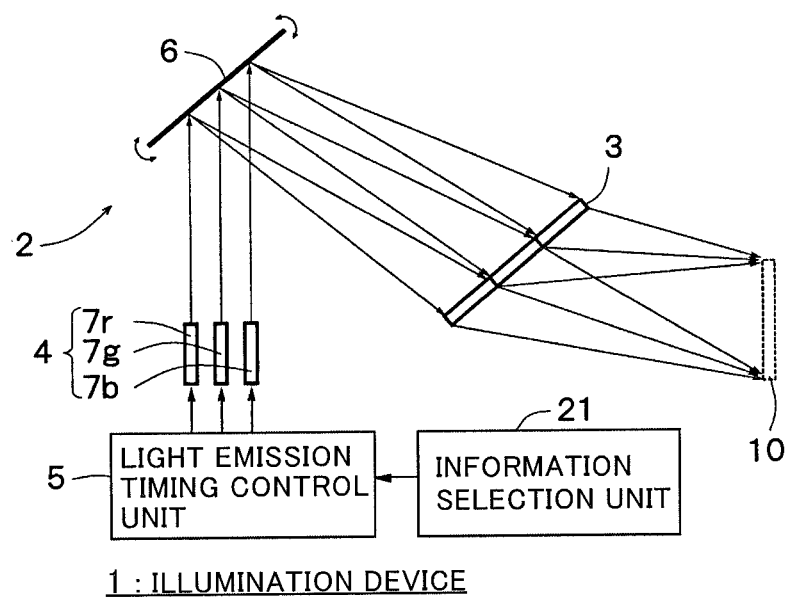
FIG. 24 is a view showing a schematic configuration of an illumination device according to a second embodiment of the present invention.

FIG. 24 is a view showing a schematic configuration of the illumination device 1 according to the sixth embodiment of the present invention. The illumination device 1 in FIG. 24 is obtained by adding an information selection unit 21 in FIG. 14. The information selection unit 21 selects information to be displayed in the second area 17. The information selection unit 21 may receive a signal from a controller (not shown), various sensors, or the like and may select information based on the signal, and may select information based on information input by the user through an input device (not shown). Alternatively, the information selection unit 21 may select information according to the processing algorithm thereof. As described above, the specific processing procedure for the information selection unit 21 to select the information to be displayed in the second area 17 is arbitrary.

In order to display the information selected by the information selection unit 21 in the second area 17, the timing control unit 5 controls the timing of scanning each element hologram area 31 corresponding to the second diffusion region 18. More specifically, laser beam is scanned on the element hologram area 31 on which the interference fringe pattern corresponding to the information selected by the information selection unit 21 is formed.

Further, the information selection unit 21 may switch information to be selected depending on whether the vehicle is traveling or stopped. For example, while the vehicle is traveling, the route guidance information of the vehicle as shown in FIG. 22 is displayed, and when the vehicle stops, various information may be displayed for advertisement promotion, or for improvement of designability and decorativeness by using the headlight 35. Specific information in this case is, for example, a brand name of a vehicle, a manufacturer name, a model name, and the like. This also serves as advertisement of a vehicle, and can give superiority to the owner of the vehicle.

Furthermore, an object detection unit (not shown) for detecting an object located in the area illuminated in the first area 15 may be provided, and the information selection unit 21 may select information matching the position of the detected object. In this case, even if the object moves, it is possible to display the information of the second area 17 according to the position of the object.

Figure 25:
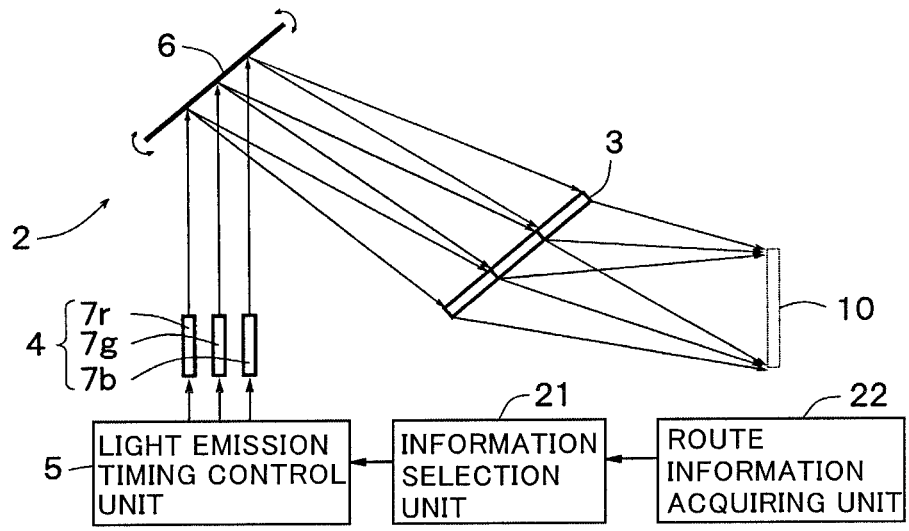
FIG. 25 is a view showing a schematic configuration of an illumination device showing a first modification of FIG. 24.

FIG. 25 is a view showing a schematic configuration of the illumination device 1 showing a first modification of FIG. 24. The illumination device 1 in FIG. 25 is obtained by adding a route information acquiring unit 22 in FIG. 24. The illumination device 1 in FIG. 25 is assumed to be mounted on a vehicle, and the illumination device 1 of FIG. 25 is, for example, the headlight 35.

The route information acquiring unit 22 acquires route information on which the vehicle is to travel. The route information acquired by the route information acquiring unit 22 is generated by performing a route search from the current location of the vehicle or the departure place to the destination inside or outside the illumination device 1, and for example, the route information is generated by a navigation device (not shown).

The information selection unit 21 in FIG. 25 selects information to be displayed in the second area 17 based on the route information acquired by the route information acquiring unit 22. For example, as shown in FIG. 22A, in the case where the vehicle is to turn right at a branch road, arrow information on the right turn is selected. Similarly, the information selection unit 21 in FIG. 25 can also select information as shown in FIG. 22B or FIG. 22C based on the route information.

Figure 26:
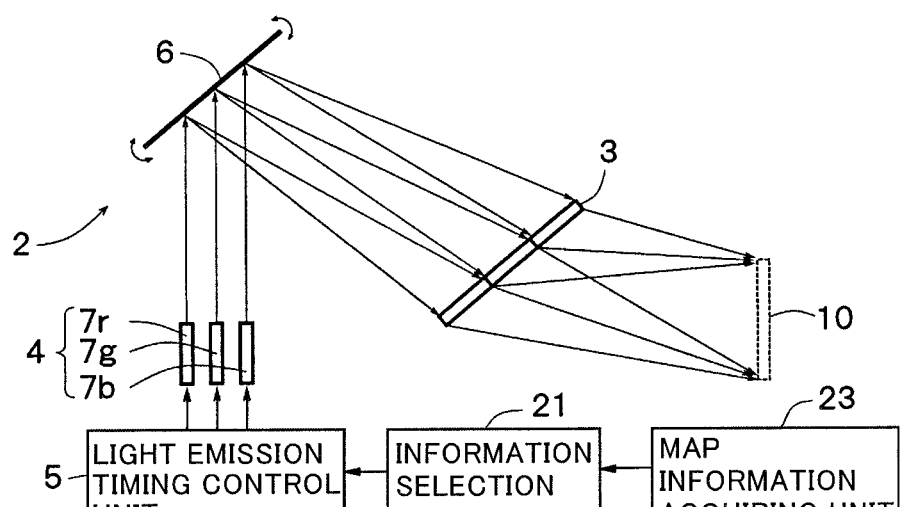
FIG. 26 is a view showing a schematic configuration of an illumination device showing a second modification of FIG. 24.

FIG. 26 is a view showing a schematic configuration of the illumination device 1 showing a second modification of FIG. 24. The illumination device 1 in FIG. 26 is obtained by adding the map information acquiring unit 23 in FIG. 24.

The illumination device 1 in FIG. 26 is also assumed to be mounted on the vehicle, and the illumination device 1 in FIG. 26 is, for example, the headlight 35.

The map information acquiring unit 23 acquires map information around the current position of the vehicle. The map information incoming unit 23 detects the current position of the vehicle by using, for example, a GPS sensor or the like inside or outside the illumination device 1 and acquires map information around the current position from the map information database, for example.

The information selection unit 21 in FIG. 26 selects information to be displayed in the second area 17 based on the map information acquired by the map information acquiring unit 23. As a result, information such as the arrow or the like shown in FIG. 22 can be selected.

Note that the route information acquiring unit 22 in FIG. 25 and the map information acquiring unit 23 in FIG. 26 may be provided in the illumination device 1.

As described above, in the sixth embodiment, since the information selected by the information selection unit 21 at a desired timing is displayed in the second area 17, while illuminating the first area 15, information to be displayed in the second area 17 can be switched as necessary. Therefore, when the illumination device 1 according to the present embodiment is applied to, for example, the headlight 35 for the vehicle, information required by the driver 36 can be appropriately displayed in the second area 17 while the vehicle is traveling or the vehicle is stopped.

The illumination device 1 according to the fifth and sixth embodiments may be mounted not only in the vehicle but also in a specific place. In addition, even when mounted on a vehicle, the vehicle is not limited to a car, but may be various moving bodies such as an aircraft, a train, a ship, a diving vehicle and the like.

Seventh Embodiment

Figure 27:
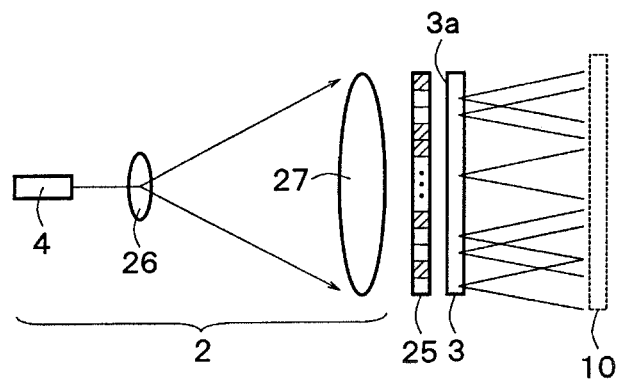
FIG. 27 is a view showing a schematic configuration of an illumination device according to a seventh embodiment of the present invention.

FIG. 27 is a view showing a schematic configuration of the illumination device 1 according to the seventh embodiment of the present invention. The illumination device 1 in FIG. 27 includes the irradiation device 2, the optical device 3, and an optical shutter 25. The irradiation device 2 has the laser light source 4, a beam diameter expansion member 26, and a collimating optical system 27.

The laser light source 4 emits coherent light beam, that is, laser beam. The laser light source 4 may be provided with a plurality of light source units with different emission wavelength ranges, but may be configured to have one or more light source units that emit laser beam in a single wavelength range. In this embodiment, an example in which one or more light source units that emit laser beam in a single wavelength range is provided will be described.

The beam diameter expansion member 26 expands the beam diameter of the laser beam emitted from the laser light source 4, and for example, is configured by an optical member including a convex lens. That is, the beam diameter expansion member 26 acts to diffuse a laser beam.

The collimating optical system 27 collimates a laser beam diffused by the beam diameter expansion member 26 and guides the laser beam to the incident surface of the optical shutter 25.

The optical device 3 has the incident surface 3a on which the laser beam is incident, and diffuses the laser beam incident on the incident surface 3a to illuminate a predetermined area, that is, the illumination zone 10. Since the laser beam for illuminating the illumination zone 10 is diffused beyond the illumination zone 10, if there is no object that blocks laser beam at the position of the illumination zone 10, the laser beam further diffuses.

Here, the illumination zone 10 is the illumination zone 10 of a near field illuminated by overlapping each diffusion region 14 in the optical device 3. The illumination area of the far field is often expressed as a diffusion angle distribution in the angular space rather than the actual size of the illumination zone 10. In the present specification, the term "illumination zone 10" includes the diffusion angle area in the angular space in addition to the actual illuminated area (illumination area). Therefore, the illumination area illuminated by the illumination device 1 in FIG. 27 can be a much wider area than the illumination zone 10 of the near field shown in FIG. 27.

The optical shutter 25 switches the transmittance of the laser beam incident on the optical device 3 or the laser beam diffused by the optical device 3. In the case of FIG. 27, since an optical shutter 25 is provided in front of the optical device 3 in the direction of the optical axis, the optical shutter 25 functions to switch the transmittance of the laser beam incident on the optical device 3. As will be described later, it is also possible to replace the arrangement of the optical shutter 25 and the optical device 3 with each other.

Figure 28:
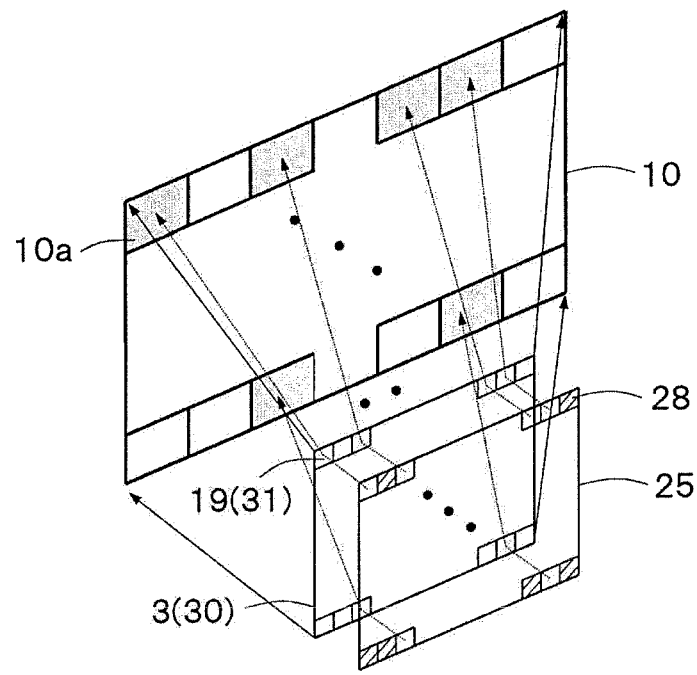
FIG. 28 is a view showing a detailed configuration of an optical shutter and an optical device in the seventh embodiment.

FIG. 28 is a view showing the detailed configuration of the optical shutter 25 and the optical device 3 in the seventh embodiment. As shown in FIG. 28, the optical device 3 has the plurality of element diffusion regions 19, each of which diffuses laser beam individually. The laser beam incident on and diffused into each element diffusion region 19 illuminates a partial region in the illumination zone 10. In this specification, a corresponding region in the illumination zone 10 illuminated by one element diffusion region 19 is called the partial region 10a. Each of the different element diffusion regions 19 illuminates the partial region 10a in which at least a part in the illumination zone 10 is different. Thus, when the plurality of element diffusion regions 19 are combined, the entire region of the illumination zone 10 can be illuminated.

The optical shutter 25 has a plurality of element shutter units 28 corresponding to the plurality of element diffusion regions 19. That is, each of the plurality of element diffusion regions 19 is associated with the separate element shutter unit 28, and the laser beam transmitted through one element shutter unit 28 is incident on the corresponding element diffusion region 19. Each of the plurality of element shutter units 28 switches the transmittance of the laser beam incident on the corresponding element diffusion region 19 or the laser beam diffused by the corresponding element diffusion region 19. In FIG. 28, the element shutter unit 28 having a high transmittance is shown in white, and the element shutter unit 28 with a low transmittance is shown by diagonal lines. It is desirable that the optical shutter 25 be arranged as close as possible to the optical device 3.

In the examples of FIGS. 27 and 28, the laser beam whose beam diameter is expanded by the beam diameter expansion member 26 is uniformly incident on all the element shutter units 28 in the optical shutter 25. Each element shutter unit 28 switches the transmittance of the incident laser beam. For example, when the element shutter unit 28 transmits laser beam, the laser beam is incident on the element diffusion region 19 corresponding to the element shutter unit 28. In this way, by switching the transmittance for each of the element shutter units 28 in the optical shutter 25, whether or not the laser beam is made incident on the optical device 3 can be switched for each element diffusion region 19 in the optical device 3.

Switching of the transmittance performed by each element shutter unit 28 is, in a simple example, two types of switching, that is, whether the laser beam is transmitted or blocked. In this case, only when the element shutter unit 28 transmits a laser beam, the laser beam is incident on the corresponding element diffusion region 19, and this element diffusion region 19 illuminates the corresponding partial region 10*a* in the illumination zone 10. Therefore, by individually switching the plurality of element shutter units 28 in the optical shutter 25, it is possible to individually switch whether or not to illuminate each partial region 10*a* in the illumination zone 10.

In this manner, whether or not to illuminate can be variably controlled for each partial region 10*a* in the illumination zone 10 by the optical shutter 25; therefore, it is possible to arbitrarily switch the illumination mode of the illumination zone 10. The illumination mode here means to switch the illumination/non-illumination for each partial region 10*a* in the illumination zone 10.

By arbitrarily switching the illumination mode of the illumination zone 10, it is possible to display some kind of information in the illumination zone 10 or have unique design characteristics depending on the illumination mode of the illumination zone 10. The information displayed by the illumination of the illumination zone 10 is, for example, at least one of a picture, a pattern, a letter, a number and a symbol, and the specific content of the information is not particularly limited. In the present embodiment, since it is assumed that laser beam of a single wavelength range is used, color display of information cannot be performed; however, even for a single color, it is possible to display various kinds of information for the purpose of giving designs and decorativeness, the purpose of calling attention, the purpose of guidance display, the purpose of advertisement publicity, and the like.

Since switching of the optical shutter 25 can be performed in an arbitrary manner at an arbitrary timing, the illumination mode in the illumination zone 10 can also be arbitrarily variably adjusted. Thereby, it is possible to arbitrarily change the illumination mode of the illumination zone 10 without increasing the cost.

Figures 29A, 29B:
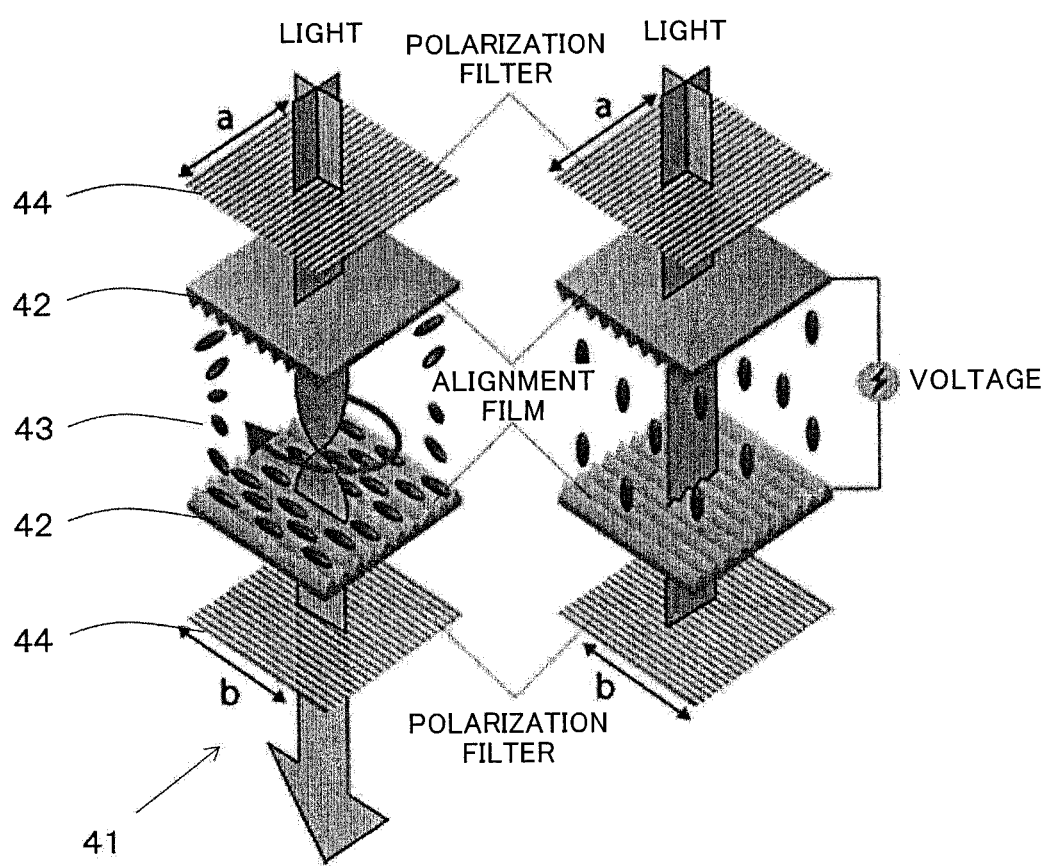
FIGS. 29A and 29B are views schematically showing a structure of one liquid crystal cell.

The optical shutter 25 can be realized by, for example, a liquid crystal shutter. The liquid crystal shutter has a plurality of liquid crystal cells corresponding to the plurality of element shutter units 28. FIG. 29 is a view schematically showing the structure of one liquid crystal cell 41. The liquid crystal cell 41 in FIG. 29 includes a liquid crystal material 43 filled between two alignment films 42 and two polarization filters 44 arranged outside the respective alignment films 42. FIG. 29 shows an example using the TN type liquid crystal material 43. When no voltage is applied between the two alignment films 42, the liquid crystal material 43 is in a twisted state as shown in FIG. 29A, while the light passes through the two alignment films 42, the polarization state of the light changes, and as a result, the light passes through the polarization filter 44. On the other hand, when a voltage is applied between the two alignment films 42, as shown in FIG. 29B, the liquid crystal material 43 is aligned in one direction and the polarization state does not change even if light passes between the two alignment films 42, and as a result, the light cannot pass through the polarization filter 44.

When the laser beam incident on the optical shutter 25 is polarized in advance, one polarization filter 44 in the liquid crystal shutter becomes unnecessary. Further, since the liquid crystal shutter has various systems, it is not limited to the structure shown in FIG. 29. A shutter like a liquid crystal shutter in which a cell capable of electrically switching the transmittance is arranged in a matrix form is referred to as a multi-cell shutter in this specification.

Further, the optical shutter 25 is not necessarily limited to a multi-cell shutter such as a liquid crystal shutter. For example, a mechanical shutter that mechanically opens and closes such as a Micro Electro Mechanical Systems (MEMS) shutter or the like, or an electronic shutter such as an electromagnetic shutter using a solenoid may be used.

Incidentally, the optical shutter 25 is not limited to only switching the transmission/blocking of a laser beam, but may change the transmittance of a laser beam intermittently or continuously. For example, in the case of the liquid crystal shutter as shown in FIG. 29, by changing the voltage applied between the alignment films 42, the transmittance of the laser beam can be continuously changed. Also, when using the MEMS shutter, the electromagnetic shutter, or the like, by intermittently or continuously switching the opening area of the shutter unit, the transmittance of the laser beam can be intermittently or continuously changed.

In this way, by intermittently or continuously switching the transmittance of the laser beam by the optical shutter 25, it is possible to not only switch the illumination/non-illumination for each partial region 10*a* in the illumination zone 10 but also adjust the illumination intensity for each partial region 10*a*. Thus, the illumination mode in the illumination zone 10 can be variably and finely adjusted. Here, the illumination mode is to arbitrarily switch ON/OFF of illumination and intensity of illumination intensity for each partial region 10*a* in the illumination zone 10.

The optical device 3 is configured using, for example, the hologram recording medium 30. As shown in FIG. 2, the hologram recording medium 30 has a plurality of element hologram areas 31 corresponding to the plurality of element diffusion regions 19. In each element hologram area 31, an interference fringe pattern is formed. When the laser beam is incident on the interference fringe pattern, the laser beam is diffracted by the interference fringe pattern and illuminates the corresponding region in the illumination zone 10.

Figure 30:
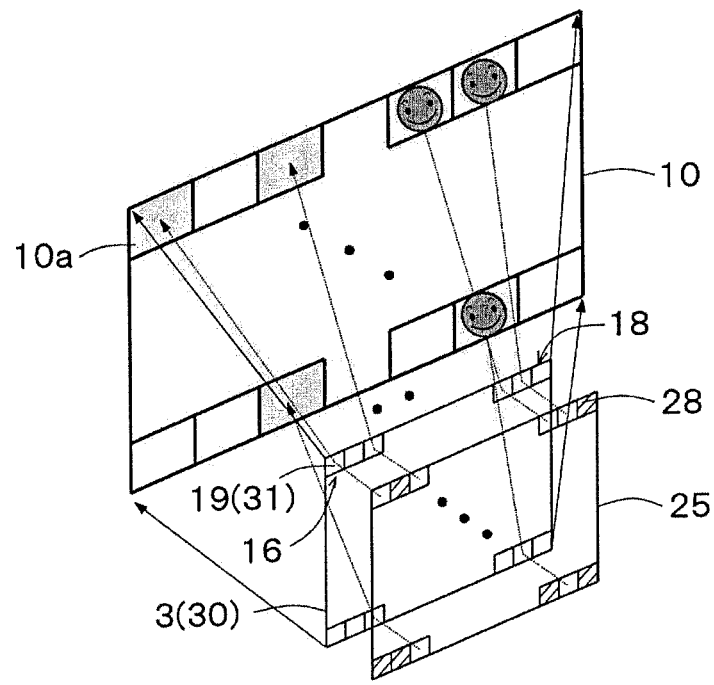
FIG. 30 is a view showing an example in which illumination and information display are performed in an illumination zone.

In FIG. 2, the example in which each element diffusion region 19 in the optical device 3 illuminates the corresponding partial region 10*a* in the illumination zone 10 has been described; however, as shown in FIG. 30, the first diffusion region 16 including at least one element diffusion region 19 that illuminates, in the optical device 3, the corresponding partial region 10*a* in the illumination zone 10, and the second diffusion region 18 including at least one element diffusion region 19 for displaying predetermined information in the corresponding partial region 10*a* in the illumination zone 10 may be provided in the optical device.

In FIG. 30, an example is shown in which the partial region 10*a* in the illumination zone 10 illuminated by the first diffusion region 16 and the partial region 10*a* in the illumination zone 10 displayed as information by the second diffusion region 18 are provided separately; however, these partial regions 10*a* may overlap each other.

The information displayed in the corresponding partial region 10*a* in the illumination zone 10 is changed by at least one of hue, brightness and saturation by each element diffusion region 19 in the second diffusion region 18. More specifically, the information displayed in the corresponding partial region 10*a* in the illumination zone 10 is, for example, at least one of a picture, a pattern, a letter, a number and a symbol, and the specific content of the information is not particularly limited. Information displayed in the corresponding partial region 10*a* in the illumination zone 10 by each element diffusion region 19 in the second diffusion region 18 is, for example, performed for the purpose of giving designs and decorativeness, the purpose of calling attention, the purpose of guidance display, the purpose of advertisement publicity, and the like.

In the case of forming the optical device 3 with the hologram recording medium 30, in each element diffusion region 19 in the first diffusion region 16, the corresponding interference fringe pattern is formed in advance so as to illuminate the corresponding partial region 10a in the illumination zone 10. Similarly, in each element diffusion region 19 in the second diffusion region 18, the corresponding interference fringe pattern is formed in advance so that predetermined information is displayed in the corresponding partial region 10a in the illumination zone 10.

By appropriately forming the appropriate interference fringe pattern in each element hologram area 31 in the hologram recording medium 30 in this manner, the illumination or the predetermined information display can be performed for each partial region 10a in the illumination zone 10 by the laser beam diffracted at each element hologram area 31.

In the case where the first diffusion region 16 and the second diffusion region 18 are provided in the optical device 3 as shown in FIG. 30, the optical shutter 25 has the element shutter units 28 corresponding to each element diffusion region 19 in the first diffusion region 16 and each element diffusion region 19 in the second diffusion region 18. Therefore, by controlling switching of each element shutter unit 28, each element diffusion region 19 in the first diffusion region 16 can individually control the illumination mode of the corresponding partial region 10a in the illumination zone 10, and each element diffusion region 19 in the second diffusion region 18 can individually control the illumination mode of the information displayed in the corresponding partial region 10a in the illumination zone 10.

In the present embodiment, laser beam is used as an illumination light source, so that speckle may be visually recognized in the illumination of the illumination zone 10. In order to make speckle less noticeable, for example, the optical shutter 25 and the optical device 3 may be vibrated in a one-dimensional or two-dimensional direction at a predetermined cycle. Thus, the incident position and the incident angle of the laser beam incident on the optical device 3 through the optical shutter 25 can be changed with the lapse of time. The laser beam incident on one element diffusion region 19 illuminates the common partial region 10a in the illumination zone 10 even if the laser beam is incident on any position in the element diffusion region 19. That is, this means that the incident angle of the laser beam incident on each point of a partial region 10a changes with the lapse of time. By making the vibration period sufficiently fast, it is possible to make the change of the incident angle a speed which cannot be resolved by human eyes, and as a result, the scattering pattern of coherent light beam having no correlation is multiplexed and observed in the human eye. Therefore, the speckle generated corresponding to each scattering pattern is overlapped and averaged, and is observed by the observer. As a result, in the illumination zone 10, speckle becomes less conspicuous.

When the illumination device 1 according to the present embodiment is applied to the illumination device 1 for an in-vehicle such as a headlight, the car constantly vibrates in accordance with the state of the engine and the road surface during traveling. Therefore, the speckle becomes inconspicuous to some extent without providing a vibration mechanism for anti-speckle in the illumination device 1.

In FIG. 27, the laser beam whose beam diameter is expanded by the beam diameter expansion member 26 is incident on the optical shutter 25, and the light transmitted through the optical shutter 25 is incident on the optical device 3. However, the arrangement of the optical shutter 25 and the optical device 3 may be reversed.

Figure 31:
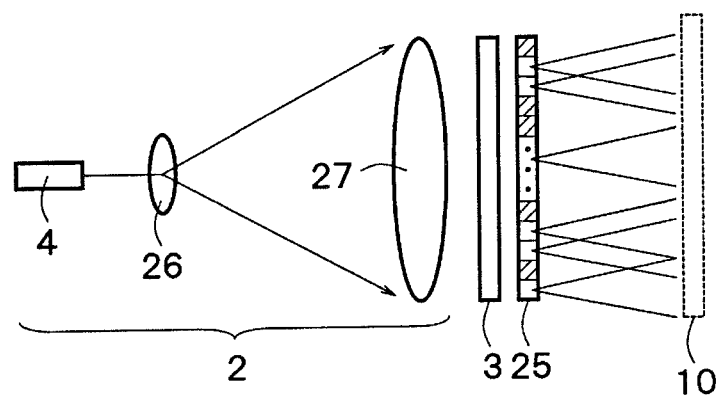
FIG. 31 is a view showing a schematic configuration of an illumination device in which the arrangement of an optical shutter and an optical device is reversed from that in FIG. 1.

FIG. 31 is a view showing a schematic configuration of the illumination device 1 in which the arrangement of the optical shutter 25 and the optical device 3 is reversed from that in FIG. 27. In FIG. 31, the laser beam whose beam diameter is expanded by the beam diameter expansion member 26 is incident on the optical device 3. The optical device 3 has a plurality of element diffusion regions 19, and each element diffusion region 19 diffuses the incident laser beam. The laser beam diffused in each element diffusion region 19 is incident on the corresponding element shutter unit 28 in the optical shutter 25. By switching the transmittance individually by each element shutter unit 28, it is possible to switch the illumination mode for each partial region 10a in the illumination zone 10 as in FIG. 27.

In FIG. 31, the optical shutter 25 is disposed on the optical axis rear side of the optical device 3, but the optical device 3 diffuses the incident laser beam. Therefore, if the distance between the optical device 3 and the optical shutter 25 is large, the laser beam leaking from the optical shutter 25 will be emitted. Therefore, in the case of the configuration of FIG. 31, it is desirable to make the optical shutter 25 as close as possible to the optical device 3.

As described above, in the seventh embodiment, since the plurality of element shutter units 28 are provided in the optical shutter 25 in association with the plurality of element diffusion regions 19 in the optical device 3, it is possible to switch the illumination mode of the illumination zone 10 illuminated by the laser beam diffused by the plurality of element diffusion regions 19 for each partial region 10a in the illumination zone 10. Therefore, although the illumination color of the illumination zone 10 cannot be changed, it is possible to make the illumination mode of the illumination zone 10 excellent in designability or to display some information by the illumination zone 10.

In addition, switching of the illumination mode of the illumination zone 10 can be performed at an arbitrary timing by the optical shutter 25, and the illumination mode of the illumination zone 10 can be easily switched.

Eighth Embodiment

In the eighth embodiment described below, color separation is performed by the optical shutter 25.

Figure 32:
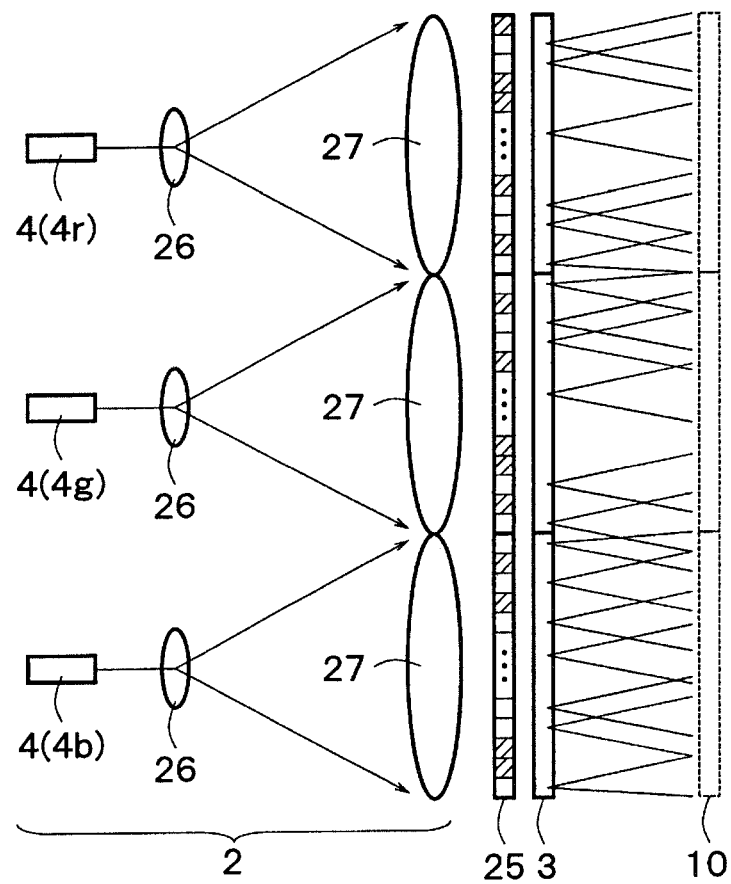
FIG. 32 is a view showing a schematic configuration of an illumination device according to an eighth embodiment of the present invention.
Figure 33:
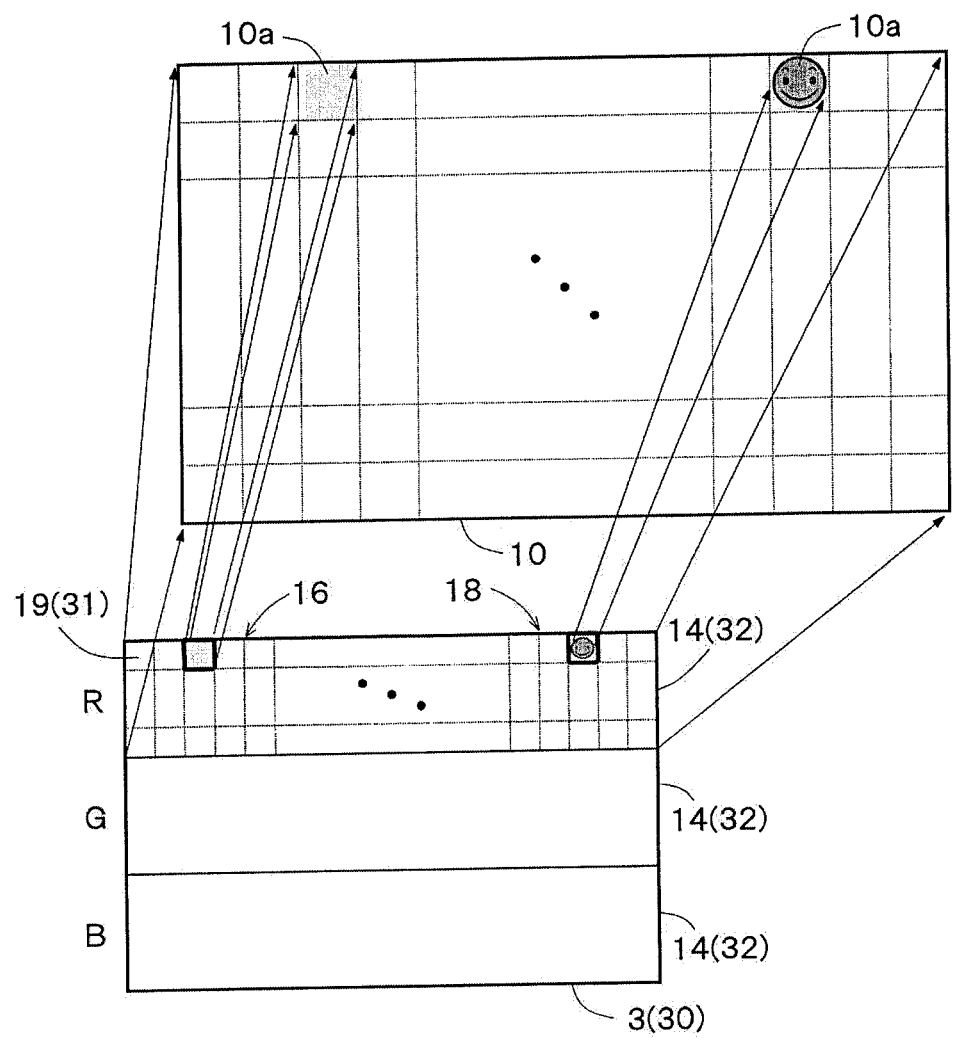
FIG. 33 is a view showing a detailed configuration of an optical shutter and an optical device in the eighth embodiment.

FIG. 32 is a view showing a schematic configuration of the illumination device 1 according to the eighth embodiment of the present invention, and FIG. 33 is a view showing a detailed configuration of the optical shutter 25 and the optical device 3 in the eighth embodiment.

The laser light source 4 in the illumination device 1 in FIG. 32 has a plurality of light source units 4r, 4g, 4b that emit a plurality of coherent light beams, i.e., laser beams having different emission wavelength ranges. The plurality of light source units 5 may be provided separately or may be a light source module in which the plurality of light source units 4r, 4 g, 4b are arranged side by side on a common substrate. It is sufficient that the laser light source 4 of the present embodiment has at least two light source units having different emission wavelength ranges, and the number of types of emission wavelength ranges may be two or more. In order to increase the emission intensity, the plurality of light source units may be provided for each emission wavelength range.

For example, when the laser light source 4 has the light source unit 4r in the red emission wavelength range, the light source unit 4g in the green emission wavelength range, and the light source unit 4b in the blue emission wavelength range, it is possible to generate white illumination light by overlapping three laser beams emitted from the light source units 4r, 4g, 4b.

The optical device 3 has a plurality of diffusion regions 17 corresponding to the plurality of laser beams as shown in FIG. 33. The corresponding laser beam is incident on each diffusion region 17. Each diffusion region 17 diffuses the incident laser beam and illuminates the entire region of the illumination zone 10 as a whole. Each diffusion region part 17 has the plurality of element diffusion regions 19. Each element diffusion region 19 diffuses the incident laser beam and illuminates a partial region 10a in the illumination zone 10. At least a part of the partial region 10a differs for each element diffusion region 19.

The optical shutter 25 has the plurality of element shutter units 28 corresponding to the plurality of element diffusion regions 19 for each of the plurality of diffusion regions. Therefore, in a case where it is desired to switch the illumination color of the entire region of the illumination zone 10 illuminated with one color by one diffusion region irradiated with laser beam of a certain wavelength range at once, switching may be performed using a plurality of element shutter units 28 corresponding to one diffusion region as one set.

In addition, when it is desired to switch the illumination color of an arbitrary partial region 10a in the illumination zone 10, the element shutter units 28 corresponding to any element diffusion regions 19 in an arbitrary diffusion region may be individually switched.

The optical device 3 is configured using, for example, the hologram recording medium 30. As shown in FIG. 33, the hologram recording medium 30 has the plurality of hologram areas 32 corresponding to the plurality of diffusion regions. Each of the hologram areas 32 is provided corresponding to each of the plurality of laser beams having different emission wavelength ranges. Each hologram area 32 has an incident surface on which the corresponding laser beam is incident. The laser beams incident on the incident surface of each hologram area 32 are diffused to illuminate the illumination zone 10. For example, when the hologram recording medium 30 has three hologram areas 32, the laser beam diffused in each hologram area 32 illuminates the entire region of the illumination zone 10.

FIG. 33 shows an example in which three hologram areas 32 are provided in association with three laser beams that emit light in red, blue, or green. However, the hologram recording medium 30 according to the present embodiment may have two or more hologram areas 32 in association with two or more laser beams having different emission wavelength ranges. As shown in FIG. 33, when the hologram recording medium 30 has three hologram areas 32 corresponding to three laser beams that emit light in red, blue, or green, each hologram area 32 illuminates the entire region of the illuminated region 10, so that when the three laser beams emit light, the illumination zone 10 is illuminated with white light.

The size, that is, the area of each hologram area 32 in the hologram recording medium 30 is not necessarily the same. Even if the sizes of the respective hologram areas 32 are different, by individually adjusting the interference fringe formed on the incident surface of each hologram area 32, each hologram area 32 can illuminate the common illumination zone 10.

Each of the plurality of hologram areas 32 has the plurality of element hologram areas 31 corresponding to the plurality of element diffusion regions 19. Each of the plurality of element hologram areas 31 illuminates the partial region 10a in the illumination zone 10 by diffusing the incident laser beam. At least a part of the partial region 10a illuminated by each element hologram area 31 is different for each element hologram area 31. That is, the partial regions 10a illuminated by the different element hologram areas 31 are at least partially different from each other.

An interference fringe pattern is formed on an incident surface of each element hologram area 31. Therefore, the laser beam incident on the incident surface of each element hologram area 31 is diffracted by the interference fringe pattern on the incident surface, and illuminates the corresponding partial region 10a on the illumination zone 10. By adjusting the interference fringe pattern variously, it is possible to change the traveling direction of the laser beam diffracted or diffused in each element hologram area 31.

In the case where the optical device 3 is configured by the hologram recording medium 30, the optical shutter 25 has the plurality of element shutter units 28 corresponding to the plurality of element hologram areas 31 for each of the plurality of hologram areas 32. That is, each element shutter unit 28 of the optical shutter 25 is associated with one element hologram area 31 in the hologram recording medium 30 for each hologram area 21.

Accordingly, for each laser beam having different wavelength ranges, the optical shutter 25 according to the eighth embodiment can switch all the corresponding illumination modes of the illumination zone 10 at once by switching the corresponding plurality of element shutter units 28 at once. In addition, the optical shutter 25 can switch the illumination mode including the illumination color for each partial region 10a in the illumination zone 10 by individually switching the transmittance for each element shutter unit 28.

Also in the eighth embodiment, as described with reference to FIG. 30, for each of the plurality of laser beams having different wavelength ranges, the first diffusion region 16 for illumination and the second diffusion region 18 for information display may be provided in each diffusion region in the optical device 3. In this case, the optical shutter 25 has the element shutter unit 28 in association with each element diffusion region 19 in the first diffusion region 16 and each element diffusion region 19 in the second diffusion region 18.

Thus, it is possible to individually control the illumination mode in each partial region 10a for illumination in the illumination zone 10 and the illumination mode in each partial region 10a for information display.

As described above, in the eighth embodiment, the plurality of diffusion regions 17 irradiated with laser beams having different wavelength ranges are provided in the optical device 3, and each diffusion region 17 has the plurality of element diffusion regions 19 and the plurality of element shutter units 28 corresponding to the plurality of element diffusion regions 19 are provided in the optical shutter 25. Therefore, by individually switching the transmittance for each element shutter unit 28, it is possible to switch and control the illumination mode including the illumination color for each partial region 10a in the illumination zone 10.

In the case where the optical device 3 according to the first and eighth embodiments is realized by the hologram recording medium 30, it is necessary to form the hologram recording medium 30 with the plurality of element hologram areas 31 and form the interference fringe pattern for each element hologram area 31. Without using actual object light and reference light, the interference fringe pattern can be designed using a computer based on the scheduled wavelength and incident direction of the reconstruction illumination light and the shape and position of the image to be reproduced. The hologram recording medium 30 thus obtained is also called a computer generated hologram (CGH). In addition, a Fourier transform hologram having the same diffusion angle characteristic at each point on each element hologram area 3121 may be formed by computer synthesis. Furthermore, an optical member such as a lens may be provided on the rear side of the optical axis of the illumination zone 10 to set the size and position of the actual illumination area.

One advantage of providing the hologram recording medium 30 as the optical device 3 is that the optical energy density of the laser beam can be reduced by diffusion, and in addition, another advantage is that since the hologram recording medium 30 can be used as a directivity surface light source, the luminance on the light source surface for achieving the same illuminance distribution can be reduced compared with the conventional lamp light source (point light source). This can contribute to improving the safety of the laser beam, and even if the laser beam having passed through the illumination zone 10 is viewed directly with a human eye, there is less possibility of adversely affecting the human eye as compared with the case of looking directly at a single point light source.

FIG. 27 shows an example in which the laser beam from the light scanning device 6 diffuses through the optical device 3, but the optical device 3 may diffuse and reflect the laser beam. For example, when the hologram recording medium 30 is used as the optical device 3, the hologram recording medium 30 may be a reflection type or a transmission type. Generally, the reflection type hologram recording medium 30 (hereinafter, reflection type holo) has high wavelength selectivity as compared with the transmission type hologram recording medium 30 (hereinafter, transmission type holo). That is, even when the interference fringe pattern corresponding to different wavelengths is laminated the reflection type holo can diffract coherent light beam of a desired wavelength only in a desired layer. Also, the reflection type holo is superior in that it is easy to remove the influence of zero order light. On the other hand, the transmission type holo has a wide diffractable spectrum and a wide tolerance of the laser light source 4. However, when the interference fringe pattern corresponding to different wavelengths is laminated, coherent light beam of a desired wavelength is diffracted even in a layer other than the desired layer. Therefore, in general, it is difficult to form a transmission type holo with a laminated structure.

As a specific form of the hologram recording medium 30, a volume hologram recording medium 30 using a photopolymer may be used, a volumetric hologram recording medium 30 of a type that performs recording using a photosensitive medium containing a silver salt material may be used, and a relief type (emboss type) hologram recording medium 30 may be used.

The specific form of the optical device 3 is not limited to the hologram recording medium 30, and may be various diffusion members that can be finely divided into the plurality of element diffusion regions 19. For example, the optical device 3 may be configured using a lens array group in which each element diffusion region 19 is a single lens array. In this case, a lens array is provided for each element diffusion region 19, and the shape of each lens array is designed so that each lens array illuminates the partial region 10a in the illumination zone 10. At least a part of the position of each partial region 10a is different. As a result, similarly to the case where the optical device 3 is configured using the hologram recording medium 30, illumination can be performed for each partial region 10a in the illumination zone 10.

Ninth Embodiment

Figure 34:
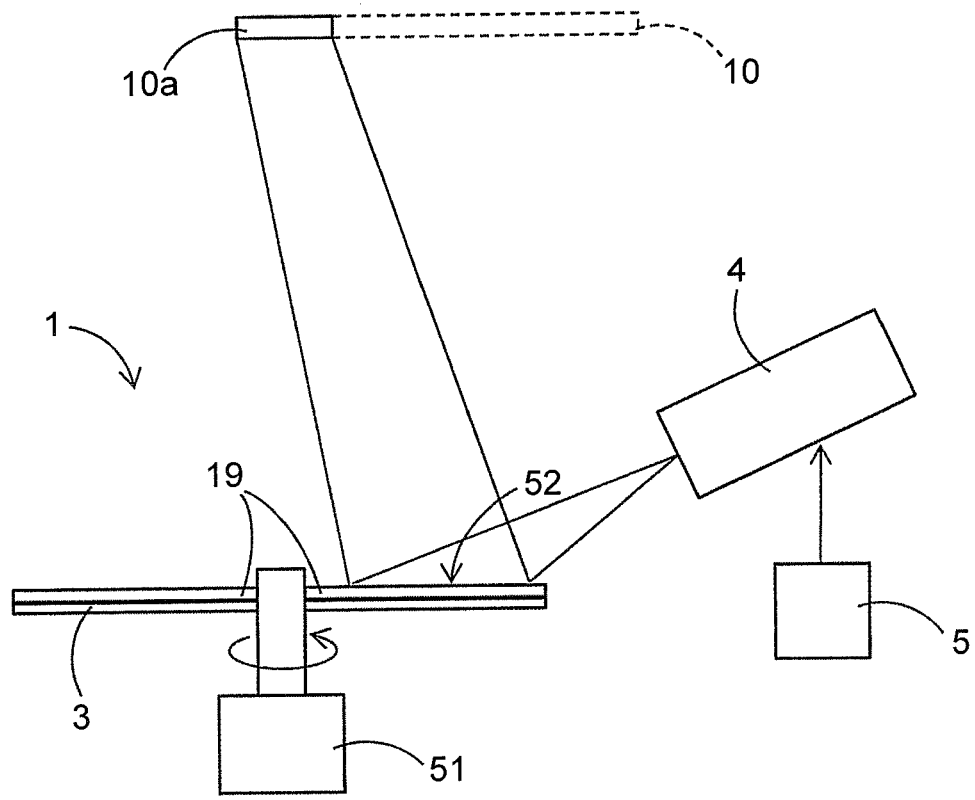
FIG. 34 is a view showing a schematic configuration of an illumination device according to a ninth embodiment of the present invention.
Figure 35:
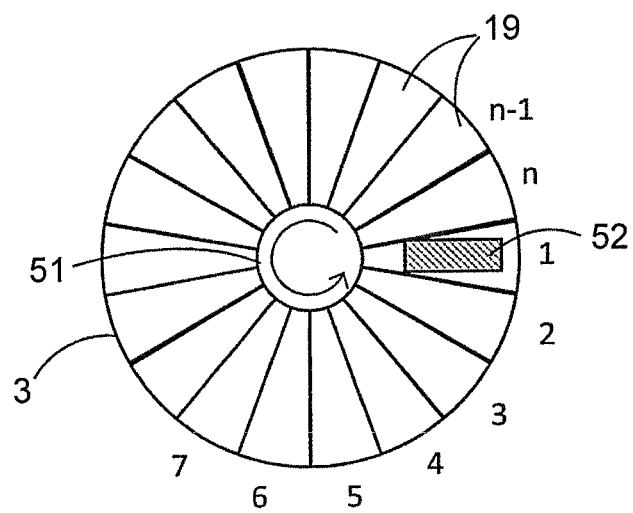
FIG. 35 is a plan view of a diffusion unit in the illumination device of FIG. 34.

FIG. 34 is a view showing a schematic configuration of the illumination device 1 according to the ninth embodiment of the present invention. FIG. 35 is a plan view of the optical device 3 in the illumination device 1 in FIG. 34.

As shown in FIG. 34, the illumination device 1 according to the present embodiment includes a coherent light source 4 that emits coherent light beam, the optical device 3 that holds a plurality of diffusion regions (diffusion elements) 19 for diffusing coherent light beam, a driving unit 51 that moves the optical device 3 such that each of the plurality of diffusion regions 19 sequentially reaches an illumination position 52 of the coherent light beam, and a timing control unit 5 that controls the timing of the coherent light beam.

As the coherent light source 4, for example, a semiconductor laser light source can be used. In order to increase the light emission intensity, the coherent light source 4 may be configured to collect the coherent light beam emitted from the plurality of laser light sources with the fiber and then emit the light toward the illumination position 52.

The timing control unit 5 controls the timing at which coherent light beam is emitted from the coherent light source 4.

Specifically, for example, the timing control unit 5 controls whether coherent light beam is emitted from the coherent light source 4, that is, on/off of light emission. Alternatively, the timing control unit 5 may switch whether or not to guide the coherent light beam emitted from the coherent light source 4 to the incident surface of the optical device 3. In the latter case, an optical shutter unit (not shown) is provided between the coherent light source 4 and the optical device 3, and the passing/blocking of coherent light beam is switched by the optical shutter unit.

The optical device 3 has an incident surface on which coherent light beam is incident, and diffuses the coherent light beam incident on the incident surface to illuminate the predetermined illumination area 10. More specifically, the coherent light beam diffused by the optical device 3 passes through the predetermined illumination area 10 and then illuminates the actual illumination area.

Here, the predetermined illumination area 10 is the illumination area of the near field illuminated by the optical device 3. The illumination area of the far field is often expressed as a diffusion angle distribution in the angular space rather than the actual size of the illumination area. In the present specification, the term "predetermined area" includes a diffusion angle area in the angular space in addition to the actual illumination zone (illumination area). Therefore, the illumination area illuminated by the illumination device 1 in FIG. 34 can be a much wider area than the illumination area 21 of near field shown in FIG. 34.

As shown in FIG. 35, the plurality of diffusion regions 19 are arranged on the incident surface of the optical device 3.

In the illustrated example, the optical device 3 has a disc shape. The optical device 3 is positioned so that the center axis of the optical device 3 is decentered with respect to the illumination position 52 of the coherent light beam.

Each of the plurality of diffusion regions 19 has a substantially trapezoidal shape and is arranged on the incident surface of the optical device 3 along the circumference passing through the illumination position 52 of the coherent light beam without leaving a gap.

The driving unit 51 is, for example, a rotary motor, and is configured so as to continuously rotate the optical device 3 around a central axis thereof. When the optical device 3 is rotated by the driving unit 51, each of the plurality of diffusion regions 19 held by the optical device 3 sequentially passes through the illumination position 52 of the coherent light beam. When viewed from the stationary system of the optical device 3, the illumination position 52 of the coherent light beam sequentially scans the plurality of diffusion regions 19 held by the optical device 3.

Incidentally, as mentioned in the section of the technical problem, in a configuration in which coherent light beam is scanned by using the optical scanning unit including a galvanometer mirror, a MEMS mirror, or the like, depending on the light source, the beam diameter of the coherent light beam may be larger than the galvanometer mirror, and in some cases there is a possibility that the coherent light beam is narrowed down in order to irradiate the galvanometer mirror. However, if the coherent light beam is focused down, there is a possibility that the energy density is increased and the mirror may be affected by damage or the like, and as a result, the light output may be inevitably reduced. Also, depending on the light source, if the coherent light beam is excessively narrowed, the spread of the beam at the narrowed end (that is, at the tip of the galvanometer mirror) becomes large, which may degrade the incidence of light. In order to improve this, it is necessary to enlarge the device. It is also conceivable to increase the size of the galvanometer mirror without limiting the coherent light beam, but in this case, the whole device becomes large and expensive. In addition, it is difficult to make the entire device larger in size due to the balance of placement. Also, since the structure of the galvanometer mirror and the MEMS mirror is complicated, it may become unstable depending on the situation.

On the other hand, in the present embodiment, as described above, coherent light beam can be scanned on the optical device 3 without using the optical scanning unit including the galvanometer mirror, the MEMS mirror, or the like. Therefore, even when the beam diameter of the coherent light beam emitted from the coherent light source is relatively large, there is no need to narrow the coherent light beam or enlarge the entire device. Further, in the present embodiment, since the simple structure of rotating the optical device 3 by the rotary motor is adopted, as compared with the optical scanning unit including the galvanometer mirror, the MEMS mirror or the like, the operation is unlikely to become unstable depending on the situation.

The driving unit 51 repeats the operation of rotating the optical device 3 at a constant period, for example, and in synchronization with this period, each of the plurality of diffusion regions 19 held by the optical device 3 repeatedly passes through the illumination position 52 of the coherent light beam in order.

Figure 36A:
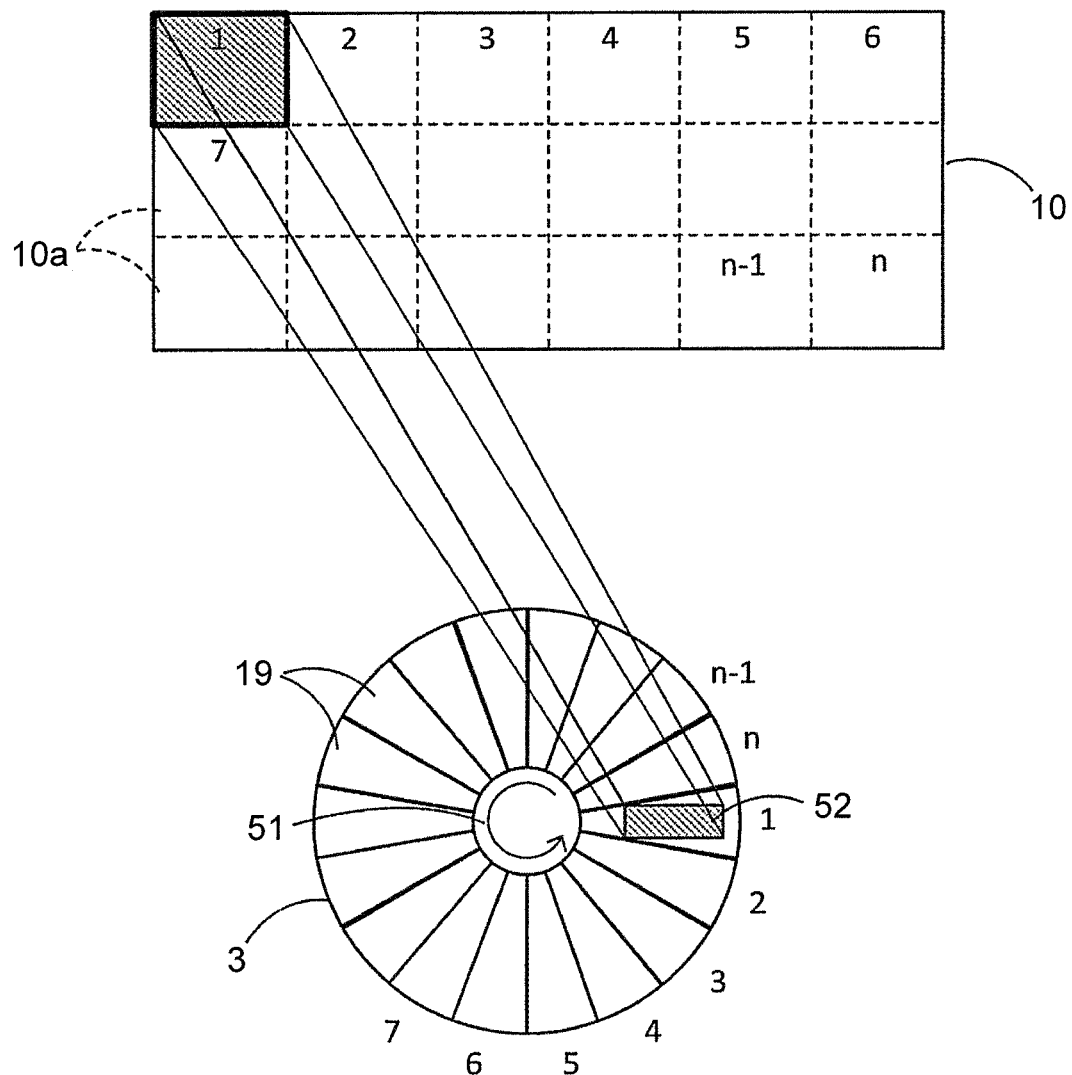
FIG. 36A is a view showing how a first optical device reaches an illumination position of the coherent light beam.
Figure 36B:
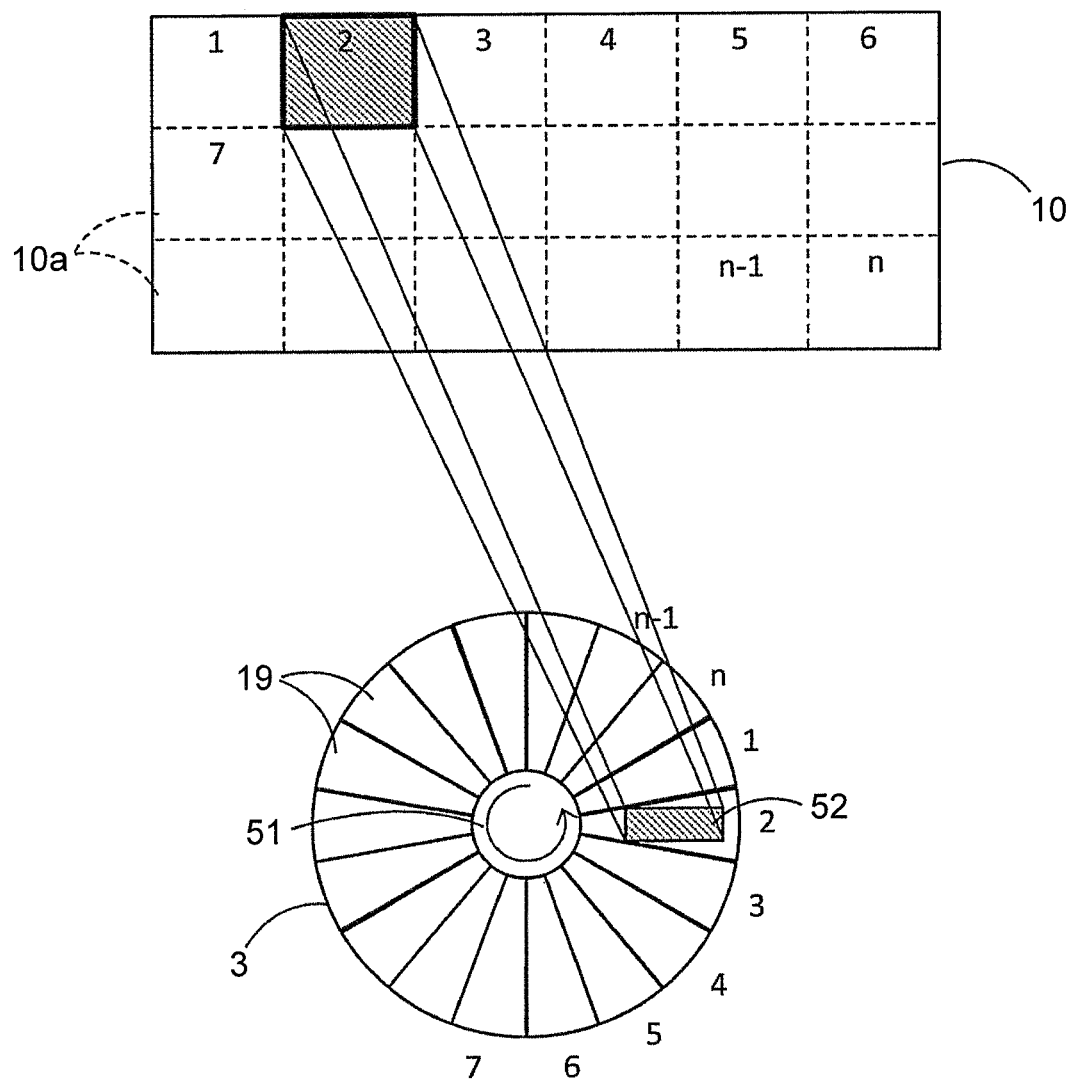
FIG. 36B is a view showing how a second optical device reaches the illumination position of the coherent light beam.

FIGS. 36A and 36B are views showing how the plurality of diffusion regions 19 held by the optical device 3 sequentially reach the illumination position 52 of the coherent light beam.

As shown in FIGS. 36A and 36B, each of the plurality of diffusion regions 19 held by the optical device 3 diffuses the incident coherent light beam and illuminates the corresponding partial region 10a in the predetermined illumination area 10. At least a part of the partial region 10a illuminated by each diffusion region 19 is different for each diffusion region 19. That is, the partial regions 10a illuminated by different diffusion regions 19 are at least partially different.

Specifically, for example, each of the plurality of diffusion regions 19 can be configured using a hologram recording medium in which a different interference fringe pattern is formed. The coherent light beam incident on each diffusion region 19 is diffracted by the interference fringe pattern formed in the diffusion region 19 to illuminate the corresponding partial region 10a in the predetermined illumination area 10. By adjusting the interference fringe pattern variously, it is possible to change the traveling direction of the coherent light beam diffracted or diffused by each diffusion region 19.

In this manner, the coherent light beam incident on each point in each diffusion region 19 illuminates the corresponding partial region 10a in the predetermined illumination area 10. In addition, as a driving device 14 continuously rotates the optical device 3 in the rotation direction, the incident position and the incident angle of the coherent light beam incident on each diffusion region 19 are changed with the lapse of time. The coherent light beam incident into one diffusion region 19 illuminates the common partial region 10a even if the coherent light beam is incident on any position in the diffusion region 19. That is, this means that the incident angle of the coherent light beam L incident on each point of the partial region 10a changes with the lapse of time. This change in the incident angle is a speed that cannot be resolved by the human eye, and as a result, the scattering pattern of the coherent light beam having no correlation is multiplexed and observed in the human eye. Therefore, the speckle generated corresponding to each scattering pattern is overlapped and averaged, and is observed by the observer. As a result, in the partial region 10a, speckle becomes less conspicuous. Since the incident position and incident angle of the coherent light beam incident on each diffusion region 19 are changed with the lapse of time, the coherent light beam diffracted at each point in each diffusion region 19 has different wave fronts, and since these diffracted coherent light beams are individually superimposed on the partial region 10a, a uniform illuminance distribution in which the speckle is inconspicuous can be obtained in the partial region 10a.

FIGS. 36A and 36B shows an example in which each diffusion region 19 illuminates different partial regions 10a in the predetermined area 10. However, a part of the partial region 10a may overlap the adjacent partial region 10a. Further, the size of the partial region 10a may be different for each diffusion region 19. Furthermore, it is unnecessary that the corresponding partial region 10a is arranged in the illumination area 10 according to the arrangement order of the diffusion region 19. That is, the arrangement order of the diffusion region 19 in the optical device 3 and the arrangement order of the corresponding partial region 10a in the illumination area 10 are not necessarily coincident.

Next, the structure of the hologram recording medium in the diffusion region 19 will be described in detail.

The hologram recording medium can be manufactured by using, for example, scattered light from a real scattering plate as object light. More specifically, when the hologram photosensitive material which is the base of the hologram recording medium is illuminated with reference light and object light made of coherent light beam having coherency with each other, an interference fringe pattern due to interference of these light beams is formed on the hologram photosensitive material, and the hologram recording medium is manufactured. A laser beam which is coherent light beam is used as reference light, and scattered light of an isotropic scattering plate on which incidence of light can be performed at low cost, for example, is used as object light.

By illuminating the hologram recording medium with coherent light beam from the focal position of the reference light used for manufacturing the hologram recording medium, a reproduced image of the scattering plate is generated at the arrangement position of the scattering plate which is the source of the object light used in manufacturing the hologram recording medium. When the scattering plate which is the source of the object light used for manufacturing the hologram recording medium has uniform surface scattering, a reproduced image of the scattering plate obtained by the hologram recording medium is also a uniform plane illumination, and a region where the reproduced image of this scattering plate is generated is the partial region 10a.

In the present embodiment, illumination control that illuminates only a part of the predetermined illumination area 10 can be performed using the plurality of diffusion regions 19 held by the optical device 3. In order to perform such illumination control using the hologram recording medium, the interference fringe pattern formed in each diffusion region 19 becomes complicated. Instead of using actual object light and reference light for forming such a complicated interference fringe pattern, the interference fringe pattern can be designed using a computer based on the scheduled wavelength and incident direction of the reconstruction illumination light and the shape and position of the image to be reproduced. The hologram recording medium thus obtained is also called a computer generated hologram (CGH). In addition, a Fourier transform hologram having the same diffusion angle characteristic at each point on each diffusion region 19 may be formed by computer synthesis. Further, an optical member such as a lens may be provided on the rear side of the optical axis of the predetermined illumination area 10 to set the size and position of the actual illumination area.

One advantage of using the hologram recording medium as each of the plurality of diffusion regions 19 held by the optical device 3 is that the optical energy density of the coherent light beam can be reduced by diffusion. Another advantage is that since the hologram recording medium can be used as a directivity surface light source, compared to the conventional lamp light source (point light source), it is possible to reduce the luminance on a light source surface necessary for achieving the same illuminance distribution. This can contribute to improving the safety of the coherent light beam, and even if the coherent light beam having passed through the predetermined illumination area 10 is viewed directly with a human eye, there is less possibility of adversely affecting the human eye as compared with the case of looking directly at a single point light source.

In FIG. 34, the example in which the coherent light beam is reflected and diffused by the diffusion region 19 has been shown, but the diffusion region 19 may diffuse the coherent light beam in a transmitted manner. For example, when a hologram recording medium is used as the diffusion region 19, the hologram recording medium may be a reflection type or a transmission type. Generally, the reflection type hologram recording medium (hereinafter, reflection type holo) has high wavelength selectivity as compared with the transmission type hologram recording medium (hereinafter, transmission type holo). That is, even when the interference fringe pattern corresponding to different wavelengths is laminated the reflection type holo can diffract coherent light beam of a desired wavelength only in a desired layer. Also, the reflection type holo is superior in that it is easy to remove the influence of zero order light. On the other hand, the transmission type holo has a wide diffractable spectrum and a wide tolerance of the coherent light source 4. However, when the interference fringe pattern corresponding to different wavelengths is laminated, coherent light beam of a desired wavelength is diffracted even in a layer other than the desired layer. Therefore, in general, it is difficult to form a transmission type holo with a laminated structure.

As a specific form of the hologram recording medium, a volume hologram recording medium using a photopolymer may be used, and a volumetric hologram recording medium of a type that performs recording using a photosensitive medium containing a silver salt material may be used. Alternatively, a relief type (emboss type) hologram recording medium may be used.

In the present embodiment, the driving device 14 sequentially makes the plurality of diffusion regions 19 held by the optical device 3 reach the illumination position 52 of the coherent light beam, and the timing control unit 5 is configured to control the timing of the coherent light beam in synchronization with the timing at which each diffusion region 19 reaches the illumination position 52.

It is possible to selectively illuminate an arbitrary area in the predetermined illumination area 10 by controlling whether or not each diffusion region 19 is irradiated with the coherent light beam, by the timing control unit 5. At this time, each partial region 10a included in the selected region is sequentially illuminated by coherent light beam at a speed as if illuminated simultaneously by the human eye.

Next, the operation of the present embodiment will be described by taking as an example a case where the illumination device 1 is used as a headlamp of a car.

Figure 46:
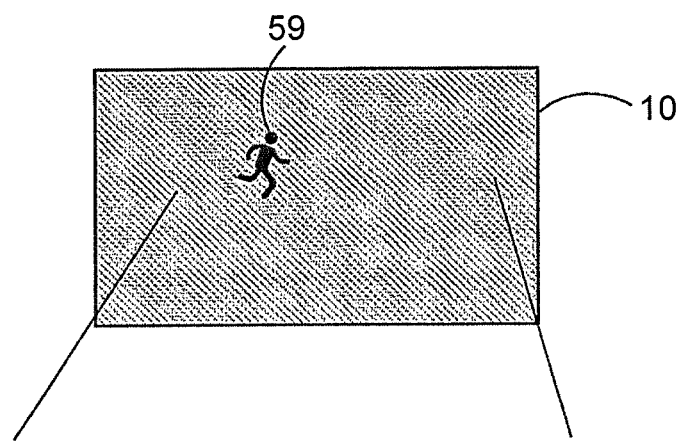
FIG. 46 is a view showing an example in which a region that meets a high beam standard is illuminated in a predetermined area.

As shown in FIG. 46, when there are no cars traveling in the front or oncoming cars in the predetermined illumination area 10, the timing control unit 5 controls the timing of the coherent light beam so as to illuminate a region conforming to a high beam (also referred to as a traveling headlamp) standard (in the illustrated example, the entire region of the predetermined illumination area 10).

Specifically, for example, coherent light beam is emitted from the coherent light source 4 toward the illumination position 52, the optical device 3 is continuously rotated by the driving unit 51, and each of the plurality of diffusion regions 19 held by the optical device 3 sequentially passes through the illumination position 52 of the coherent light beam.

At this time, the timing control unit 5 controls the timing of the coherent light beam so that the all the diffusion regions 19 held by the optical device 3 is irradiated with coherent light beam. As a result, as shown in FIG. 46, the entire region of the predetermined illumination area 10 is illuminated, and a pedestrian 59 etc. walking in the front can be visually recognized.

Figure 47:
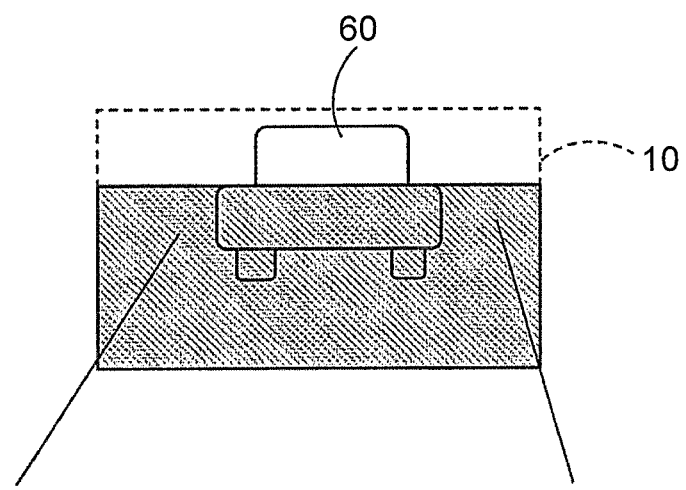
FIG. 47 is a view showing an example in which a region that meets a low beam standard is illuminated in a predetermined area.

On the other hand, as shown in FIG. 47, when there is a car 60 traveling in the front or an oncoming car in the predetermined illumination area 10, the timing control unit 5 controls the timing of the coherent light beam so as to illuminate a region conforming to a low beam (also referred to as a passing headlamp) standard (for example, the region below the horizontal plane among the predetermined illumination area 10).

Specifically, for example, coherent light beam is emitted from the coherent light source 4 toward the illumination position 52, the optical device 3 is continuously rotated by the driving unit 51, and each of the plurality of diffusion regions 19 held by the optical device 3 sequentially passes through the illumination position 52 of the coherent light beam.

At this time, the timing control unit 5 identifies the partial region 10a corresponding to the region conforming to the low beam standard among the plurality of partial regions 10a in the predetermined illumination area 10, and controls the timing of coherent light beam so that the diffusion region 19 corresponding to the identified partial region 10a is irradiated with coherent light beam, but the other diffusion region 19 is not irradiated with coherent light beam. As a result, as shown in FIG. 47, a region that meets the low beam standard in the predetermined illumination area 10 is illuminated, and the other region in the predetermined illumination area 10 is non-illuminated. Accordingly, it is possible to prevent the coherent light beam from dazzling the car 60 traveling ahead and the driver of the oncoming vehicle.

According to the present embodiment as described above, the optical device 3 holds the plurality of diffusion regions 19, and each diffusion region 19 illuminates the corresponding partial region 10a in the predetermined illumination area 10. The driving unit 51 moves the optical device 3 such that each of the plurality of diffusion regions 19 sequentially passes through the illumination position 52 of the coherent light beam. Therefore, when the timing of the coherent light beam is not controlled, the coherent light beam is diffused in all the diffusion regions 19 held by the optical device 3 so that the entire region of the predetermined illumination area 10 can be illuminated as a whole.

Here, according to the present embodiment, coherent light beam can be diffused by sequentially irradiating the plurality of diffusion regions 19 that demonstrate different partial regions with coherent light beam without using optical scanning unit including a galvanometer mirror, a MEMS mirror or the like. Therefore, even when the beam diameter of the coherent light beam emitted from the coherent light source 4 is relatively large, it is unnecessary to narrow down the coherent light beam or enlarge the entire device.

Further, according to the present embodiment, since it is possible to adopt a simple structure of rotating the optical device 3 by the rotary motor as a structure for scanning the illumination position 52 of the coherent light beam on the optical device 3, the operation is unlikely to become unstable depending on the situation as compared with the optical scanning unit including the galvanometer mirror, the MEMS mirror or the like.

Further, according to the present embodiment, the illumination position 52 of the coherent light beam is scanned in each diffusion region 19, and since the coherent light beam incident on each point in each diffusion region 19 illuminates the entire region of the corresponding partial region 10a, the incident angle of the coherent light beam in each partial region 10a in the predetermined illumination area 10 changes with the lapse of time, so that it is possible to make speckle in each partial region 10a inconspicuous.

Furthermore, according to the present embodiment, it is possible to selectively illuminate an arbitrary area in the predetermined illumination area 10 by controlling whether or not each diffusion region 19 is irradiated with the coherent light beam, by the timing control unit 5. Thus, for example, when the illumination device 1 is used as a headlamp of a car, it is possible to easily switch between a region conforming to a high beam standard in the predetermined illumination area 10 and a region conforming to a low beam standard, and when there is a car 60 traveling in the front or an oncoming car in the predetermined illumination area 10, it is possible to prevent the coherent light beam from dazzling the vehicle 60 traveling ahead and the driver of the oncoming vehicle.

In the present embodiment, the timing control unit 5 is not always indispensable. In the case where it is sufficient to illuminate the entire region of the predetermined illumination area 10 using coherent light beam, such as when the illumination device 1 is used as a high beam dedicated headlamp (running headlamp), the timing control unit 5 may be omitted.

It is to be noted that various modifications can be made to the above-described embodiment. Hereinafter, modifications will be described with reference to the drawings. In the following description and the drawings used in the following description, the same reference numerals as those used for the corresponding parts in the above-described embodiments are used for parts that can be configured similarly to the above-described embodiment, and overlapping explanation will be omitted. Further, when it is obvious that the operation and effect obtained in the above-described embodiment can be obtained also in the modified example, the explanation may be omitted.

Tenth Embodiment

Figure 37:
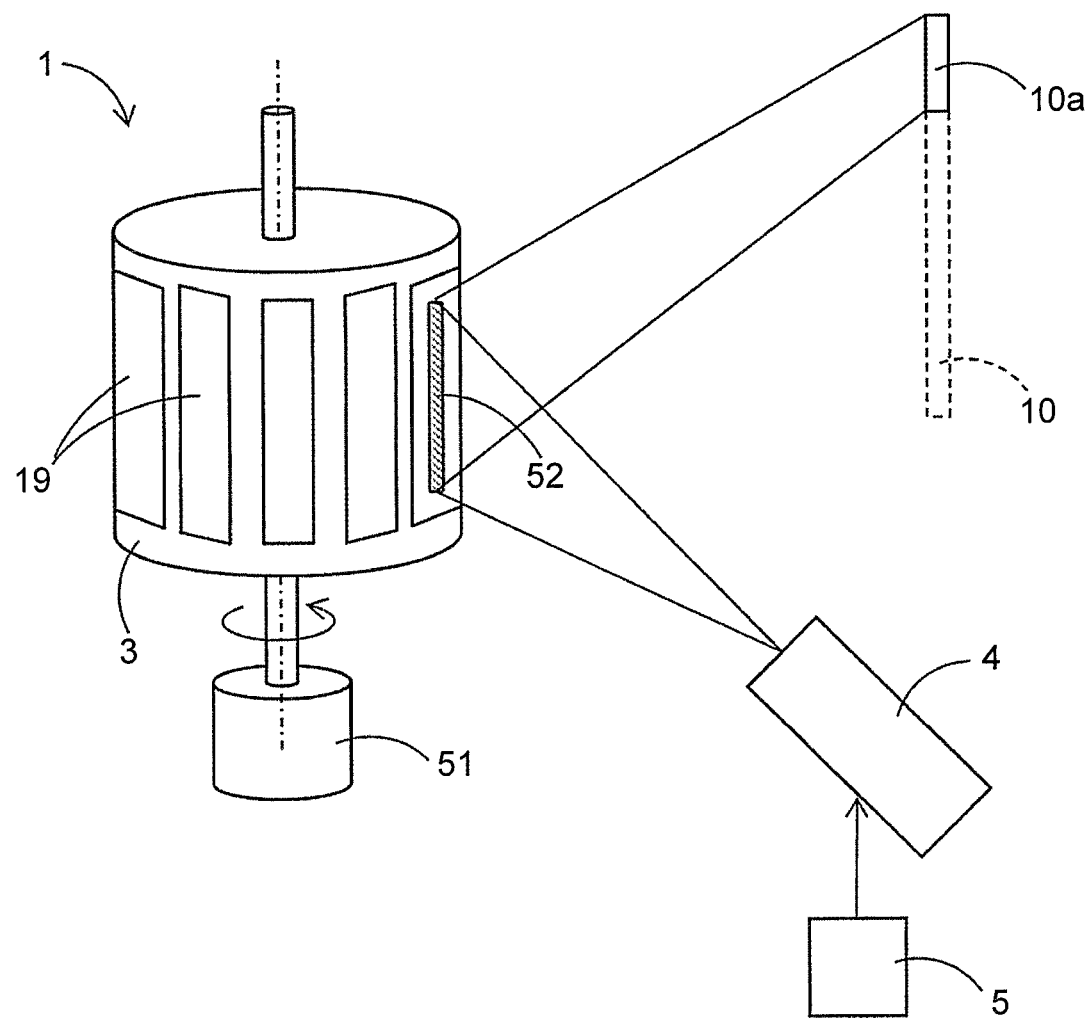
FIG. 37 is a view showing a schematic configuration of an illumination device according to a tenth embodiment of the present invention.

FIG. 37 is a view showing a schematic configuration of an illumination device according to the tenth embodiment of the present invention.

As shown in FIG. 37, in the tenth embodiment, the optical device 3 has a cylindrical shape, and the outer peripheral surface of the optical device 3 is an incident surface on which the coherent light beam is incident.

Each of the plurality of diffusion regions 19 has an elongated shape extending in a direction parallel to the axial direction of the optical device 3, and is arranged along the circumferential direction on the incident surface of the optical device 3, that is, on the outer peripheral surface.

The driving unit 51 is, for example, a rotary motor, and is configured so as to continuously rotate the optical device 3 around a central axis thereof. When the optical device 3 is rotated by the driving unit 51, each of the plurality of diffusion regions 19 held by the optical device 3 sequentially passes through the illumination position 52 of the coherent light beam.

According to the tenth embodiment like this, in addition to obtaining the same operational effect as the ninth embodiment, the following operational effects can be obtained. That is, in the case of enlarging each diffusion region 19 in the longitudinal direction to increase the size, in the ninth embodiment, twice as much space is required to the right and left around the rotation axis of the optical device 3. On the other hand, in the tenth embodiment, only one space is required in a direction parallel to the rotation axis of the optical device 3, that is, the size of the entire device can be made compact.

Eleventh Embodiment

Figure 38:
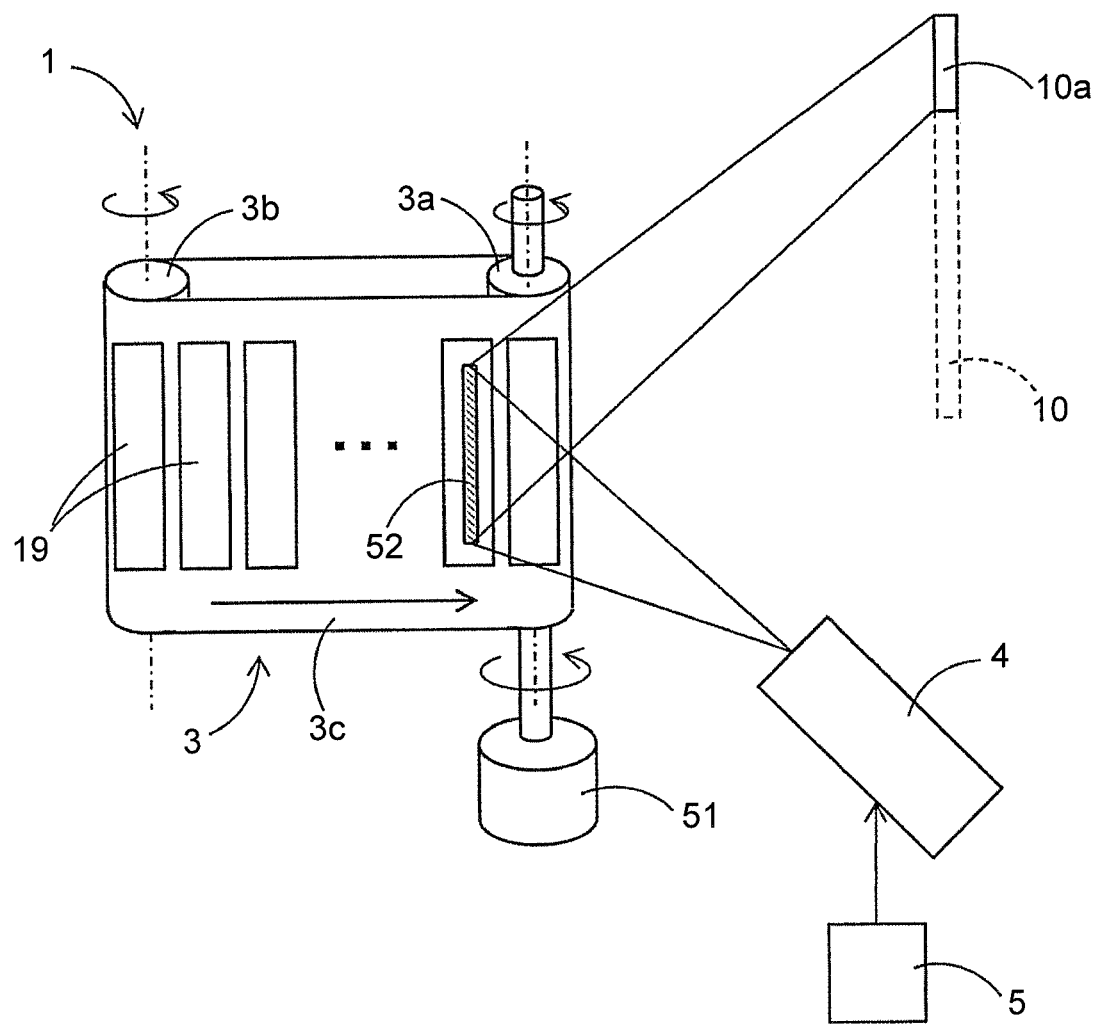
FIG. 38 is a view showing a schematic configuration of an illumination device according to an eleventh embodiment of the present invention.

FIG. 38 is a view showing a schematic configuration of an illumination device according to the eleventh embodiment of the present invention.

As shown in FIG. 38, in the eleventh embodiment, the optical device 3 has a pair of rotating rollers 3a, 3b rotatable about their respective axes, and a belt-like portion 3c looped around a pair of rotating rollers 3a, 3b. In the illustrated example, the number of the rotating rollers 3a and 3b is two, but may be three or more. The pair of rotating rollers 3a, 3b are arranged in parallel to each other. The outer peripheral surface of the belt-like portion 3c is an incident surface on which the coherent light beam is incident.

Each of the plurality of diffusion regions 19 has an elongated shape extending in a direction parallel to the axial direction of the rotating rollers 3a and 3b, and on the outer surface of the belt-like portion 3c, is arranged along the longitudinal direction of the belt-like portion 3c, that is, along the looped direction of the belt-like portion 3c.

The driving unit 51 is, for example, a rotary motor, and is configured so as to continuously rotate at least one rotating roller 3a about an axis thereof. As the at least one rotating roller 3a is rotated by the driving unit 51, the belt-like portion 3c is moved in the looping direction, and each of the plurality of diffusion regions 19 arranged on the belt-like portion 3c passes through the illumination position 52 of the coherent light beam in order.

According to the eleventh embodiment like this, in addition to obtaining the same operational effect as the tenth embodiment, the following operational effects can be obtained. That is, in the eleventh embodiment, as compared with the tenth embodiment, since the thickness of the optical device 3 is thin, it is easy to install the optical device 3 in a narrow space such as under a bonnet of a car.

Twelfth Embodiment

Figure 39:
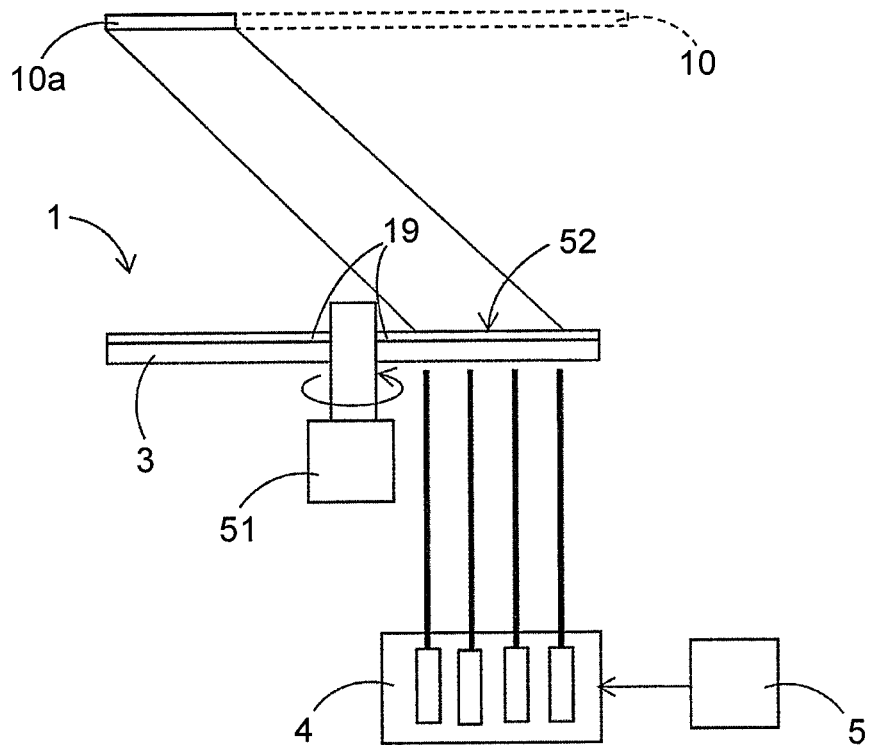
FIG. 39 is a view showing a schematic configuration of an illumination device according to a twelfth embodiment of the present invention.
Figure 40:
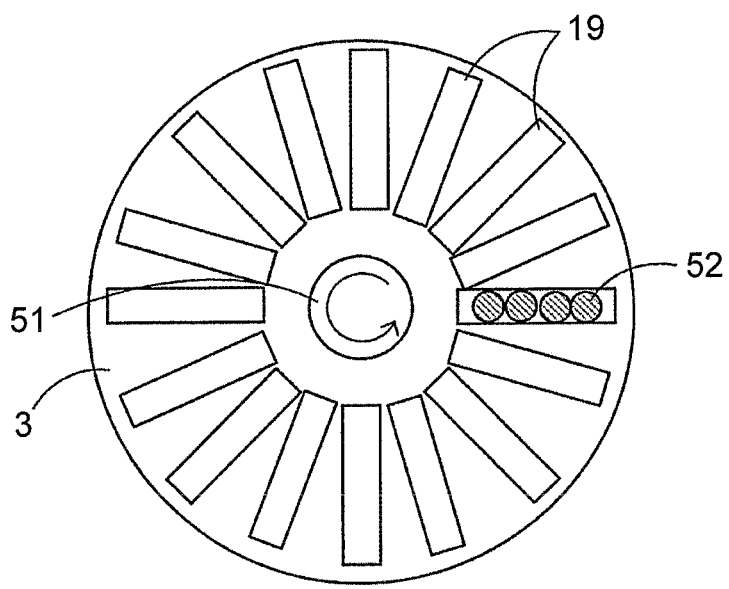
FIG. 40 is a plan view of a diffusion unit in the illumination device in FIG. 39.

FIG. 39 is a view showing a schematic configuration of an illumination device according to a twelfth embodiment of the present invention. FIG. 40 is a plan view of the diffusion unit in the illumination device in FIG. 39.

As shown in FIGS. 39 and 40, in the twelfth embodiment, each of the plurality of diffusion regions 19 has an elongated shape extending in a direction perpendicular to the moving direction of the optical device 3, and in the illustrated example, a radial direction perpendicular to the rotation direction.

In addition, the coherent light source 4 has a laser array arranged in a direction perpendicular to the moving direction of the optical device 3, and in the illustrated example, in a radial direction perpendicular to the rotation direction. Since the laser array is arranged in parallel with the longitudinal direction of the diffusion region 19, a plurality of coherent light beams emitted from the laser array are simultaneously incident on the same single diffusion region 19.

According to the twelfth embodiment, the light emission intensity of the coherent light beam can be increased.

Thirteenth Embodiment

Figure 41:
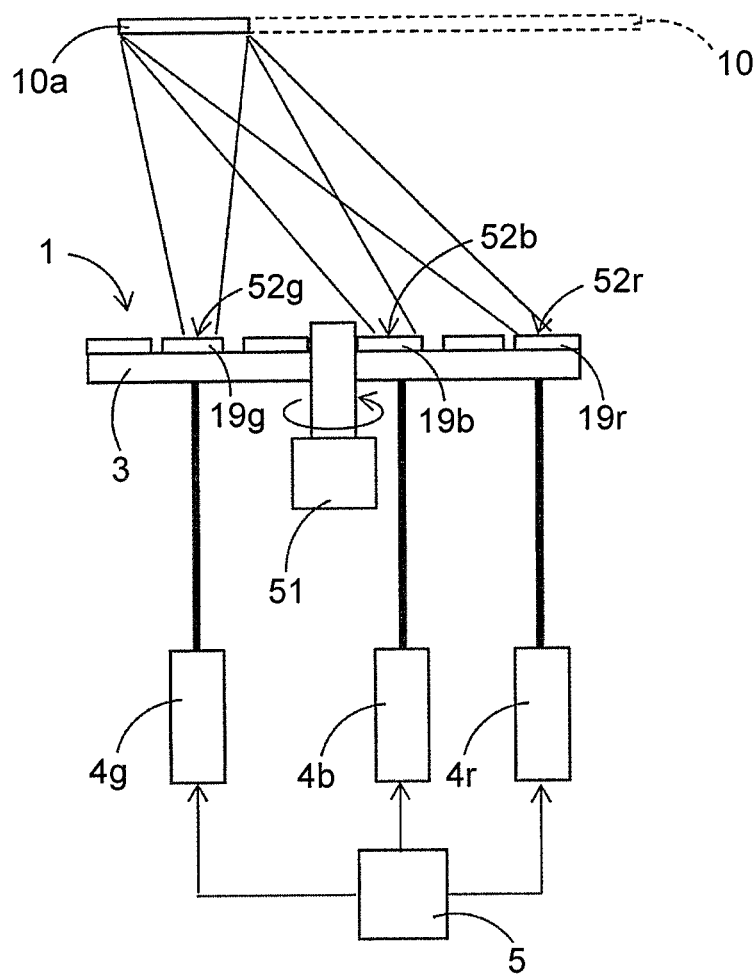
FIG. 41 is a view showing a schematic configuration of an illumination device according to a thirteenth embodiment of the present invention.
Figure 42:
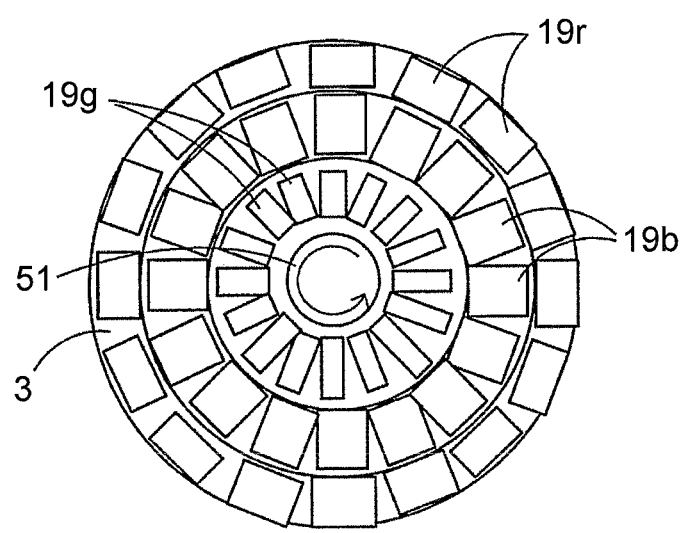
FIG. 42 is a plan view of a diffusion unit in the illumination device in FIG. 41.

FIG. 41 is a view showing a schematic configuration of an illumination device according to the thirteenth embodiment of the present invention.

As shown in FIG. 41, in the thirteenth embodiment, the plurality of coherent light sources 4r, 4g, and 4b that emit coherent light beams having different emission wavelength ranges are provided, and the optical device 3 is provided with a plurality of diffusion regions 19r, 19g, and 19b corresponding to each of the coherent light beams having different emission wavelength ranges. In each partial region 10a in the predetermined illumination area 10, coherent light beams diffused in the respective diffusion regions 19r, 19g, and 19b and having different emission wavelength ranges are overlapped and illuminated.

According to the thirteenth embodiment, for example, when red coherent light beam, green coherent light beam and blue coherent light beam are used as coherent light beam, in each partial region 10a in the predetermined illumination area 10, these three colors are mixed and can be illuminated with white light.

In the example shown in FIG. 41, the plurality of diffusion regions 19r, 19g, and 19b corresponding to coherent light beams having different emission wavelength ranges are held by the common optical device 3; however, the present invention is not limited to thereto. The plurality of diffusion regions 19r, 19g, and 19b corresponding to coherent light beams having different emission wavelength ranges are held in separate optical devices 3, respectively, so that each optical device 3 is rotated about an axis thereof. In this case, since the energy of the coherent light beam is dispersed, the temperature rise of each optical device 3 can be suppressed. On the other hand, when the plurality of diffusion regions 19r, 19g, and 19b corresponding to each of the coherent light beams having different light wavelength regions are held by the common optical device 3, the size of the entire device becomes compact.

Fourteenth Embodiment

Figure 43:
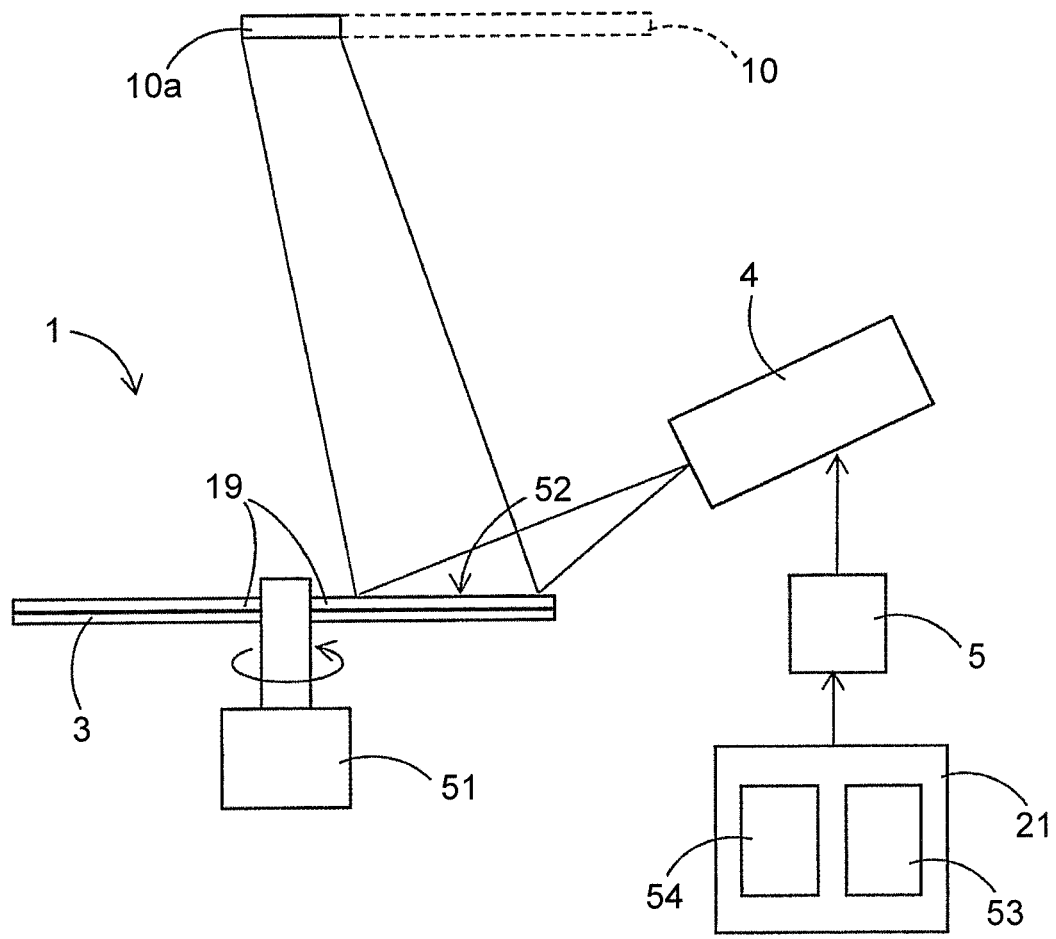
FIG. 43 is a view showing a schematic configuration of an illumination device according to a fourteenth embodiment of the present invention.

FIG. 43 is a view showing a schematic configuration of the illumination device according to the fourteenth embodiment of the present invention.

As shown in FIG. 43, in the fourteenth embodiment, there is provided an object detection unit 21 for detecting an object existing in the predetermined illumination area 10. The object detection unit 21 is connected to the timing control unit 5.

More specifically, the object detection unit 21 includes an imaging device 53 that images an inside of the predetermined illumination area 10, and an image processing unit 54 that performs image processing on the imaging result of the imaging device 53 and recognizes an object in the predetermined illumination area 10.

As the imaging device 53, for example, a commercially available imaging device equipped with a CCD that converts light emitted or reflected from an object existing in the predetermined illumination area 10 to an electrical signal can be used. The image processing unit 54 performs image processing on the imaging result of the imaging device 53, determines whether or not an object exists in the predetermined illumination area 10, and when it is determined that the object exists, the image processing unit 54 identifies the partial region 10a overlapping with at least a part of the object in the predetermined illumination area 10.

The timing control unit 5 controls the timing of the coherent light beam so as to illuminate the object detected by the object detection unit 31.

More specifically, for example, the timing control unit 5 controls the timing of coherent light beam so that the diffusion region 19 corresponding to the partial region 10a identified by the image processing unit 31 is irradiated with coherent light beam, but the other diffusion region 19 is not irradiated with coherent light beam.

According to the fourteenth embodiment, for example, when the illumination device 1 is used as a headlamp of a car, the driver who drives the car can automatically illuminate the object in the predetermined illumination area 10 without manually selecting the area to be illuminated in the predetermined illumination area 10, so that the safety of driving can be improved.

Fifteenth Embodiment

Figure 44:
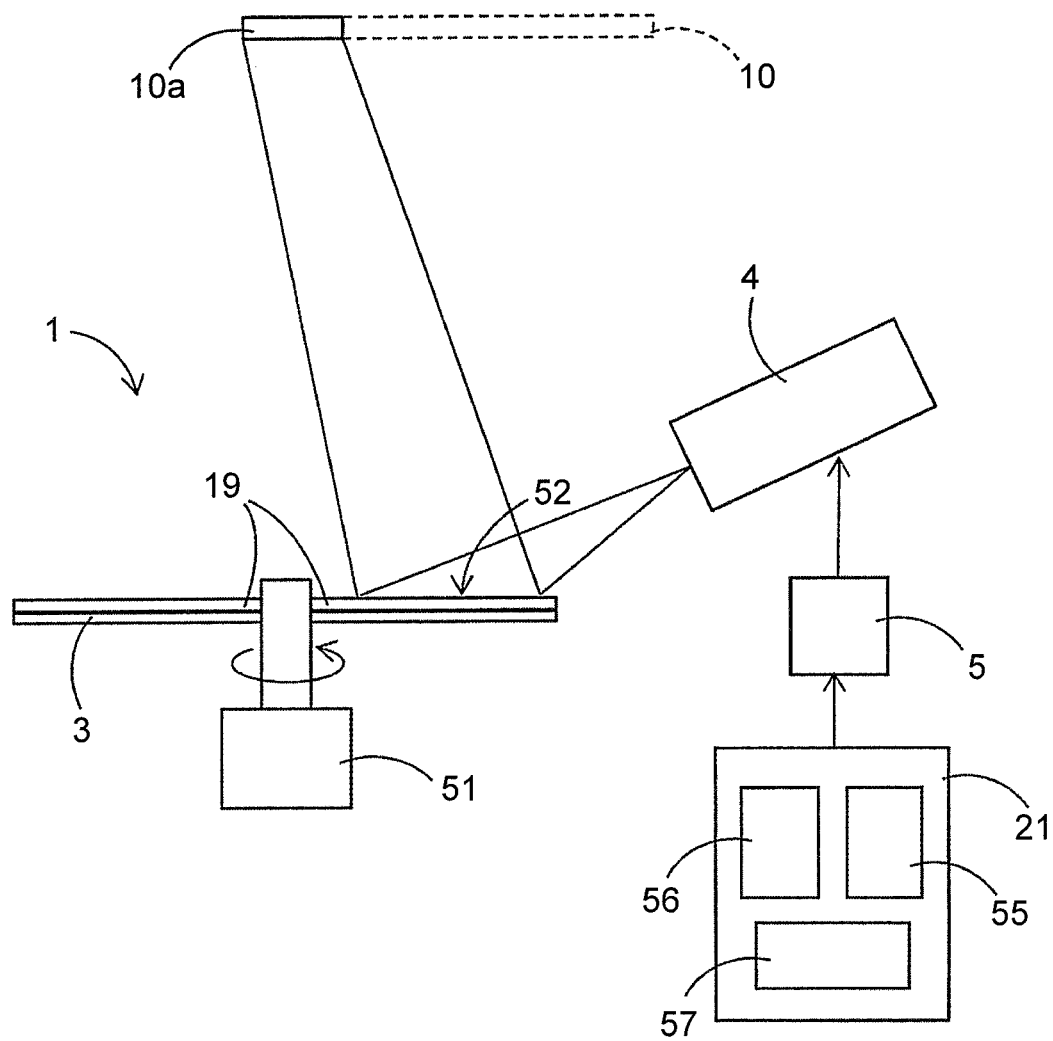
FIG. 44 is a view showing a schematic configuration of an illumination device according to a fifteenth embodiment of the present invention.

FIG. 44 is a view showing a schematic configuration of the illumination device according to the fifteenth embodiment of the present invention.

As shown in FIG. 44, in the fifteenth embodiment, the object detection unit 21 includes a position information acquiring unit 55 that acquires position information of a car in which the illumination device 1 is disposed, a storage unit 56 that stores the position information of the object, and an information processing unit 57 that recognizes the object in the predetermined illumination area 10 based on the position information of the car acquired by the position information acquiring unit 55 and the position information of the object stored in the storage unit 56.

As the position information acquiring unit 55, for example, a commercially available GPS receiver that acquires position information of the car using a global positioning system (GPS) can be used. The storage unit 56 may store the map data in a wide area in advance or may read and store only the map data around the current position of the car from an external database.

Based on the position information of the car acquired by the position information acquiring unit 55 and the position information of the object stored in the storage unit 56, the information processing unit 57 determines whether or not an object exists in the predetermined illumination area 10, and when it is determined that the object exists, the information processing unit 57 identifies the partial region 10a overlapping with at least a part of the object in the predetermined illumination area 10.

According to the fifteenth embodiment, even when the imaging device 53 according to the fourteenth embodiment cannot clearly capture the inside of the predetermined illumination area 10 due to bad weather or the like, if there exists an object stored in the storage unit 56, the object can be appropriately recognized and illuminated.

Sixteenth Embodiment

Figure 45:
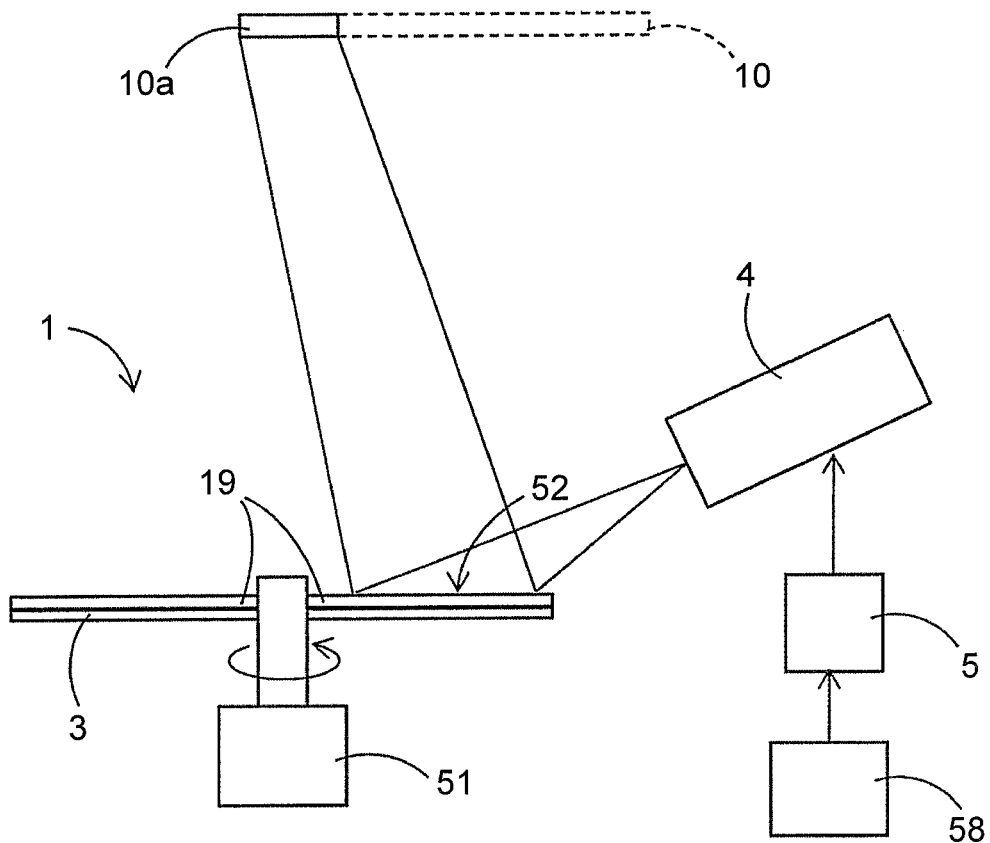
FIG. 45 is a view showing a schematic configuration of an illumination device according to a sixteenth embodiment of the present invention.

FIG. 45 is a view showing a schematic configuration of the illumination device according to the sixteenth embodiment of the present invention.

As shown in FIG. 45, in the sixteenth embodiment, a handle rotation detection unit 58 is provided for detecting the rotation of a handle of a car in which the illumination device 1 is installed. The handle rotation detection unit 58 is connected to the light emission timing control unit 5.

The light emission timing control unit 5 controls the light emission timing of the coherent light beam based on the rotation of the handle detected by the handle rotation detection unit 58.

Specifically, for example, in the case where the handle is rotated to the left (or right), the light emission timing control unit 5 identifies the partial region 10a corresponding to the front illumination region and the partial region 10a corresponding to the illumination region adjacent on the left side (or the right side) with respect to the front illumination region among the plurality of partial regions 10a in the predetermined illumination area 10, and controls the light emission timing of the coherent light beam so that the diffusion region 19 corresponding to the specified partial region 10a is irradiated with the coherent light beam, but the other diffusion region 19 is not irradiated with the coherent light beam. Accordingly, the center of the area to be illuminated is moved in the direction in which the handle is rotated, and the visibility in the traveling direction of the car is improved.

Seventeenth Embodiment

Figure 48:
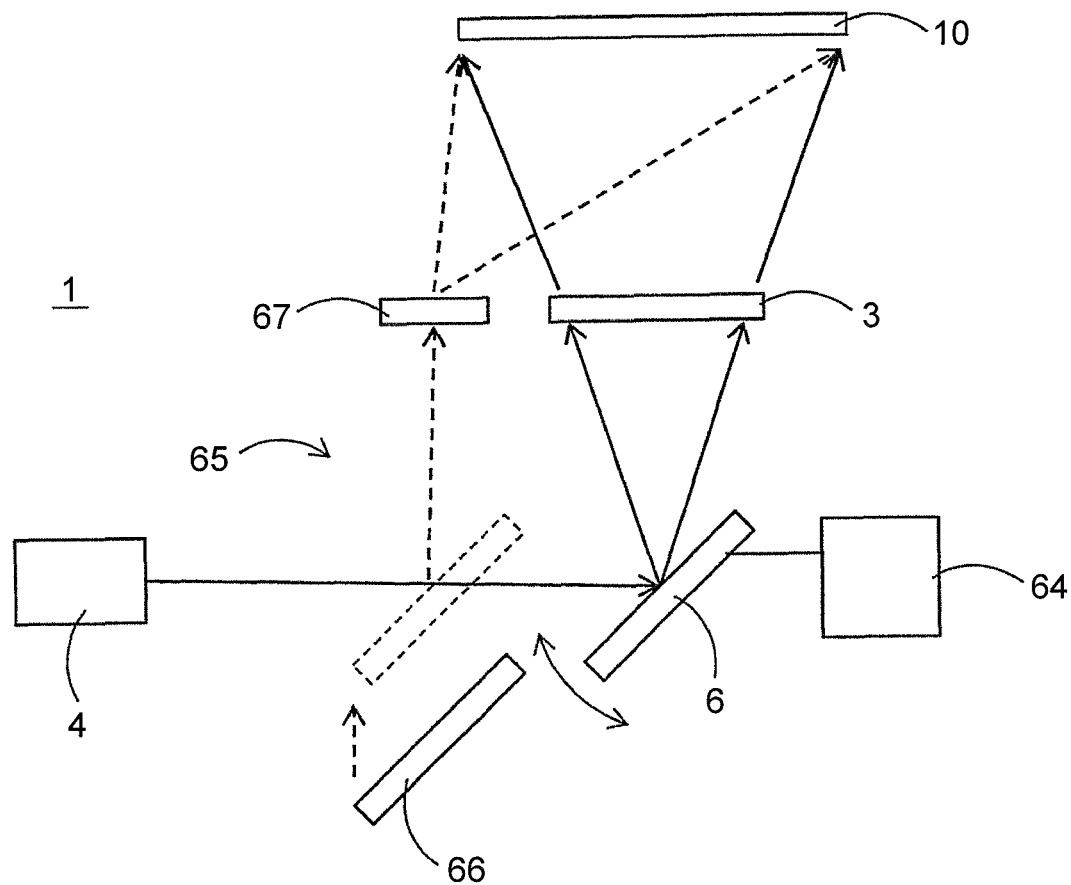
FIG. 48 is a view showing a schematic configuration of an illumination device according to a seventeenth embodiment of the present invention.

FIG. 48 is a view showing a schematic configuration of the illumination device 1 according to the seventeenth embodiment of the present invention.

As shown in FIG. 48, in the illumination device 1 according to the present embodiment includes the coherent light source 4 that emits coherent light beam, the optical device 3 that diffuses the coherent light beam and illuminating the predetermined illumination area 10, and a scanning unit 6 that causes coherent light beam from the coherent light source 4 to scan on the optical device 3.

As the coherent light source 4, for example, a semiconductor laser light source can be used. In order to increase the light emission intensity, the coherent light source 4 may be configured to collect the coherent light beam emitted from the plurality of laser light sources with the fiber and emit the light.

The scanning unit 6 changes the traveling direction of the coherent light beam from the coherent light source 4 with the lapse of time so that the traveling direction of the coherent light beam does not become constant. As a result, the coherent light beam emitted from the scanning unit 6 is scanned on the incident surface of the optical device 3.

Figure 49:
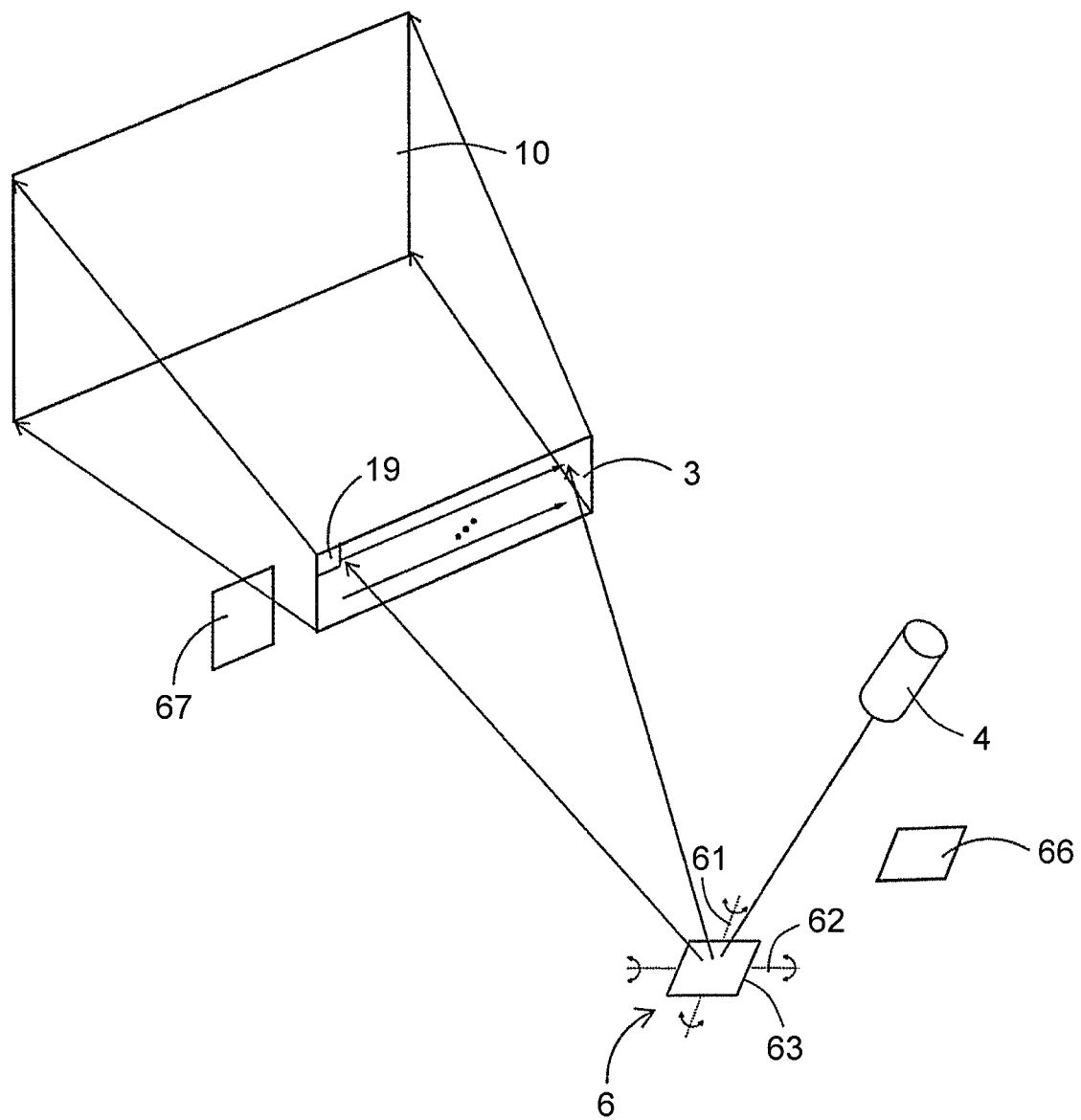
FIG. 49 is a view showing how the coherent light beam is scanned on the optical device by the optical scanning unit.

For example, as shown in FIG. 49, the scanning unit 6 has a reflective device 63 that can rotate around two rotating axes 61 and 62 extending in mutually intersecting directions. The coherent light beam from the coherent light source 4 incident on the reflecting surface of the reflective device 63 is reflected at an angle corresponding to an inclination angle of the reflecting surface and travels toward an incident surface of the optical device 3. By rotating the reflective device 63 around the two rotation axes 61 and 62, the coherent light beam is scanned on the incident surface of the optical device 3 two-dimensionally. Since the reflective device 63 repeats the operation of rotating around the two rotation axes 61 and 62 at a constant period, for example, the coherent light beam is repeatedly two-dimensionally scanned on the incident surface of the optical device 3 in synchronization with this period.

The optical device 3 has an incident surface on which coherent light beam is incident, and diffuses the coherent light beam incident on the incident surface to illuminate the predetermined illumination area 10. More specifically, the coherent light beam diffused by the optical device 3 passes through the predetermined illumination area 10 and then illuminates the actual illumination area.

Here, the predetermined illumination area 10 is the illumination area of the near field illuminated by the optical device 3. The illumination area of the far field is often expressed as a diffusion angle distribution in the angular space rather than the actual size of the illumination area. In the present specification, the term "predetermined area" includes a diffusion angle area in the angular space in addition to the actual illumination zone (illumination area). Therefore, the illumination area illuminated by the illumination device 1 in FIG. 48 can be a much wider area than the illumination area 10 of near field shown in FIG. 48.

Figure 50:
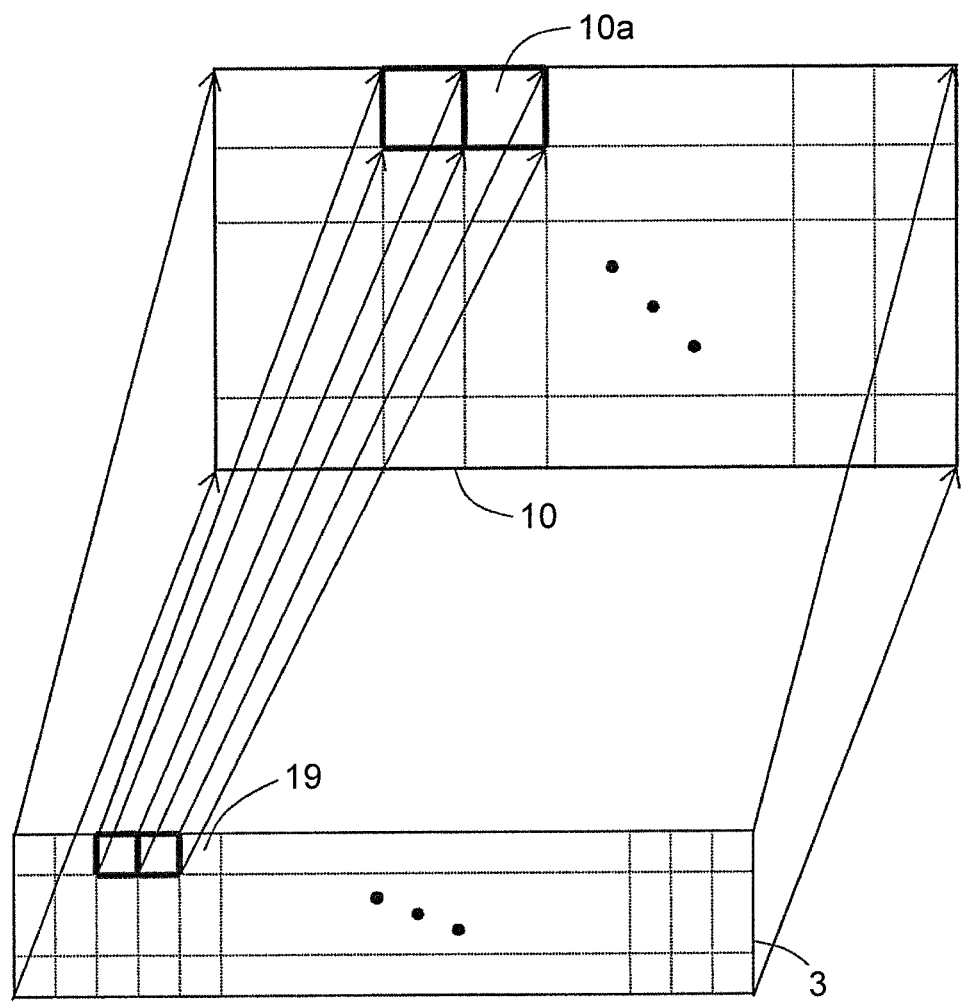
FIG. 50 is a view showing how the coherent light beam is diffused by the optical device enters a predetermined region.

FIG. 50 is a view showing how the coherent light beam diffused by the optical device 3 enters the predetermined illumination area 10. The optical device 3 diffuses the incident coherent light beam and illuminates the entire region of the predetermined illumination area 10 as a whole.

As shown in FIG. 50, the optical device 3 has the plurality of element diffusion regions 19. Each element diffusion region 19 diffuses the incident coherent light beam and illuminates the corresponding partial region 10a in the predetermined illumination area 10. At least a part of the partial region 10a differs for each element diffusion region 19.

Specifically, for example, the optical device 3 can be configured using the hologram recording medium. In the following description, the hologram recording medium in the optical device 3 may be described with the same reference numeral as that of the optical device 3. The coherent light beam incident on the hologram recording medium 13 is diffused to illuminate the entire region of the predetermined illumination area 10 as a whole.

As shown in FIG. 50, the hologram recording medium 13 has a plurality of element hologram areas. In the following description, the element hologram area may be described with the same reference numeral as that of the element diffusion region 19. Each of the plurality of element hologram areas 13a illuminates the corresponding partial region 10a in the predetermined illumination area 10 by diffusing the incident coherent light beam. At least a part of the partial region 10a illuminated by each element hologram area 13a is different for each element hologram area 13a. That is, the partial regions 10a illuminated by the different element hologram areas 13a are at least partially different from each other.

In each element hologram area 13a, an interference fringe pattern is formed. Therefore, the coherent light beam incident on each element hologram area 13a is diffracted by the interference fringe pattern to illuminate the corresponding partial region 10a in the predetermined illumination area 10. By adjusting the interference fringe pattern variously, it is possible to change the traveling direction of coherent light beam diffracted or diffused by each element hologram area 13a.

In this manner, the coherent light beam incident on each point in each element hologram area 13a illuminates the corresponding partial region 10a in the predetermined illumination area 10. In addition, the scanning unit 6 scans each of the element hologram areas 13a with coherent light beam, thereby changing the incidence position and the incident angle of coherent light beam incident on each of the element hologram areas 13a over time. The coherent light beam incident into one element hologram area 13a illuminates the common partial region 10a even if the coherent light beam is incident on any position in the element hologram area 13a. That is, this means that the incident angle of the coherent light beam incident on each point of the partial region 10a changes with the lapse of time. This change in the incident angle is a speed that cannot be resolved by the human eye, and as a result, the scattering pattern of the coherent light beam having no correlation is multiplexed and observed in the human eye. Therefore, the speckle generated corresponding to each scattering pattern is overlapped and averaged, and is observed by the observer. As a result, in the partial region 10a, speckle becomes less conspicuous. Since the incident position and incident angle of the coherent light beam incident on each element hologram area 13a are changed with the lapse of time, the coherent light beam diffracted at each point in each element hologram area 13a has different wave fronts, and since these diffracted coherent light beams are individually superimposed on the partial region 10a, a uniform illuminance distribution in which the speckle is inconspicuous can be obtained in the partial region 10a.

FIG. 50 shows an example in which each element hologram area 13a illuminates different partial regions 10a in the predetermined illumination area 10. However, a part of the partial region 10a may overlap the adjacent partial region 10a. In addition, the size of the partial region 10a may be different for the elementary hologram area 13a. Furthermore, it is unnecessary that the corresponding partial region 10a is arranged in the illumination area 10 according to the arrangement order of the element hologram area 13a. That is, the arrangement order of the element hologram area 13a in the hologram recording medium 13 and the arrangement order of the corresponding partial region 10a in the predetermined illumination area 10 are not necessarily coincident.

In the present embodiment, the scanning unit 6 periodically scans the coherent light beam from the coherent light source 4 on the incident surface of the optical device 3. At this time, each of the partial regions 10a in the predetermined illumination area 10 is sequentially illuminated by the coherent light beam diffused in the corresponding element diffusion region 19 at a speed as if illuminated simultaneously by the human eye.

Returning to FIG. 48, the illumination device 1 according to the present embodiment includes an operation monitoring unit 64 that monitors the operation of the scanning unit 6, and an auxiliary illumination unit 65 that illuminates the predetermined illumination area 10 when an operation abnormality of the scanning unit 6 is detected by the operation monitoring unit 64.

Specifically, for example, the operation monitoring unit 64 is configured to monitor the change in a current value flowing through a motor for rotating the reflective device 63 of the scanning unit 6 around the two rotating axes 61 and 62, and when the current value deviates from the predetermined range, to determine that an abnormality has occurred in the operation of the scanning unit 6 (failed).

In the present embodiment, the auxiliary illumination unit 65 includes an auxiliary mirror 66 disposed in an optical path between the coherent light source 4 and the scanning unit 6 when an operation abnormality of the scanning unit 6 is detected by the operation monitoring unit 64, and an auxiliary diffusion device 67 that diffuses coherent light beam and illuminates the predetermined illumination area 10.

The auxiliary mirror 66 is usually positioned outside the optical path between the coherent light source 4 and the scanning unit 6. A driving unit (for example, a motor) (not shown) is provided on the auxiliary mirror 66. On the basis of the abnormality detection signal of the scanning unit 6 by the operation monitoring unit 64, the driving unit of the auxiliary mirror 66 is adapted to insert the auxiliary mirror 66 into the optical path between the coherent light source 4 and the scanning unit 6 as shown by the broken line in FIG. 48 and shown in FIG. 51.

The reflecting surface of the auxiliary mirror 66 is inclined in such a direction as to reflect the coherent light beam from the coherent light source 4 toward the incident surface of the auxiliary diffusion device 67.

The auxiliary diffusion device 67 has an incident surface on which coherent light beam is incident, and diffuses the coherent light beam incident on the incident surface to illuminate the predetermined illumination area 10. In the illustrated example, the auxiliary diffusion device 67 diffuses the incident coherent light beam to illuminate the entire region of the predetermined illumination are 10, but the present invention is not limited thereto. For example, the auxiliary diffusion device 67 may be adapted to illuminate the partial region 10a including at least the front direction in the predetermined illumination area 10.

Specifically, for example, the auxiliary diffusion device 67 can be configured using a hologram recording medium in which an interference fringe pattern is formed. In this case, the coherent light beam incident on the auxiliary diffusion device 67 is diffracted by the interference fringe pattern to illuminate the predetermined illumination area 10.

Next, the structure of the hologram recording medium in the optical device 3 and the auxiliary diffusion device 67 will be described in detail.

The hologram recording medium can be manufactured by using, for example, scattered light from a real scattering plate as object light. More specifically, when the hologram photosensitive material which is the base of the hologram recording medium is illuminated with reference light and object light made of coherent light beam having coherency with each other, an interference fringe pattern due to interference of these light beams is formed on the hologram photosensitive material, and the hologram recording medium 13 is manufactured. A laser beam which is coherent light beam is used as reference light, and scattered light of an isotropic scattering plate on which incidence of light can be performed at low cost, for example, is used as object light.

By illuminating the hologram recording medium with coherent light beam from the focal position of the reference light used for manufacturing the hologram recording medium, a reproduced image of the scattering plate is generated at the arrangement position of the scattering plate which is the source of the object light used in manufacturing the hologram recording medium. When the scattering plate which is the source of the object light used for manufacturing the hologram recording medium has uniform surface scattering, a reproduced image of the scattering plate obtained by the hologram recording medium is also a uniform plane illumination, and a region where the reproduced image of this scattering plate is generated is the predetermined illumination area 10.

In the present embodiment, illumination control that illuminates only part of the virtual illumination area can be performed using the optical device 3. In order to perform such illumination control using the hologram recording medium 13, the interference fringe pattern formed in each element hologram area 13*a* becomes complicated. Instead of using actual object light and reference light for forming such a complicated interference fringe pattern, the interference fringe pattern can be designed using a computer based on the scheduled wavelength and incident direction of the reconstruction illumination light and the shape and position of the image to be reproduced. The hologram recording medium 13 thus obtained is also called a computer generated hologram (CGH). In addition, a Fourier transform hologram having the same diffusion angle characteristic at each point on each element hologram area 13*a* may be formed by computer synthesis. Further, the auxiliary diffusion device 67 may include a computer generated hologram. Further, an optical member such as a lens may be provided on the rear side of the optical axis of the predetermined illumination area 10 to set the size and position of the actual illumination area.

One of the advantages of providing the hologram recording medium as the optical device 3 and the auxiliary diffusion device 67 is that the light energy density of the coherent light beam can be reduced by diffusion. Another advantage is that since the hologram recording medium can be used as a directivity surface light source, compared to the conventional lamp light source (point light source), it is possible to reduce the luminance on a light source surface necessary for achieving the same illuminance distribution. This can contribute to improving the safety of the coherent light beam, and even if the coherent light beam having passed through the predetermined illumination area 10 is viewed directly with a human eye, there is less possibility of adversely affecting the human eye as compared with the case of looking directly at a single point light source.

FIG. 48 shows an example in which the coherent light beam is diffused through the optical device 3 and the auxiliary diffusion device 67. However, the optical device 3 and the auxiliary diffusion device 67 may diffuse and reflect coherent light beam. For example, when the hologram recording medium is used as the optical device 3 and the auxiliary diffusion device 67, the hologram recording medium may be a reflection type or a transmission type. Generally, the reflection type hologram recording medium (hereinafter, reflection type holo) has high wavelength selectivity as compared with the transmission type hologram recording medium (hereinafter, transmission type holo). That is, even when the interference fringe pattern corresponding to different wavelengths is laminated the reflection type holo can diffract coherent light beam of a desired wavelength only in a desired layer. Also, the reflection type holo is superior in that it is easy to remove the influence of zero order light. On the other hand, the transmission type holo has a wide diffractable spectrum and a wide tolerance of the coherent light source 4; however, when the interference fringe pattern corresponding to different wavelengths is laminated, coherent light beam of a desired wavelength is diffracted even in a layer other than the desired layer. Therefore, in general, it is difficult to form a transmission type holo with a laminated structure.

As a specific form of the hologram recording medium, a volume hologram recording medium using a photopolymer may be used, and a volumetric hologram recording medium of a type that performs recording using a photosensitive medium containing a silver salt material may be used. Alternatively, a relief type (emboss type) hologram recording medium may be used.

Next, the operation of the present embodiment will be described by taking as an example a case where the illumination device 1 is used as a headlamp of a moving body. In this specification, the moving body means a moving device capable of moving in a three-dimensional space, in particular, a vehicle. The moving body may be, for example, a car traveling on the ground, more particularly an automobile, or a ship traveling on the sea, a submarine moving in the sea, an airplane moving in the air, or the like.

When illuminating the predetermined illumination area 10, coherent light beam is emitted from the coherent light source 4 toward the scanning unit 6. The scanning unit 6 periodically scans the coherent light beam from the coherent light source 4 on the incident surface of the optical device 3.

Coherent light beam incident on each element diffusion region 19 of the optical device 3 illuminates the corresponding partial region 10*a* in the predetermined illumination area 10. At this time, each of the partial regions 10*a* in the predetermined illumination area 10 is sequentially illuminated by the coherent light beam diffused in the corresponding element diffusion region 19 at a speed as if illuminated simultaneously by the human eye. By scanning the element diffusion regions 19 of the optical device 3 with the coherent light beam by the scanning unit 6, all the partial regions 10*a* in the predetermined illumination area 10 are illuminated, that is, the entire region of the predetermined illumination area 10 is illuminated.

Next, consider a case where an abnormality has occurred in the operation of the scanning unit 6 (failed).

As mentioned in the section of the technical problem, when coherent light beam is incident on the failed scanning unit 6, the coherent light beam emitted from the scanning unit 6 is incident only on one element diffusion region 19 on the optical device 3, only a part of the partial region 10*a* in the predetermined illumination area 10 in front of the moving body is illuminated by the coherent light beam diffused in the element diffusion region 19, so that there is a possibility of causing safety problems. Specifically, for example, when only the partial region 10*a* at the end of the predetermined illumination area 10 is to be illuminated, visibility in the front direction cannot be secured.

On the other hand, in the present embodiment, the operation monitoring unit 64 monitors the change in the current value flowing through the motor that rotates the reflective device 63 of the scanning unit 6, and based on the change in the current value, detects the operation abnormality of the scanning unit 6. The auxiliary illumination unit 65 illuminates the predetermined illumination area 10 based on the abnormality detection signal of the scanning unit 6 by the operation monitoring unit 64.

Figure 51:
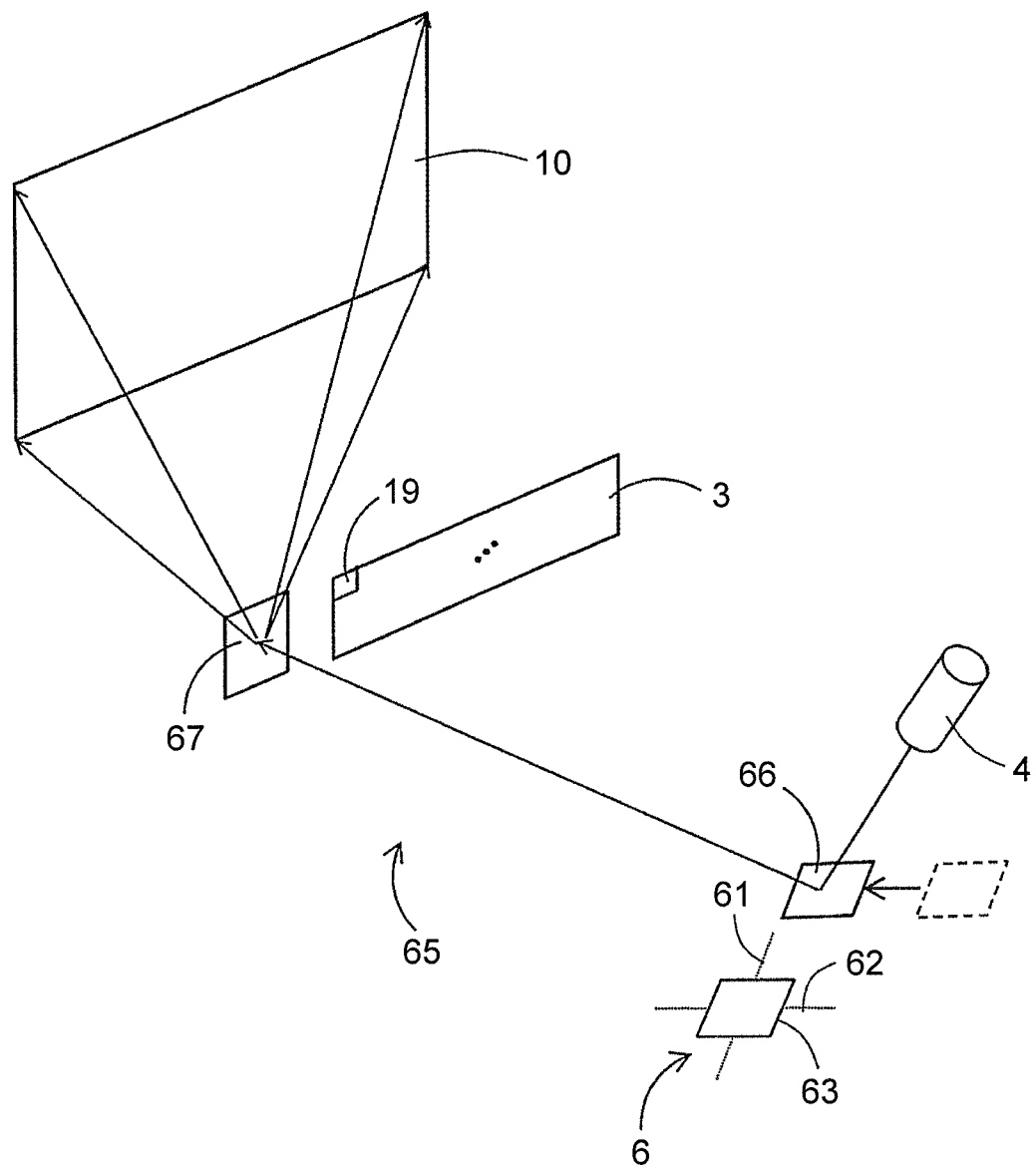
FIG. 51 is a view showing how the coherent light beam is incident on an auxiliary optical device by an auxiliary mirror.

More specifically, when receiving the abnormality detection signal from the operation monitoring unit 64, the driving unit of the auxiliary mirror 66 inserts the auxiliary mirror 66 into the optical path between the coherent light source 4 and the scanning unit 6 as shown by a broken line in FIG. 48 and shown in FIG. 51. Thus, coherent light beam from the coherent light source 4 is prevented from entering the failed scanning unit 6.

The auxiliary mirror 66 inserted in the optical path between the coherent light source 4 and the scanning unit 6 reflects the coherent light beam from the coherent light source 4 toward the incident surface of the auxiliary diffusion device 67.

The coherent light beam incident on the incident surface of the auxiliary diffusion device 67 is diffracted by the interference fringe pattern of the auxiliary diffusion device 67 to illuminate the predetermined illumination area 10. In the illustrated example, the entire region of the predetermined illumination area 10 is illuminated, but only the partial region 10*a*, including the front direction, may be illuminated. Accordingly, the visibility in the front direction of the moving body can be secured.

As described above, according to the present embodiment, when an operation abnormality of the scanning unit 6 is detected by the operation monitoring unit 64, the predetermined illumination area 10 is illuminated by the auxiliary illumination unit 65. Specifically, for example, based on the abnormality detection signal of the scanning unit 6 by the operation monitoring unit 64, the auxiliary mirror 66 is disposed in the optical path between the coherent light source 4 and the scanning unit 6. The coherent light beam from the coherent light source 4 is reflected by the auxiliary mirror 66, and is incident on the auxiliary diffusion device 67. The coherent light beam diffused by the auxiliary diffusion device 67 illuminates the predetermined illumination area 10. Thereby, even when the scanning unit 6 fails, it is possible to ensure the visibility in the front direction of the moving body, and it is possible to improve the safety of night driving.

It is to be noted that various modifications can be made to the above-described embodiment. Hereinafter, modifications will be described with reference to the drawings. In the following description and the drawings used in the following description, the same reference numerals as those used for the corresponding parts in the above-described embodiments are used for parts that can be configured similarly to the above-described embodiment, and overlapping explanation will be omitted. Further, when it is obvious that the operation and effect obtained in the above-described embodiment can be obtained also in the modified example, the explanation may be omitted.

Eighteenth Embodiment

Figure 52:
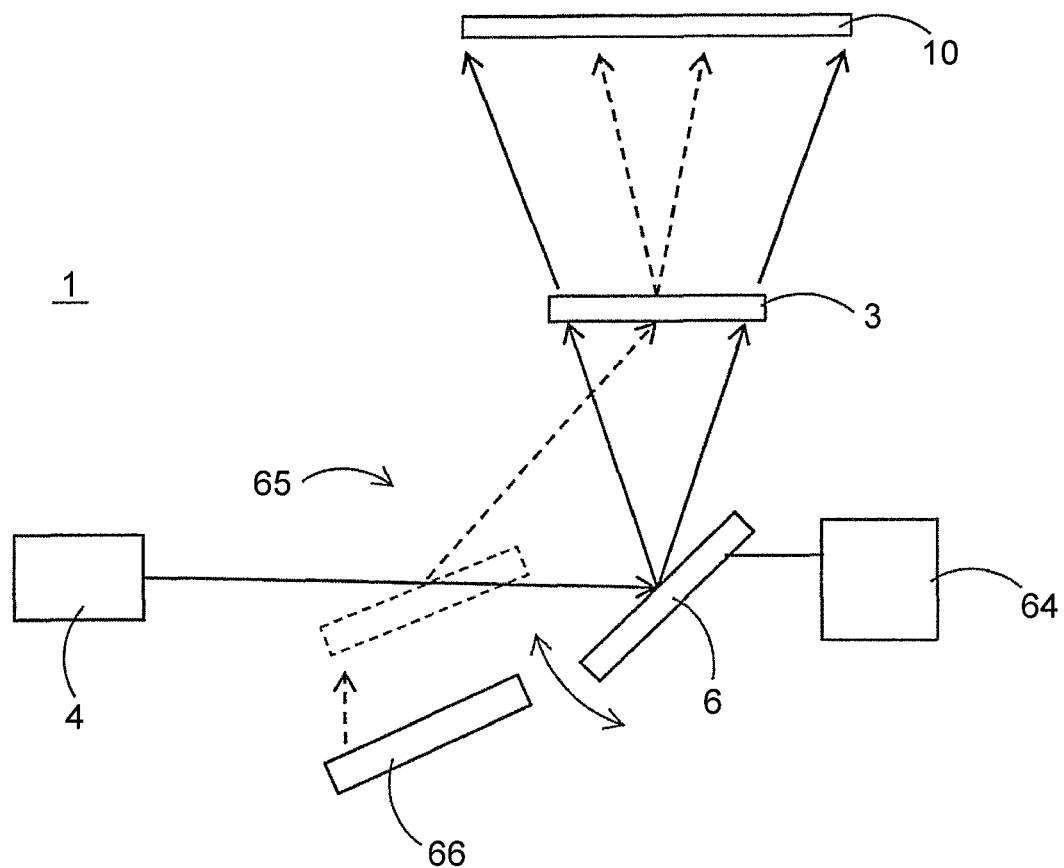
FIG. 52 is a view showing a schematic configuration of an illumination device according to an eighteenth embodiment of the present invention.
Figure 53:
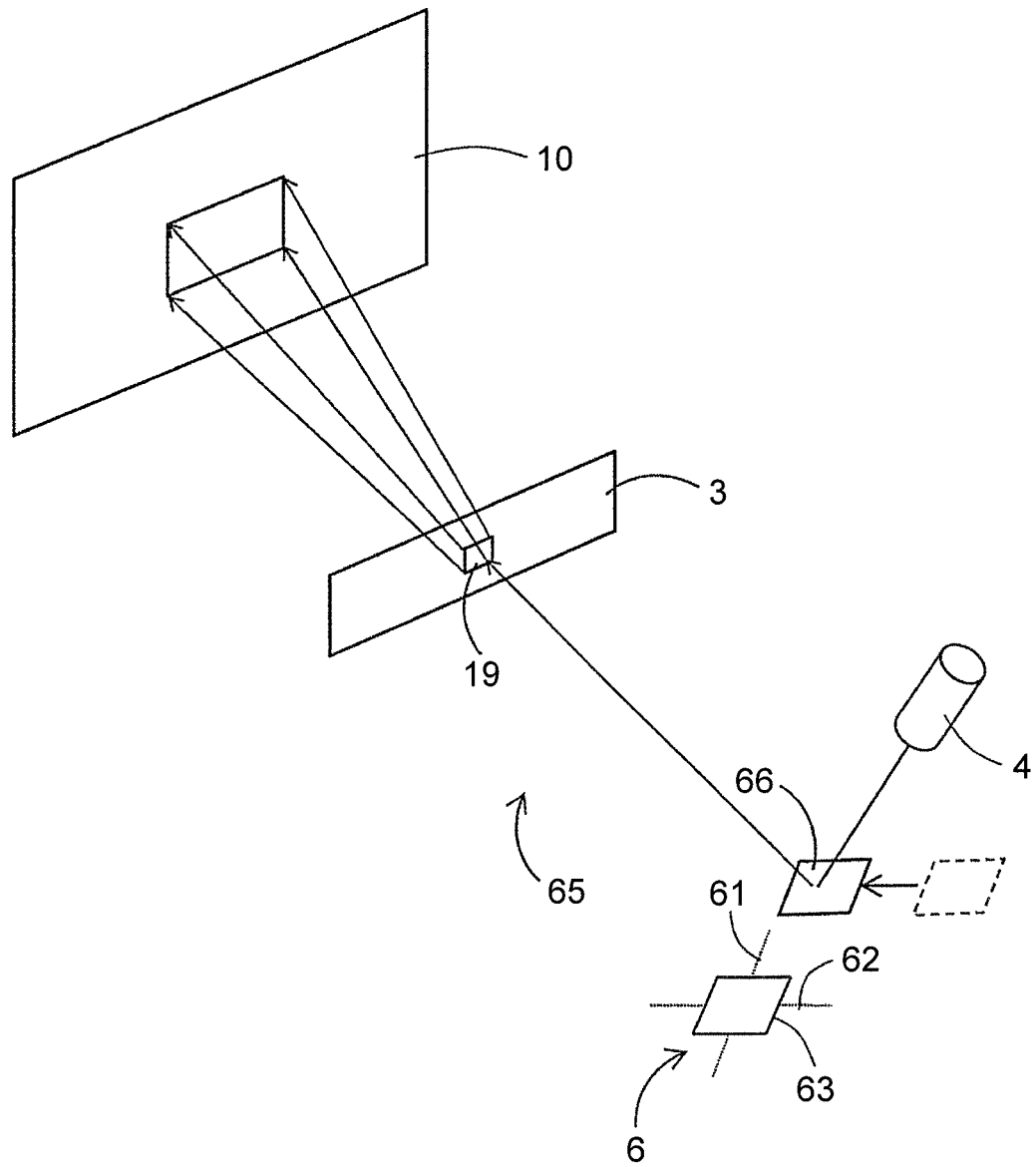
FIG. 53 is a view showing how coherent light beam is incident on an optical device by an auxiliary mirror.

FIG. 52 is a view showing a schematic configuration of the illumination device according to the eighteenth embodiment of the present invention. FIG. 53 is a view showing how coherent light beam is incident on the optical device 3 by the auxiliary mirror 66.

As shown in FIGS. 52 and 53, in the eighteenth embodiment, the auxiliary diffusion device 67 is omitted from the auxiliary illumination device 20, and the auxiliary mirror 66 allows the coherent light beam from the coherent light source 4 to be incident on the optical device 3.

In the illustrated example, on the element diffusion region 19 corresponding to the partial region 10*a* including the front direction in the predetermined illumination area 10 in the optical device 3, the auxiliary mirror 66 allows coherent light beam from the coherent light source 4 to be incident.

In the eighteenth embodiment, similar to the seventeenth embodiment, the operation monitoring unit 64 monitors the change in the current value flowing through the motor that rotates the reflective device 63 of the scanning unit 6, and based on the change in the current value, detects the operation abnormality of the scanning unit 6.

When receiving the abnormality detection signal from the operation monitoring unit 64, the driving unit of the auxiliary mirror 66 inserts the auxiliary mirror 66 into the optical path between the coherent light source 4 and the scanning unit 6 as shown by a broken line in FIG. 52 and shown in FIG. 53. Thus, coherent light beam from the coherent light source 4 is prevented from entering the failed scanning unit 6.

The auxiliary mirror 66 inserted in the optical path between the coherent light source 4 and the scanning unit 6 reflects the coherent light beam from the coherent light source 4 toward the incident surface of the optical device 3.

The coherent light beam incident on the incident surface of the optical device 3 is diffracted by the interference fringe pattern of the optical device 3 to illuminate the predetermined illumination area 10. In the illustrated example, coherent light beam from the auxiliary mirror 66 is incident on the element diffusion region 19 corresponding to the partial region 10*a* including the front direction in the predetermined illumination area 10 in the optical device 3. Therefore, the partial region 10*a* including the front direction in the predetermined illumination area 10 is illuminated by the coherent light beam diffused in the element diffusion region 19.

According to the eighteenth embodiment described above, when the scanning unit 6 fails, only the partial region 10*a* at the end in front of the moving body is prevented from being illuminated, and at least visibility of the moving body in the front direction can be secured.

Nineteenth Embodiment

Figure 54:
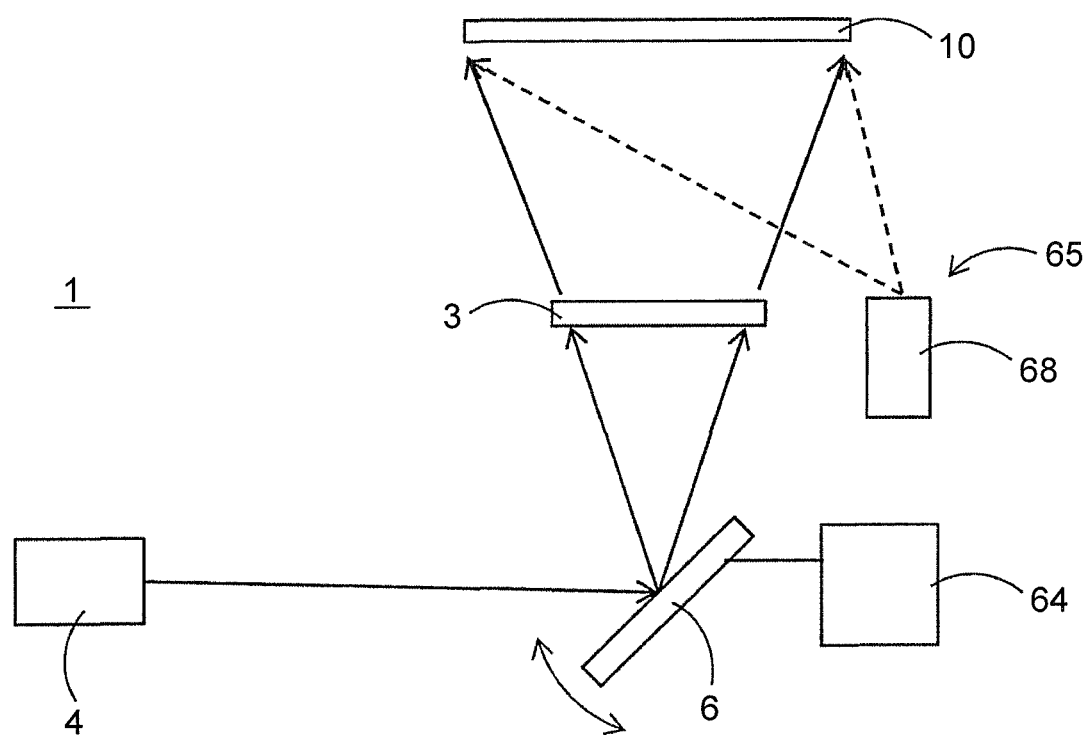
FIG. 54 is a view showing a schematic configuration of an illumination device according to a nineteenth embodiment of the present invention.

FIG. 54 is a view showing a schematic configuration of the illumination device according to the nineteenth embodiment of the present invention.

As shown in FIG. 54, in the nineteenth embodiment, the auxiliary illumination device 20 has an auxiliary light source 68 different from the coherent light source 4. As the auxiliary light source 68, for example, another light source previously provided in a moving body such as a fog light can be used.

The auxiliary light source 68 is connected to the operation monitoring unit 64, and illuminates the predetermined region 30, as indicated by the broken line in FIG. 54, based on the abnormality detection signal of the scanning unit 6 by the operation monitoring unit 64.

According to the nineteenth embodiment like this, even when the scanning unit 6 fails, it is possible to ensure the visibility in the front direction of the moving body, and it is possible to improve the safety of night driving. In this case, it is preferable that the coherent light source 4 is connected to the operation monitoring unit 64, and the light emission of the coherent light beam is stopped based on the abnormality detection signal of the scanning unit 6 by the operation monitoring unit 64 from the viewpoint of suppressing energy consumption.

The specific form of the optical device 3 is not limited to the hologram recording medium, and may be various diffusion members that can be finely divided into the plurality of element diffusion regions 19. For example, the optical device 3 may be configured using a lens array group in which each element diffusion region 19 is a single lens array. In this case, a lens array is provided for each element diffusion region 19, and the shape of each lens array is designed so that each lens array illuminates the corresponding partial region 10a in a predetermined angle area. At least a part of each partial region 10a is different. Thus, the same operation and effect as in the case of constructing the optical device 3 using the hologram recording medium can be obtained.

Further, in the above-described embodiment, coherent light beam in a single emission wavelength range is used as the coherent light beam, but the present invention is not limited thereto. By providing, as the coherent light source 4, the plurality of laser light sources that emit coherent light beams having different emission wavelength ranges, and by providing the plurality of diffusion regions corresponding to each of the coherent light beams having different emission wavelength ranges in the optical device 3 and the auxiliary diffusion device 67, in each partial region 10a in the predetermined illumination area 10, coherent light beam diffused in each diffusion region and having different emission wavelength ranges may be superimposed and illuminated. For example, when red coherent light beam, green coherent light beam and blue coherent light beam are used as coherent light beam, in each partial region 10a in the predetermined illumination area 10, these three colors are mixed and illuminated with white light.

Further, in the above-described embodiment, a case where the present invention is applied to the headlamp of the moving body has been exemplified, but the object to which the present invention is applied is not limited to the headlamp of the moving body. The present invention is applicable to all illumination devices including a coherent light source, an optical scanning unit, and a diffusion element such as a hologram, regardless of whether the illumination device is used in a moving body or not.

An aspect of the present invention is not limited to each embodiment described above, but includes various modifications that can be conceived by those skilled in the art, and the effects of the present invention are not limited to the contents described above. That is, various additions, modifications and partial deletions are possible without departing from the conceptual idea and gist of the present invention derived from the contents defined in the claims and their equivalents.

REFERENCE SIGNS LIST

1 Illumination device
2 Irradiation device
3 Optical device
4 Laser light source
5 Light emission timing control unit
6 Light scanning device
7 Light source unit
01 Illumination zone
11, 12 Rotation axis
13 Reflective device
14 Diffusion region part
15 First area
16 First diffusion region
17 Second area
18 Second diffusion region
19 Element diffusion region
21 Object detection unit
22 Object
23 Illumination area
24 Event detection unit
25 Optical shutter
26 Beam diameter expansion member
27 Collimating optical system
30 Hologram recording medium
31 Element hologram area
32 Hologram area
41 Liquid crystal cell
42 Alignment film
43 TN type liquid crystal material
44 Polarization filter
51 Driving unit
52 Illumination position
53 Imaging device
54 Image processing unit
55 Position information acquiring unit
56 Storage unit
57 Information processing unit
58 Handle rotation detection unit

The invention claimed is:

1. An illumination device comprising:
a coherent light source that emits coherent light beam;
an optical device that diffuses the coherent light beam; and
a scanning unit that scans the coherent light beam emitted by the coherent light source on the optical device,
wherein the optical device comprises a first diffusion region that diffuses the coherent light beam scanned on the optical device by the scanning unit to illuminate a first area provided on a ground level, and a second diffusion region that diffuses the coherent light beam scanned on the optical device by the scanning unit to display predetermined information in a second area provided on the ground level,
wherein the predetermined information is a guidance information, and
wherein a coherent light beam emitted from the second diffusion region has a shape of the guidance information, and
wherein the second diffusion region displays the guidance information by projecting the coherent light beam having the shape of the guidance information onto the second area on the ground level.

2. The illumination device according to claim 1, comprising a timing control unit that controls an incident timing of the coherent light beam on the optical device or controls an illumination timing in the first area and a display timing in the second area.

3. An illumination device comprising:
a coherent light source that emits coherent light beam;

an optical device comprising a first diffusion region that diffuses the coherent light beam to illuminate a first area provided on a ground level, and a second diffusion region that diffuses the coherent light beam to display predetermined information in a second area provided on the ground level; and a timing control unit that controls a light emission timing at which the coherent light source emits the coherent light so that the coherent light illuminates the first diffusion region and the second diffusion region, an incident timing at which the coherent light from the coherent light source is incident on the first diffusion region and the second diffusion region, or an illumination timing at which the coherent light diffused by the optical device illuminates the first area and the second area, wherein the predetermined information is a guidance information, wherein a coherent light beam emitted from the second diffusion region has a shape of the guidance information, and wherein the second diffusion region displays the guidance information by projecting the coherent light beam having the shape of the guidance information onto the second area on the ground.

4. The illumination device according to claim 3, comprising a scanning unit that scans the coherent light beam emitted by the coherent light source on the optical device, wherein the first diffusion region diffuses coherent light beam from the scanning unit to illuminate the first area, and the second diffusion region diffuses the coherent light beam from the scanning unit to display the predetermined information in the second area.

5. The illumination device according to claim 2, comprising an event detection unit that detects an occurrence of a specific event, wherein the timing control unit controls the scanning timing of the coherent light beam in at least one of the first diffusion region and the second diffusion region when it is detected by the event detection unit that the specific event has occurred.

6. The illumination device according to claim 4, comprising an event detection unit that detects an occurrence of a specific event, wherein the timing control unit controls the scanning timing of the coherent light beam in at least one of the first diffusion region and the second diffusion region when it is detected by the event detection unit that the specific event has occurred.

7. The illumination device according to claim 1, wherein the guidance information comprises a route guidance information of a moving body.

8. The illumination device according to claim 3, wherein the guidance information comprises a route guidance information of a moving body.

9. The illumination device according to claim 7, wherein the route guidance information of the moving body comprises at least one of information indicating a traveling direction of the moving body and information indicating a direction in which traveling of the moving body is prohibited.

10. The illumination device according to claim 8, wherein the route guidance information of the moving body comprises at least one of information indicating a traveling direction of the moving body and information indicating a direction in which traveling of the moving body is prohibited.

11. The illumination device according to claim 9, wherein the information indicating a traveling direction of the moving body comprises information on an arrow indicating a traveling direction of the moving body.

12. The illumination device according to claim 10, wherein the information indicating a traveling direction of the moving body comprises information on an arrow indicating a traveling direction of the moving body.

13. The illumination device according to claim 9, wherein the information indicating a direction in which traveling of the moving body is prohibited comprises information on an arrow and an X mark indicating a direction in which traveling of the moving body is prohibited.

14. The illumination device according to claim 1, wherein the second diffusion region displays the information by changing at least one of hue, brightness, and chroma in the second area.

15. The illumination device according to claim 1, wherein
the coherent light source comprises a plurality of light emitting units that emit a plurality of coherent light beams having different emission wavelength ranges, and
at least one of the first diffusion region and the second diffusion region has a plurality of diffusion region parts to be scanned by the plurality of coherent light beams.

16. The illumination device according to claim 1, wherein
the optical device is a hologram recording medium, and
the first diffusion region and the second diffusion region have element hologram areas in which different interference fringe patterns are formed.

17. The illumination device according to claim 1, wherein
the optical device is a lens array group having a plurality of lens arrays, and
the first diffusion region and the second diffusion region comprise the lens arrays.

18. The illumination device according to claim 1, wherein
the optical device comprises a hologram recording medium and a lens array group having a plurality of lens arrays, and
one of the first diffusion region and the second diffusion region comprises the hologram recording medium and another comprises the lens array group.

19. An illumination system comprising an illumination device according to claim 1.

20. A vehicle comprising an illumination device according to claim 1.

* * * * *